United States Patent
Garmonov et al.

(10) Patent No.: US 7,103,375 B2
(45) Date of Patent: Sep. 5, 2006

(54) METHOD FOR RECEIVING MULTIPATH SIGNALS IN A RADIO COMMUNICATIONS SYSTEM WITH A CODE DIVISION MULTIPLE ACCESS AND DEVICE FOR CARRYING OUT SAID METHOD

(75) Inventors: Alexandr Vasilievich Garmonov, Russian Federation, 394062, Voronezh, ul. L. Shevtsovoi, d. 5/1, kv. 6 (RU); Evgenie Victorovich Goncharov, Voronezh (RU); Vladimir Borisovich Manelis, Voronezh (RU)

(73) Assignee: Alexandr Vasilievich Garmonov, Voronezh (RU)

( * ) Notice: Subject to any disclaimer, the term of this patent is extended or adjusted under 35 U.S.C. 154(b) by 337 days.

(21) Appl. No.: 10/432,658

(22) PCT Filed: Nov. 27, 2001

(86) PCT No.: PCT/RU01/00509

§ 371 (c)(1),
(2), (4) Date: Oct. 28, 2003

(87) PCT Pub. No.: WO02/45282

PCT Pub. Date: Jun. 6, 2002

(65) Prior Publication Data

US 2004/0077322 A1   Apr. 22, 2004

(51) Int. Cl.
*H04B 15/00* (2006.01)

(52) U.S. Cl. .................. 455/506; 455/133; 375/148

(58) Field of Classification Search ........... 455/506, 455/133; 375/148
See application file for complete search history.

(56) References Cited

U.S. PATENT DOCUMENTS 6,009,129 A    12/1999  Kenney et al.
6,018,546 A *   1/2000  Rege .......................... 375/148

(Continued)

FOREIGN PATENT DOCUMENTS

EP       0565104       10/1993

OTHER PUBLICATIONS

Verdu, Sergio, "Optimum Multiuser Asymptotic Efficiency", *IEEE Transactions on Communications*, vol. Com-34, No. 9, Sep. 1986, pp. 890-897.

(Continued)

*Primary Examiner*—Nick Corsaro
*Assistant Examiner*—Alejandro Rivero
(74) *Attorney, Agent, or Firm*—Ladas & Parry LLP

(57) ABSTRACT

The invention relates to radio engineering, more specifically to a method and a device for receiving multipath signals in a radio communications system with a code division multiple access (CDMA) and can be used for the receiving equipment of a base station. Said invention makes it possible to compensate a reciprocal signal interference of all user beams of information and pilot channels in a shaped complex cross-correlation response of all user beams of the information and pilot channels. The number of information channels and the data transmission rate in the information channels can vary from user to user. A serial compensation of the reciprocal signals interference of all user beams of the information and pilot channels during measurement of user signal parameters and complex waveform envelopes of all user beams is carried out in several iterations.

21 Claims, 22 Drawing Sheets

U.S. PATENT DOCUMENTS

| | | | |
|---|---|---|---|
| 6,208,632 B1* | 3/2001 | Kowalski et al. | 370/335 |
| 6,240,099 B1* | 5/2001 | Lim et al. | 370/441 |
| 2001/0046205 A1* | 11/2001 | Easton et al. | 370/209 |
| 2002/0015438 A1* | 2/2002 | Ishizu et al. | 375/147 |
| 2002/0101910 A1* | 8/2002 | Karnin et al. | 375/147 |
| 2003/0002568 A1* | 1/2003 | Dabak et al. | 375/148 |

OTHER PUBLICATIONS

Xie, Zhenhua, et al., "A Family of Suboptimum Detectors for Coherent Multiuser Communications", *IEEE Journal on Selected Areas in Communications*, vol. 8, No. 4, May 1990, pp. 683-690.

Wu, Bo, et al., "New Sub-Optimal Multiuser Detectors for Synchronous CDMA Systems", *IEEE*, Feb. 1995 pp. 445-448.

Zvonar, Zoran, et al., "Performance of Multiuser Diversity Reception in Nonselective Rayleigh Fading CDMA Channels", *IEEE*, 1994, pp. 171-175.

"An Overview of the Application of Code Division Multiple Access (CDMA) TO Digital Cellular Systems and Personal Cellular Networks", *QUALCOMM Incorporated*, Document No. EX60-10010, May 1992, pp. 1-8, 10-12, 34-37.

Kempf, Peter, "On Multi-User Detection Schemes for Synchronous Coherent CDMA Systems", *IEEE*, 1995, pp. 479-483.

Hui, Andrew L.C., "Successive Interference Cancellation for Multiuser Asynchronous DS/CDMA Detectors in Multipath Fading Links", *IEEE Transactions on Communications*, Mar. 1998, vol. 46, No. 3, pp. 384-391.

Duel-Hallen, Alexandra, et al., "Multiuser Detection for CDMA Systems", *IEEE Personal Communications*, Apr. 1995, pp. 46-58.

English Translation of Claims of RU 2178620 Dated Dec. 12, 2000.

English Translation of Claims of RU 2153770 Dated Jul. 27, 2000.

* cited by examiner

METHOD FOR RECEIVING MULTIPATH SIGNALS IN A RADIO COMMUNICATIONS SYSTEM WITH A CODE DIVISION MULTIPLE ACCESS AND DEVICE FOR CARRYING OUT SAID METHOD

BACKGROUND OF THE INVENTION

I Field of Invention

The present invention relates to radio engineering, particularly, to methods and devices of multipath signal receiving in CDMA systems and can be used in BTS receiving equipment.

II Description of the Related Art

Today cellular communication systems are being developed at an amazing speed. Reduction of service cost and fast growth of the number of users are forced by the increasing demand for system capacity, capacity defined as a number of simultaneously served users per cell. In addition, new data exchange networks like Internet impose new requirements to data transmission rate and propagation channel reliability.

These requirements have accelerated development of signal processing methods and led to the emergence of new radio communication systems. Among latest achievements in this field is CDMA systems. There are CDMA based cellular systems currently operating according to IS-95 Mobile Station—Base Station Compatibility Standard for Dual—Mode Wideband Spread Spectrum Cellular System (to be published as IS-95).—Qualcomm Inc., 3 Volumes, March 1993.—2123 p. and there are third generation standards under development for future wireless networks: UMTS [The ETSI UMTS Terrestrial Radio Access (UTRA) ITU-R RTT Candidate Submission. (UMTS Standard)] and cdma2000 [The ETSI UMTS Terrestrial Radio Access (UTRA) ITU-R RTT Candidate Submission. (UMTS Standard)]. They are supposed to add new service functions, such as high rate channels, access to Internet, location, etc.

CDMA systems are asynchronous address systems, where signals from different users share a common frequency bandwidth and users are separated based on the signal type—a unique function, scrambling function, is assigned to each user. Since signals of different users arrive at the receiving end with random delays, it is not possible to provide full mutual orthogonality of signals from different users. Therefore, it is very critical to jointly differentiate and estimate signal parameters of all the users simultaneously processed at the receiving end. This task is referred to as "multi-user detection" [4] S. Verdu "Optimum Multiuser Asymptotic Efficiency", IEEE Transactions on Communications, vol. COM-34, 9, Sep. 1986, pp. 890–897.

Despite the huge interest in multi-user detection: Z. XIE, R. T. Short, and G. K. Rushforth "A Family of Suboptimum Detectors for Coherent Multiuser Communication", IEEE Journal on selected areas in communications, vol. 8, no. 4, May 1990, pp. 683–690, B. Wu, Wang, "New Sub-Optimal Multiuser Detectors for Synchronous CDMA Systems", Proceedings Pacific Rim Conference on Communications, Victoria, BC, Canada, IEEE, May, 1995, Z. Zvonar, M. Stojanivic, "Performance of Multiuser Diversity Reception in Nonselective Rayleigh Fading CDMA Channels", IEEE Personal Communications, 1994, pp. 171–175. etc. there are still a lot of unsolved issues. For example, there is a problem to develop simple and effective methods and devices of simultaneous receiving of signals of multiple users under the conditions of a priori unknown complex envelope of receiving multipath signals with several info channels per user.

At present there are different methods and devices of multipath signals in CDMA systems.

There is a method of signal receiving and CDMA communication system developed by Qualcomm according to the IS-95 standard "An Overview of Application of Code Division Multiple Access (CDMA) to Digital Cellular Systems and Personal Cellular Networks", USA, Qualcomm, May, 1992, Document Number EX60-10010, where base (central) station, BS, comprises N receivers that receive signals from mobile stations. The level of structural interference at BS in this system is reduced because of the use of adaptive power control of mobile station signals.

However, the above method of signal receiving and communication system do not provide high interference immunity, power losses during signal receiving are possible because of the presence of multi-user interference.

There are methods and algorithms of multi-user detection in synchronous coherent system of CDMA communication system described by Peter Kempf in the paper "On Multi-User Detection Schemes for Synchronous Coherent CDMA Systems", IEEE Vehicular Technology Conference, pp. 479–483, 1995.

In this paper several methods of multi-user detection are addressed. Let us consider one of them.

It is assumed that N users are served in a communication system. Data transmission rates of different users, the length of info symbols are the same. Each user has a single information, info, channel. The complex envelopes of signals from different users are assumed to be known and methods of their estimation are not considered. Signal propagation channel is one path. Analysis of the suggested algorithm is carried out without fading.

Unknown info parameters of users are estimated through L stages by sequential compensation of interfering effect of user signals on each other. At each of these stages the correlation responses of user signals, on which the final decision has been made at the previous stages, are formed. Out of them N/L maximum by module correlation responses are selected, on which the final decision about info parameters is made. The estimates of interfering effect of signals of these users are obtained and the output signal of this stage is generated by subtracting the obtained estimates from the output signal of the previous stage.

In the described method of multi-user detection forming of the estimate of interfering impact of user signals and subtraction of this estimate are carried out at high intermediate frequency, which makes it a difficult task to implement this method.

The use of the described method supposes the knowledge of complex envelopes of user signals and does not have the mechanism of their effective estimation. This renders it impossible to use this method in fading and invariable channel conditions.

The presence of only info signal per user does not correspond to the structure of user signals in today's radio systems, where several info channels and pilot channel are available.

Propagation channel is assumed to be one path

There is a method multi-user description in a CDMA communication system described by Andrew L. C. Hui and Khaled Ben Letaief "Successive Interference Cancellation for Multiuser Asynchronous DS/CDMA Detectors in Multipath Fading Links", IEEE, vol. 46, 3, Mar., 1998, pp. 384–391.

In is assumed that N users are served in a communication system. Data transmission rates of different users, the lengths of info symbols, are the same. Each user has a single info channel. The complex envelopes of signals from different users are assumed to be known and their estimation methods are not considered. Propagation channel is multipath. Analysis of the algorithms is carried out under fading conditions.

It is assumed that the receiving equipment of base station recovers complex envelopes and user delays highly accurately; the method of how this is done is not specified.

The method is implemented in the following manner. The input signal is demodulated thus forming the correlation responses of all the paths of all the users at the output. The info parameters are estimated through sequential compensation of the interfering impact of user signals on one another through L stages. At each of L stages:

the correlation responses of all the paths of each user are combined forming soft decisions on info parameters of users;

the user with maximum by modulo soft decision and the final decision about his info parameter is made;

considering the matrices of cross-correlation the estimate of interfering effect of a given user on the correlation responses of user signals paths by which final decision has not been made at the previous stages is formed;

the correlation responses of this stage are formed by subtracting the obtained estimates of interfering effect from the correlation responses of the previous stage.

The use of this method supposes the presence of accurate estimates of complex envelopes of user signals that cannot be obtained in practice because the processes of obtaining complex envelope estimates and information parameters are interrelated.

A single info channel per user does not meet the user signal structure in today's radio systems, where a number of info channels is assumed.

The algorithm supposes similar data transmission rates of all the users that does not correspond to real conditions.

At each stage the final decision is made by one user, so at the final stage the final decision by N–L users has to be made, which, in case N is much greater than L (N>>L), reduces interference stability of an estimate. When the number of stages L is a bit lower than the number of users N, the algorithm becomes more complex due to multiple stages.

Finally there is a multi-user detection method in the CDMA IS-95 system described by A. Duel-Hallen, J. Holtzman, Z. Zvonar in "Multiuser Detection for CDMA Systems", IEEE Personal Communications, April 1995, pp. 46–57.

In this system N users are served. The length of info symbols of different users in this system is the same. A user is supposed to have a single info channel. The estimates of complex envelopes of signals from different users are derived by non-coherent estimation of info symbols of each user with subsequent accumulation of complex correlation responses of symbols correlated in accordance with the estimates obtained. User propagation channel is assumed to be multipath. Analysis of the considered algorithm is carried out in fading conditions.

The mentioned method is implemented in the following manner. The input signal is demodulated thus forming the correlation responses of signals of all the paths of all the users at the output. The info parameters are estimated by serial compensation of the interfering effect of users on each other through N stages. Within each of N stages:

the correlation responses of signals of all the paths of each user are combined thus forming soft decisions about info parameters of user signals;

the user of max by modulo soft decision is chosen and final decision about its info parameter is made;

considering the cross-correlation matrices the estimate of interfering effect of a signal from a given user on the correlation responses of signals of user paths by which the final decision at the previous stages has not been made is formed;

the correlation responses of this stage are formed by subtracting the obtained estimates of interfering effect from the correlation responses of the previous stage.

The method of estimation of complex envelopes of user signals used in the described algorithm is, first, limited by the IS-95 standard frames, second, is not so efficient for it does not consider the mutual effect of user signals on each other.

A single info channel per user does not correspond to the 3G user signal structure (IS-2000, UMTS, 3GPP), where a number of info channels are supposed to be available.

The method supposes the same length of info symbols of different users in this system, which does not correspond to the requirements of mobile 3G standards.

With a great number of users N owing to multiple stages implementation of the method becomes a complex tasks.

SUMMARY OF THE INVENTION

The main goal of the present invention is to create the method and reliable device of multipath signal receiving in a CDMA communications system providing improved interference stability, throughput, and capacity and the reliable device for implementation of the same.

This goal is attained through the following. In the method of multipath signal receiving in a CDMA mobile communications systems, where the input signal of base station, BS, is an additive mixture of user signals and noise, where a signal of every user being a collection of independently fading path signals comprises the pilot component and info components received via the corresponding pilot and info channels, the amounts of info channels per user and data transmission rates varying in user info channels, further comprising:

making soft decisions about the info parameters of signals of all the info channels of all the users by compensating the interfering effect of signals of all the paths of pilot and info channels of all the users on each other, for which the input signal is searched for by isolating the paths of maximum power signals from the detected signals of paths;

the complex correlation responses of signals of all the isolated paths of info channels of all the users are formed;

the complex correlation responses of signals of all the isolated paths of pilot channels of all the users are formed;

the complex correlation responses of signals of each path of pilot channel of each user are accumulated within the corresponding accumulation time thus generating averaged complex correlation responses of signals of all the paths of pilot channels of all the users;

the generated complex correlation responses of signals of all the paths of info channels of all the users and all the generated complex correlation responses of signals of all the paths of pilot and info channels of all the users are delayed so that while compensating their interfering effect on each other the estimates of this interfering effect be formed, the soft decisions about the info parameters of signals of all the info channels of all the users are formed successively in L iterations, where L—the integer greater than or equal to 1, where at each iteration the estimates of the interfering effect of signals of all the paths of pilot channels of all the users on each other are formed and this interfering effect is compensated in the averaged complex correlation responses of signals of all the paths of pilot channels of all the users thus forming more accurate complex correlation responses of signals of all the paths of pilot channels of all the users;

the estimates of the interfering effect of signals of all the paths of pilot channels of all the users on the signals of all the paths of info channels of all the users are made and this interfering effect is compensated in complex correlation responses of signals of all the paths of info channels of all the users thus forming more accurate complex correlation responses of signals of all the paths of info channels of all the users;

the estimates of the interfering effect of signals of all the paths of info channels of all the users on signals of all the paths of pilot channels of all the users are made and this interfering effect is compensated in more accurate complex correlation responses of signals of all the paths of pilot channels of all the users thus forming the estimates of complex envelopes of signals of all the paths of all the users;

the soft decisions about the info parameters of signals of all the info channels of all the users are formed successively through $P_l$ stages compensating the interfering effect of signals of all the paths of info channels of all the users on each other, l takes the integer values of 1 to L, l—iteration number, where at the p-th stage p takes the values of 1 to $P_l$, more accurate complex correlation responses of signals of all the paths of each info channel of each user, p being equal to one, or the complex correlation responses of signals of all the paths of info channel of the (p−1)-th stage users, p being greater than one, are combined using the estimates of complex envelopes of signals of all the user paths thus forming soft decisions about the info parameters of signals of info channels of the p-th stage users;

out of the generated soft decisions $K_p$ maximum by modulo ones are selected and considered to be the final soft decisions about the info parameters of signals of info channels of the current iteration users;

the estimates are made of the interfering effect of signals of all the paths of user info channel, corresponding to the selected soft decisions about the info parameters of user info channels, on the remaining signals of all the paths of user info channels on which the final decision has not yet been made by this stage;

this interfering effect is compensated in the remaining more accurate complex correlation responses of signals of all the paths of info channels of users, p being equal to one, or in the remaining complex correlation responses of signals of all the paths of info channel of the (p−1)-th stage users, p being greater than one, thus forming complex correlation responses of signals of all the paths of info channels of the p-th stage users;

at the last $P_l$-th stage the complex correlation responses of signals of all the paths of info channels of the $P_l$-th stage users, on which the final decision has not yet been made, are combined using the estimates of complex envelopes of signals of all the paths of users thus forming the soft decisions about the info parameters of signals of info channels of the $P_l$-th stage users, which along with the final soft decisions about the info parameters of signals of user info channels of the previous stages are the final soft decisions about the info parameters of this iteration;

the obtained soft decisions about the info parameters of signals of all the info channels of all the users and the estimates of complex envelopes of signals of all the paths of all the users of the current iteration, except the last one, that are delayed by the time of iteration, are used to generate the estimates of the interfering effect of signals of all the paths of pilot channels of all the users on each other, the estimates of the interfering effect of signals of all the paths of pilot channels of all the users on the signals of all the paths of info channels of all the users and the estimates of the interfering effect of signals of all the paths of info channels of all the users on the signals of all the paths of pilot channels of all the users of the subsequent iteration;

at the first iteration in order to generate the estimates of the interfering effect of signals of all the paths of pilot channels of all the users on each other the averaged complex correlation responses of signals of all the paths of pilot channels of all the users are used, in order to generate the estimates of the interfering effect of signals of all the paths of pilot channels of all the users on the signals of all the paths of info channels of all the users more accurate complex correlation responses of signals of the all the paths of pilot channels of all the users are used, in order to generate the estimates of the interfering effect of signals of all the paths of info channels of all the users on the signals of all the paths of pilot channels of all the users more accurate complex correlation responses of signals of all the paths of pilot and info channels of all the users are used;

the soft decisions about the info parameters of signals of all the info channels of all the users of the last iterations are the output signals for decision making.

In order to put the listed features of the filed method into practice, the preferable examples of how the following operations of the methods should be executed are presented below.

The accumulation interval of complex correlation responses of signals of each path of pilot channel of each user is selected to be equal to the interval of communication channel invariability but not longer than double time of tolerable signal processing delay.

While forming the estimates of the interfering effect of signals of all the paths of pilot channels of all the users on each other, the elements of cross-correlation matrix of the pseudo-random sequences of the pilot components of signals of all the paths of all the users to each other are generated. The pseudo-random sequence will be referred to in this document as PN-sequence.

While forming the estimates of the interfering effect of signals of all the paths of pilot channels of all the users on the signals of all the paths of info channels of all the users, the elements of cross-correlation matrix of PN sequence of the pilot components of signals of all the paths of all the users to PN sequence of the info components of signals of all the paths of all the users are generated.

While forming the estimates of the interfering effect of signals of all the paths of info channels of all the users on the signals of all the paths of pilot channels of all the users, the elements of cross-correlation matrix of PN sequence of the info components of signals of all the paths of all the users to PN sequence of the pilot components of signals of all the paths of all the users are generated.

While forming the estimates of the interfering effect of signals of all the paths of info channels of all the users on each other, the elements of cross-correlation matrix of PN sequences of the info components of signals of all the paths of all the users to each other are generated.

The estimates of the interfering effect of signals of all the paths of pilot channels of all the users on each other for the first iteration are formed by weight combining of the averaged complex correlation responses of signals of all the paths of pilot channels of all the users with the weights defined by the elements of cross-correlation matrix of PN sequences of the pilot components of signals of all the paths of all the users to each other, and for the subsequent iterations by weight combining of the estimates of complex envelopes of signals of all the paths of all the users of the previous iteration with the weights defined by the elements of cross-correlation matrix of PN sequence of the pilot components of signals of all the paths of all the users to each other.

The interfering effect of signals of all the paths of pilot channels of all the users on each other is compensated by subtracting the generated estimates of the interfering effect of signals of all the paths of pilot channels of all the users on each other from the averaged complex correlation responses of signals of all the paths of pilot channels of all the users.

The estimates of the interfering effect of signals of all the paths of pilot channels of all the users on the signals of all the paths of info channels of all the users for the first iteration are made by weight combining of more accurate complex correlation responses of signals of all the paths of pilot channels of all the users with the weights defined by the elements of cross-correlation matrix of the PN sequences of the pilot components of signals of all the paths of all the users to the PN sequences of the info components of signals of all the paths of all the users, and for the subsequent iterations by weight combining of the estimates of complex envelopes of signals of all the paths of all the users of the previous iteration with the weights defined by the elements of cross-correlation matrix of the PN sequences of the pilot components of signals of all the paths of all the users to the PN sequences of the info components of signals of all the paths of all the users.

The interfering effect of signals of all the paths of pilot channels of all the users on the signals of all the paths of info channels of all the users is compensated by subtracting the generated estimates of the interfering effect of signals of all the paths of pilot channels of all the users on the signals of all the paths of info channels of all the users from the complex correlation responses of signals of all the paths of info channels of all the users.

The estimates of the interfering effect of signals of all the paths of info channels of all the users on the signals of all the paths of pilot channels of all the users for the first iteration are made by combining more accurate complex correlation responses of signals of all the paths of each info channel of each user using more accurate complex correlation responses of signals of all the paths of pilot channel of each user thus making the interim soft decisions about the info parameters of signals of each info channel of each user, forming the estimates of the info parameters of signals of all the info channels of all the users by comparing the interim soft decisions about the info parameters of signals of each info channel of each user with preset thresholds and weight combining of the products of more accurate complex correlation responses of signals of all the paths of pilot channels of all the users and the estimates of the info parameters of signals of all the info channels of all the users with the weights defined by the elements of cross-correlation matrix of the PN sequences of the info components of signals of all the paths of all the users to the PN sequences of the pilot components of signals of all the paths of all the users, and for subsequent iterations by generating the estimates of the info parameters of signals of all the info channels of all the users by comparing the soft decisions about the info parameters of signals of all the info channels of all the users of the previous iteration to the preset thresholds and weight combining of the products of the estimates of complex envelopes of signals of all the paths of pilot channels of all the users of the previous iteration and the estimates of the info parameters of signals of all the info channels of all the users with the weights defined by the elements of cross-correlation matrix of PN sequences of the info components of signals of all the paths of all the users to the PN sequence of the pilot components of signals of all the paths of all the users.

The interfering effect of signals of all the paths of info channels of all the users on the signals of all the paths of pilot channels of all the users is compensated by subtracting the estimates of the interfering effect of signals from all the paths of info channels of all the users on the signals of all the paths of pilot channels of all the users from more accurate complex correlation responses of signals of all the paths of pilot channels of all the users.

The interfering effect of signals of all the paths of info channels of the users corresponding to the selected soft decisions about the info parameters of signals of user info channel on the remaining info components of signals of all the user paths, on which the final decision has not yet been made by this stage, is compensated by subtracting the obtained estimates of this interfering effect from the remaining more accurate complex correlation responses of signals of all the paths of each info channel of each user, p being equal to one, or from the remaining complex correlation responses of signals of all the paths of info channels of the (p−1)-th stage users, p being greater than 1, thus forming complex correlation responses of signals of all the paths of info channels of the p-th stage users.

While executing current l-th iteration, where l is greater than 1, the generated elements of cross-correlation matrix of the pseudo-noise sequences of the pilot components of signals of all the paths of all the users to each other are delayed by the time of previous iterations.

While executing current l-th iteration, where l is greater than 1, the generated elements of cross-correlation matrix of the pseudo-noise sequences of the pilot components of signals of all the paths of all the users to the pseudo-noise sequences of the info components of signals of all the paths of all the users are delayed by the time of previous iterations.

While executing current l-th iteration, where l is greater than 1, the generated elements of cross-correlation matrix of the info components of signals of all the paths of all the users to the pseudo-noise sequences of the pilot components of signals of all the paths of all the users are delayed by the time of previous iterations.

While executing current l-th iteration, where l is greater than 1, the generated elements of cross-correlation matrix of the pseudo-noise sequences of the info components of signals of all the paths of all users to each other are delayed by the time of previous iterations.

The set goal is further attained by the device of multipath signal reception in a CDMA mobile communications system further comprising, according to the present invention, demodulation unit that generates at the first outputs delayed complex correlation responses of signals of all the paths of info channels of all the users; at the second outputs—delayed complex correlation responses of signals of all the paths of pilot channels of all the users; at the third outputs—control signals; at the fourth outputs—the elements of cross-correlation matrix of the PN sequences of the pilot components of signals of all the paths of all the users to each other, the elements of cross-correlation matrix of the PN sequences of the pilot components of signals of all the paths of all the users to the PN sequences of the info components of signals of all the paths of all the users, the elements of cross-correlation matrix of the PN sequences of the info components of signals of all the paths of all the users to the PN sequences of the pilot components of signals of all the paths of all the users and the elements of cross-correlation matrix of the PN sequences of the info components of the signals of all the paths of all the users to each other; accumulator of complex correlation responses of signals of each path of pilot channel of each user generating at the outputs averaged complex correlation responses of signals of all the paths of pilot channels of all the users; L−1 first delay units, L−1 second delay units, and L signal processing units, each generating soft decisions about the info parameters of signals of all the info channels of all the users at the first outputs; the estimates of complex envelopes of signals of all the paths of all the users at the second outputs of each of them but last L-th signal processing unit, wherein first signal processing unit implements first method iteration, subsequent signal processing units along with corresponding first and second delay units implement subsequent method iterations, the input of demodulation unit being a signal input of the device; the first outputs of demodulation unit are linked to the first inputs of L signal processing units, to first signal processing unit directly and to the rest of signal processing units via corresponding first delay units and all the previous first delay units; the second outputs of demodulation unit are connected to the inputs of accumulator whose outputs are joined with the second inputs of L signal processing units, to the first signal processing unit directly and to the rest of signal processing units via corresponding first delay units and all the previous first delay units; the first and second outputs of previous first delay unit are linked to the first and second inputs of subsequent first delay unit, the third outputs of demodulation unit are connected to the third inputs of L signal processing units; the fourth outputs of demodulation unit are connected to the fourth inputs of L signal processing units, to first signal processing unit directly and to the rest of signal processing units via corresponding second delay units and all the previous second delay units; the first outputs of previous second delay unit are connected to the fourth inputs of corresponding signal processing unit and to the first inputs of subsequent second delay unit; the first and second outputs of previous signal processing units are connected to the fifth and sixth inputs of subsequent signal processing unit via second delay unit corresponding to this subsequent signal processing unit; the second and third inputs of second delay unit are linked to the first and second outputs of previous signal processing unit and the second and third outputs of second delay unit are linked to the fifth and sixth inputs of corresponding signal processing unit; the outputs of the last L-th signal processing unit, the soft decisions about the info parameters of signals of all the info channels of all the users, are outputs of the device; each signal processing unit comprises sub-unit for compensation of the interfering effect of signals of all paths of pilot channels of all the users on each other; sub-unit for compensation of the interfering effect of signals of all the paths of pilot channels of all the users on the signals of all the paths of info channels of all the users, sub-unit for compensation of the interfering effect of signals of all the paths of info channels of all the users on the signals of all the paths of pilot channels of all the users, and sub-unit for compensation of the interfering effect of signals of all the paths of info channels of all the users on each other, producing soft decisions about the info parameters of signals of all the info channels of all the users through $P_l$ stages, where l—signal processing unit number taking the integer values of 1 to L; in first signal processing unit the first inputs are formed by the first inputs of sub-unit for compensation of the interfering effect of signals of all the paths of pilot channels of all the users on the signals of all the paths of info channels of all the users, the second inputs are formed by the first inputs of sub-unit for compensation of the interfering effect of signals of all the paths of pilot channels of all the users on each other; the third inputs are formed by the second inputs of sub-unit for compensation of the interfering effect of signals of all the paths of pilot channels of all the users on the signals of all the paths of info channels of all the users, the second inputs of sub-unit for compensation of the interfering effect of signals of all the paths of pilot channels of all the users on each other, the first inputs of sub-unit for compensation of the interfering effect of signals of all the paths of info channels of all the users on the signals of all the paths of pilot channels of all the users, and the first inputs of sub-unit for compensation of the interfering effect of signals of all the paths of info channels of all the users on each other; the fourth inputs are formed by the third inputs of sub-unit for compensation of the interfering effect of signals of all the paths of pilot channels of all the users on the signals of all the paths of info channels of all the users, the third inputs of sub-unit for compensation of the interfering effect of signals of all the paths of pilot channels of all the users on each other, the second inputs of sub-unit for compensation of the interfering effect of signals of all the paths of info channels of all the users of the signals of all the paths of pilot channels of all the users, and the second inputs of sub-unit for compensation of the interfering effect of signals of all the paths of info channels of all the users on each other, the outputs of sub-unit for compensation of the interfering effect of signals of all the paths of pilot channels of all the users on each other, generating at these outputs more accurate complex correlation responses of signals of all the paths of pilot channels of all the users, are linked to the fourth inputs of sub-unit for compensation of the interfering effect of signals of all the paths of pilot channels of all the users on the signals of all the paths of info channels of all the users and the third inputs of sub-unit for compensation of the interfering effect of signals of all the paths of info channels of all the users on the signals of all the paths of pilot channels of all the users, the outputs of sub-unit for compensation of the interfering effect of signals of all the paths of pilot channels of all the users on the signals of all the paths of info channels of all the users, generating at these outputs more accurate complex correlation responses of signals of all the paths of info channels of all the users, are connected to the fourth inputs of sub-unit for compensation of the interfering effect of signals of all the paths of info channels of all the users on the signals of all the paths of pilot channels of all the users and to the third inputs of sub-unit for compensation of the interfering effect of signals of all the paths of info channels of all the users on each other, the outputs of sub-unit for compensation of the interfering effect of signals of all the paths of info channels of all the users on the signals of all the paths of pilot channels of all the users, generating at these outputs the estimates of complex envelopes of signals of all the paths of all the users, are joined with the fourth inputs of sub-unit for compensation of the interfering effect of signals of all the paths of info channels of all the users on each other and are second outputs of first signal processing unit, the outputs of sub-unit for compensation of the interfering effect of signals of all the paths of info channels of all the users on each other, generating at these outputs soft decisions about the info parameters of signals of all the info channels all the users, are the first outputs of first signal processing unit, in each subsequent l-th signal processing unit, 1 taking the integer values of 2 to L; the first inputs are formed by the first inputs of sub-unit for compensation of the interfering effect of signals of all the paths of pilot channels of all the users on the signals of all the paths of info channels of all the users; the second inputs are formed by the first inputs of sub-unit for compensation of the interfering effect of signals of all the paths of pilot channels of all the users on each other; the third inputs are formed by the second inputs of sub-unit for compensation of the interfering effect of signals of all the paths of pilot channels of all the users on the signals of all the paths of info channels of all the users, the second inputs of sub-unit for compensation of the interfering effect of signals of all the paths of pilot channels of all the users on each other, the first inputs of sub-unit for compensation of the interfering effect of signals of all the paths of info channels of all the users on the signals of all the paths of pilot channels of all the users and first inputs of sub-unit for compensation of the interfering effect of signals of all the paths of info channels of all the users on each other; the fourth inputs are formed by the third inputs of sub-unit for compensation of the interfering effect of signals of all the paths of pilot channels of all the users on the signals of all the paths of info channels of all the users, the third inputs of sub-unit for compensation of the interfering effect of signals of all the paths of pilot channels of all the users on each other, the second inputs of sub-unit for compensation of the interfering effect of signals of all the paths of info channels of all the users on the signals of all the paths of pilot channels of all the users and second inputs of sub-unit for compensation of the interfering effect of signals of all the paths of info channels of all the users on each other; the fifth inputs are formed by the third inputs of sub-unit for compensation of the interfering effect of signals of all the paths of info channels of all the users on the signals of all the paths of pilot channels of all the users; the sixth inputs are formed by the fourth inputs of sub-unit for compensation of the interfering effect of signals of all the paths of pilot channels of all the users on the signals of all the paths of info channels of all the users, the fourth inputs of sub-unit for compensation of the interfering effect of signals of all the paths of pilot channels of all the users on each other and fourth inputs of sub-unit for compensation of the interfering effect of signals of all the paths of info channels of all the users on the signals of all the paths of pilot channels of all the users; the outputs of sub-unit for compensation of the interfering effect of signals of all the paths of pilot channels of all the users on each other, generating at these outputs more accurate complex correlation responses of signals of all the paths of pilot channels of all the users, are linked to the fifth inputs of sub-unit for compensation of the interfering effect of signals of all the paths of info channels of all the users; the outputs of sub-unit for compensation of the interfering effect of signals of all the paths of pilot channels of all the users on the signals of all the paths of info channels of all the users, generating at these outputs more accurate complex correlation responses of signals of all the paths of info channels of all the users, are linked to the third inputs of sub-unit for compensation of the interfering effect of signals of all the paths of info channels of all the users on each other; the outputs of sub-unit for compensation of the interfering effect of signals of all the paths of info channels of all the users on the signals of all the paths of pilot channels of all the users, generating at these outputs the estimates of complex envelopes of signals of all the paths of all the users, are connected to the fourth inputs of sub-unit for compensation of the interfering effect of signals of all the paths of info channels of all the users on each other and for each signal processing unit except the last, L-th, one are the second outputs; the outputs of sub-unit for compensation of the interfering effect of signals of all the paths of info channels of all the users on each other, generating at these outputs soft decisions about the info parameters of signals of all the info channels of all the users, are the first outputs of signal processing unit; the outputs of the last L-th signal processing unit are the outputs of the device.

It is desirable that demodulation unit and sub-unit for compensation of the interfering effect of signals of all the paths of info channels of all the users on each other, which comprises signal processing unit, be accomplished in the following manner.

Demodulation unit further comprises searcher, correlators for signal of each path of each user, sub-unit for delay and grouping of the correlation responses of signals of all the paths of info and pilot channels of all the users, controller, and cross-correlation matrix element former, wherein the first inputs of correlators and searcher are combined thus forming signal input of demodulation unit, the second inputs of correlators and searchers are connected to the first and second control outputs of controller, respectively; the first outputs of each correlator and searcher are connected to the first and second inputs of controller, respectively; the second outputs of correlators are joined with the first inputs of sub-unit for delay and grouping of the correlation responses of signals of all the paths of info and pilot channels of all the users; the second inputs of sub-unit for delay and grouping of the correlation responses of signals of all the paths of info and pilot channels of all the users are connected to the third control outputs of controller; the first outputs of sub-unit for delay and grouping of the correlation responses of signals of all the paths of info and pilot channels of all the users, generating at these outputs complex correlation responses of signals of all the paths of info channels of all the users, are the first outputs of demodulation unit; the second outputs of sub-unit for delay and grouping of correlation responses of signals of all the paths of info and pilot channels of all the users, generating at these outputs complex correlation responses of signals of all the paths of pilot channels of all the users, are the second outputs of demodulation unit; the fourth outputs of controller are the third outputs of demodulation unit; the fifth outputs of controller are joined with the inputs of cross-correlation matrix element former; the outputs of cross-correlation matrix element former that forms at these outputs the elements of cross-correlation matrix of the PN sequences of pilot components of signals of all the paths of all the users to each other, the elements of cross-correlation matrix of the PN sequences of the pilot components of signals of all the paths of all the users to the PN sequences of the info components of signals of all the paths of all the users, the elements of cross-correlation matrix of the PN sequences of the info components of signals of all the paths of all the users to the PN sequences of the pilot components of signals of all the paths of all the users, and the elements of cross-correlation matrix of the PN sequences of the info components of signals of all the paths of all the users to each other, are the fourth outputs of demodulation unit.

Sub-unit for compensation of the interfering effect of signals of all the paths of info channels of all the users on each other further comprises controller and $P_l$ successively connected nodes for compensation of the interfering effect of signals of all the paths of info channels of all the users on each other, l taking the integer values of 1 to L, the first outputs of the previous node for compensation of the interfering effect of signals of all the paths of info channels on each other are connected to the first inputs of subsequent node for compensation of the interfering effect of signals of all the paths of user info channels on each other; the first inputs of sub-unit for compensation of the interfering effect of signals of all the paths of info channels of all the users on each other are formed by the first inputs of controller; the second inputs of sub-unit for compensation of the interfering effect of signals of all the paths of info channels of all the users on each other are formed by the second inputs of nodes for compensation of the interfering effect of signals of all the paths of info channels on each other; the third inputs of sub-unit for compensation of the interfering effect of signals of all the paths of info channels of all the users on each other are formed by the first inputs of first node for compensation of the interfering effect of signals of all the paths of info channels of all the users on each other; the fourth inputs of sub-unit for compensation of the interfering effect of signals of all the paths of info channels of all the users on each other are formed by the third inputs of nodes for compensation of the interfering effect of signals of all the paths of user info channels on each other; the first outputs of controller are connected to the fourth inputs of nodes for compensation of the interfering effect of signals of all the paths of user info channels on each other; the second outputs of controller are the outputs of sub-unit for compensation of the interfering effect of signals of all the paths of info channels of all the users on each other; the second outputs of nodes for compensation of the interfering effect of signals of all the paths of user info channels on each other are connected to the second inputs of controller.

BRIEF DESCRIPTION OF THE DRAWINGS

The features, objects, and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

Figure 1:
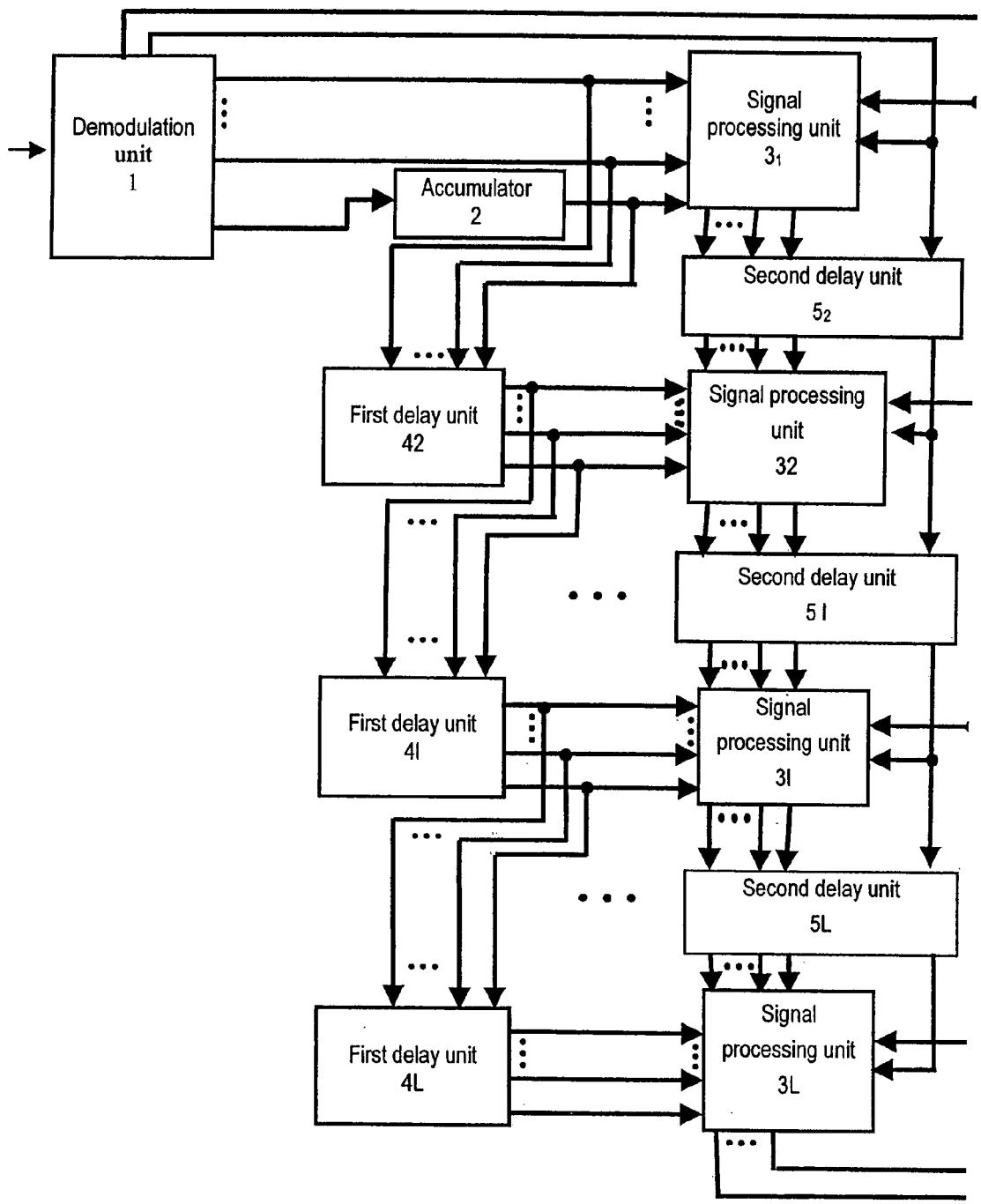
FIG. 1 is a block diagram of the filed device of multipath signal receiving in a CDMA radio communications system.

The filed device of multipath signal receiving in a CDMA mobile communications system shown on FIG. 1 comprises the following: demodulation unit 1 that generates at the first outputs delayed complex correlation responses of signals of all the user info channel paths, at the second outputs—delayed complex correlation responses of signals of all the user pilot channel paths, at the third outputs—control signals, at the fourth outputs—the elements of cross-correlation matrix of the PN sequences of the pilot components of signals of all the user paths to each other, the elements of cross-correlation matrix of the PN sequences of the pilot components of signals of all the paths of all the users to the PN sequences of the info components of all the paths of all the users, the elements of cross-correlation matrix of the PN sequences of the info components of signals of all the paths of all the users to the PN sequences of the pilot components of signals of all the paths of all the users, and the elements of cross-correlation matrix of the PN sequences of the info components of signals of all the paths of all the users to each other, accumulator 2 of complex correlation responses of signals of each path of each pilot channel, generating at the outputs averaged complex correlation responses of signals of all the user pilot channel paths, L–1 first delay units $4_2$–$4_L$, L–1 second delay units $5_2$–$5_L$ and L signal processing units $3_1$–$3_L$, providing estimation of the info parameters of info channel signals of N users and at the first outputs of each forming soft decisions about the info parameters of signal from all the user info channels, at the second outputs of each of them but the last L-th signal processing unit $3_L$—the estimates of complex envelopes of signals of all the user paths, where first signal processing unit implements first iteration of the method, subsequent signal processing units with corresponding first and second delay units implement subsequent method iterations; the input of demodulation unit 1 being a signal input of the device, the first outputs of demodulation unit 1 are linked to the first inputs of L signal processing units $3_1$–$3_L$, wherein to first signal processing unit $3_1$ directly and to the rest of signal processing units $3_l$ via first delay units $4_l$ and all the previous first delay units $4_2$–$4_{l-1}$ corresponding to them, l taking the integer values of 2 to L, the second outputs of demodulation unit 1 are joined with the inputs of accumulator 2 whose outputs are linked to the second inputs of L signal processing units $3_1$–$3_L$, wherein to first signal processing unit $3_1$ directly and to the rest of signal processing units $3_l$ via first delay units $4_l$ and all the previous first delay units $4_2$–$4_{l-1}$ corresponding to them, l taking the integer values of 2 to L, the first and second outputs of previous first delay unit $4_{l-1}$ are connected to the first and second inputs of subsequent first delay unit $4_l$, the third outputs of demodulation unit 1 are joined with the third inputs of L signal processing units $3_1$–$3_L$, the fourth outputs of demodulation unit 1 are linked to the fourth inputs of L signal processing units $3_1$–$3_L$, wherein to first signal processing unit $3_1$ directly and to the rest of signal processing units $3_l$ via second delay units 51 and all the previous second delay units $5_2$–$5_{l-1}$ the first outputs of previous second delay unit $5_{l-1}$ are connected to the fourth inputs of signal processing unit $3_{l-1}$ corresponding to it and to the first inputs of subsequent second delay unit $5_l$, the first and second outputs of previous signal processing unit $3_{l-1}$ are joined with the fifth and sixth inputs of subsequent signal processing unit $3_l$ via second delay unit $5_l$, corresponding to this subsequent signal processing unit, l taking the integer values of 2 to L, the second and third inputs of second delay unit $5_l$ are joined with first and second outputs of previous signal processing unit $3_{l-1}$ and the second and third outputs of second delay unit $5_l$ are coupled to the fifth and sixth inputs of corresponding signal processing unit $3_l$, the outputs of the last L-th signal processing unit $3_L$, the soft decisions about the info parameters of all the user info channel signals, are the outputs of the device.

Figure 2:
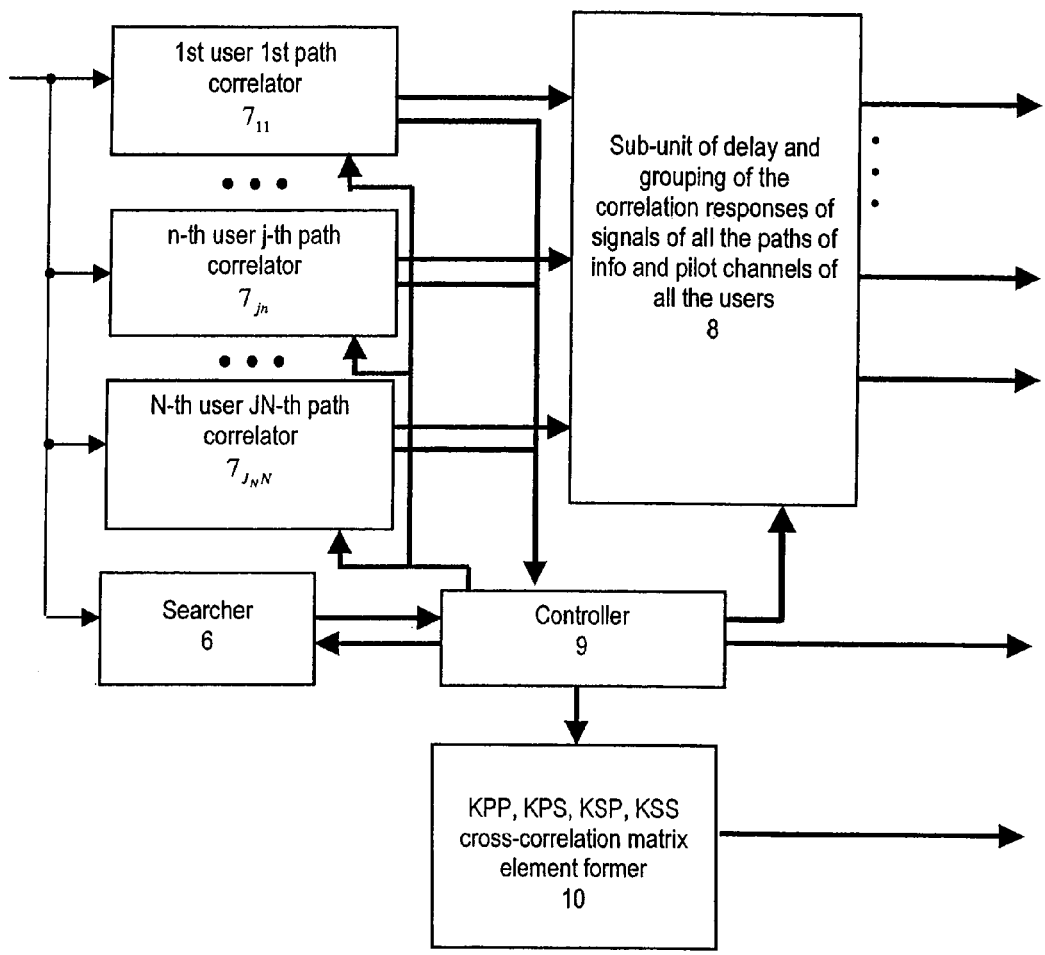
FIG. 2 is demodulation unit 1.

Demodulation unit 1 as per FIG. 2 comprises, in the present embodiment, searcher 6, correlators $7_{11}$–$7_{J_NN}$ for signal of each path of each user, sub-unit 8 for delay and grouping of the correlation responses of signals of all the paths of info and pilot channels of all the users, controller 9, and cross-correlation matrix element former 10, wherein the first inputs of correlators $7_{11}$–$7_{J_NN}$ and searcher 6 are combined thus forming signal input of demodulation unit 1, the second inputs of correlators $7_{11}$–$7_{J_NN}$ and searcher 6 are connected to the first and second control outputs of controller 9, respectively; the first outputs of each correlator $7_{11}$–$7_{J_NN}$ and searcher 6 are connected to the first and second inputs of controller 9, respectively; the second outputs of correlators $7_{11}$–$7_{J_NN}$ are joined with the first inputs of sub-unit 8 for delay and grouping of the correlation responses of signals of all the user info and pilot channel paths; the second inputs of sub-unit 8 for delay and grouping of the correlation responses of signals of all the paths of info and pilot channels of all the users are linked to the third control outputs of controller 9; the first outputs of sub-unit 8 for delay and grouping of the correlation responses of signals of all the paths of info and pilot channels of all the users, generating at these outputs complex correlation responses of signals of all the paths of info channels of all the users, are the first outputs of demodulation unit 1; the second outputs of sub-unit 8 for delay and grouping of the correlation responses of signals of all the paths of info and pilot channels of all the users, generating at these outputs complex correlation responses of signals of all the paths of info channels, are the second outputs of demodulation unit 1; the fourth outputs of controller 9 are the third outputs of demodulation unit 1; the fifth outputs of controller 9 are joined with the inputs of cross-correlation matrix element former 10; the outputs of cross-correlation matrix element former 10, that forms at these outputs the elements of cross-correlation matrices KPP, KPS, KSP, KSS, are the fourth outputs of demodulation unit 1.

Figure 4:
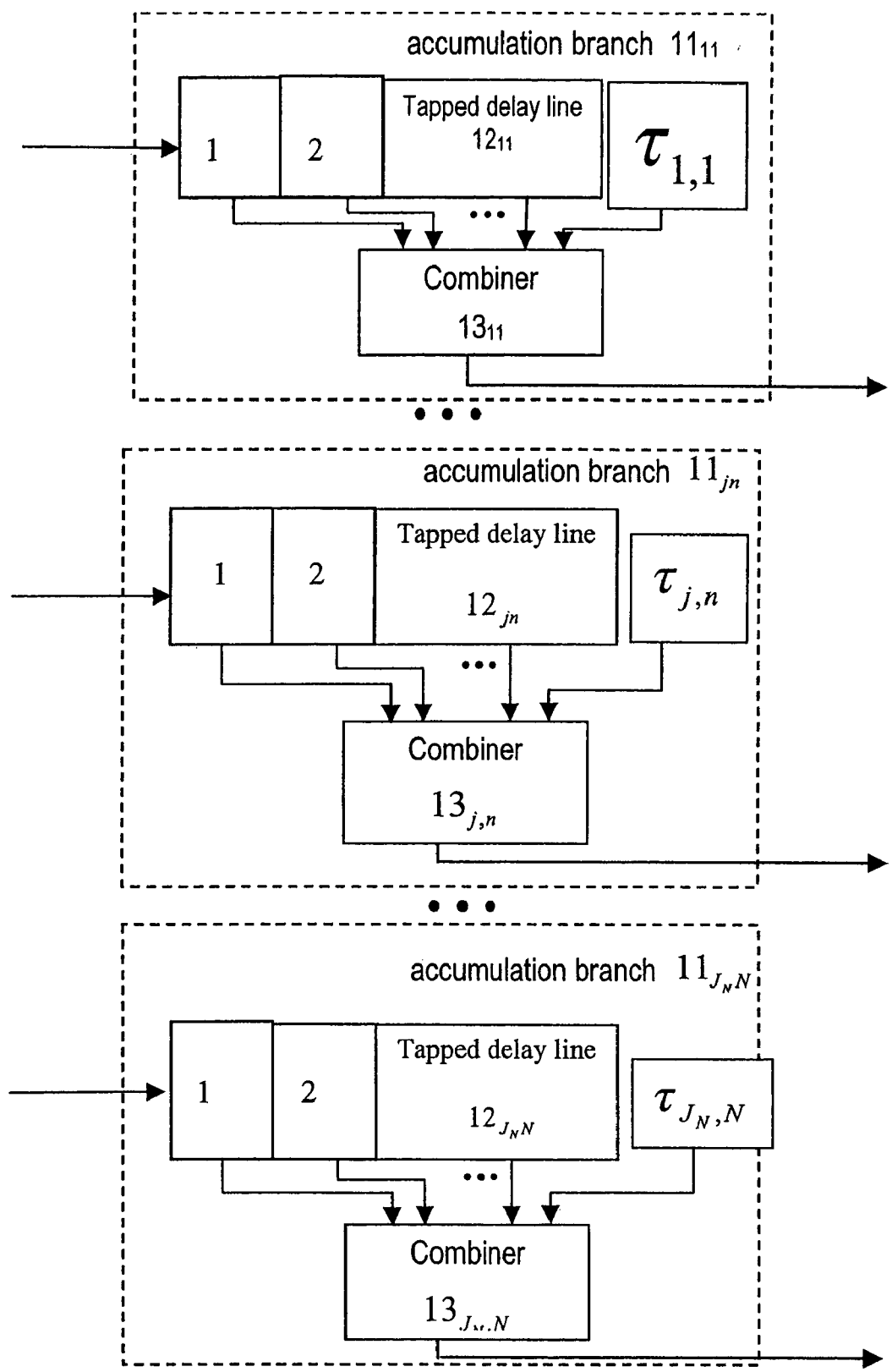
FIG. 4 is accumulator 2.

Accumulator 2 for the filed device as per FIG. 4 in the present embodiment comprises $$\sum_{n=1}^{N} J_n$$

accumulation branches $11_{11}$–$11_{J_NN}$ that accumulate the complex correlation responses of signals of all the user pilot channel paths. Each accumulation branch $11_{jn}$, n taking the integer values of 1 to N, j taking the integer values of 1 to $J_n$, comprises tapped delay line $12_{jn}$ and combiner $13_{jn}$. The inputs of delay line $12_{11}$–$12_{J_NN}$ in each accumulation branch make up the inputs of accumulator 2; the outputs of tapped delay line $12_{11}$–$12_{J_NN}$ in each accumulation branch are coupled with the inputs of combiners $13_{11}$–$13_{J_NN}$. The outputs of combiners $13_{11}$–$13_{J_NN}$ of all the accumulation branches $11_{11}$–$11_{J_NN}$ make up the outputs of accumulator 2.

Figure 5:
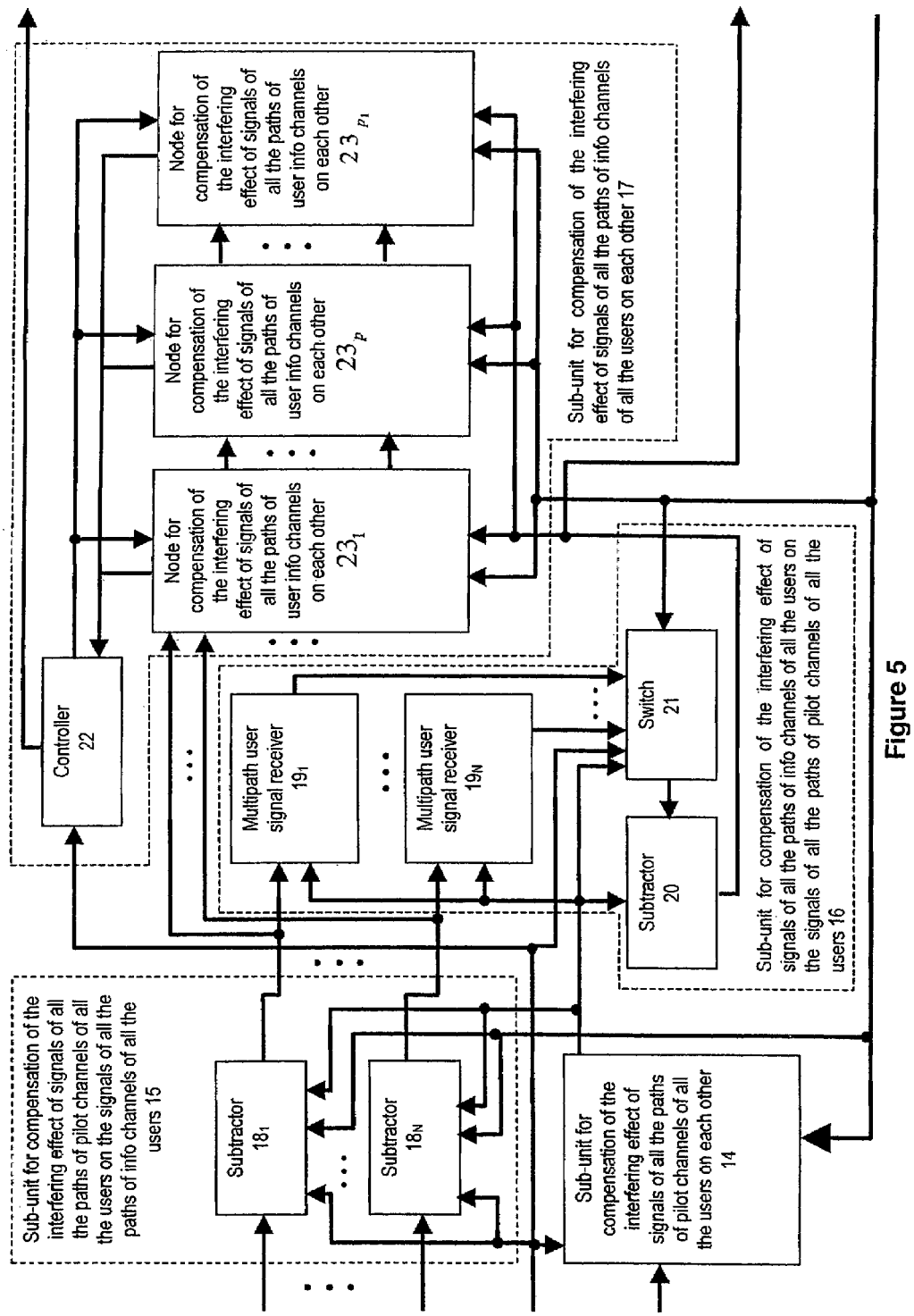
FIG. 5 is first signal processing unit $3_1$.

First signal processing unit $3_1$ comprising according to FIG. 5 in the present embodiment sub-unit 14 for compensation of the interfering effect of signals of all the user pilot channel paths on each other, sub-unit 15 for compensation of the interfering effect of signals of all the user pilot channel paths on the signals of all the user info channel paths, sub-unit 16 for compensation of the interfering effect of signals of all the user info channel paths on the signals of all the user pilot channel paths, and sub-unit 17 for compensation of the interfering effect of signals of all the user info channel paths on each other carries out formation of soft decisions about the info parameters of signals from all the user info channels through $P_1$ stages.

The first inputs of unit $3_1$ are formed by the first inputs of sub-unit 15 for compensation of the interfering effect of signals of all the user pilot channel paths on the signals of all the user info channel paths; the second inputs of unit $3_1$ are formed by the first inputs of sub-unit 14 for compensation of the interfering effect of signals of all the user pilot channel paths on each other; the third inputs of unit $3_1$ are formed by the second inputs of sub-unit 15 for compensation of the interfering effect of signals of all the user pilot channel paths on the signals of all the user info channel paths, the second inputs of sub-unit 14 for compensation of the interfering effect of signals of all the user pilot channel paths on each other, the first inputs of sub-unit 16 for compensation of the interfering effect of signals of all the user info channel paths on the signals of all the user pilot channel paths, and the first inputs of sub-unit 17 for compensation of the interfering effect of signals of all the user info channel paths on each other; the fourth inputs are formed by the third inputs of sub-unit 15 for compensation of the interfering effect of signals of all the user pilot channel paths on the signals of all the user info channel paths, the third inputs of sub-unit 14 for compensation of the interfering effect of signals of all the user pilot channel paths on each other, the second inputs of sub-unit 16 for compensation of the interfering effect of signals of all the user info channel paths on the signals of all the user pilot channel paths, and the second inputs of sub-unit 17 for compensation of the interfering effect of signals of all the user info channel paths on each other; the outputs of sub-unit 14 for compensation of the interfering effect of signals of all the user pilot channel paths on each other, forming at these output more accurate complex correlation responses of signals of all the user pilot channels, are joined to the fourth inputs of sub-unit 15 for compensation of the interfering effect of signals of all the user pilot channel paths on the signals of all the user info channel paths and third inputs of sub-unit 16 for compensation of the interfering effect of signals of all the user info channel paths on the signals of all the user pilot channel paths; the outputs of sub-unit 15 for compensation of the interfering effect of signals of all the user pilot channel paths on the signals of all the user info channel paths, forming at these outputs more accurate complex correlation responses of signals of all the user info channels, are connected to the fourth inputs of sub-unit 16 for compensation of the interfering effect of signals of all the user info channel paths on the signals of all the user pilot channel paths and to third inputs of sub-unit 17 for compensation of the interfering effect of signals of all the user info channel paths on each other; the outputs of sub-unit 16 for compensation of the interfering effect of signals of all the user info channel paths on the signals of all the user pilot channel paths, forming at these outputs the estimates of complex envelopes of signals from all the user paths, are linked to the forth inputs of sub-unit 17 for compensation of the interfering effect of signals of all the user info channel paths on each other are present second outputs of first signal processing unit $3_1$; the outputs of sub-unit 17 for compensation of the interfering effect of signals of all the user info channel paths on each other, forming at these outputs soft decisions about the info parameters of signals of all the user info channels, are the first outputs of first signal processing unit $3_1$.

Figure 6:
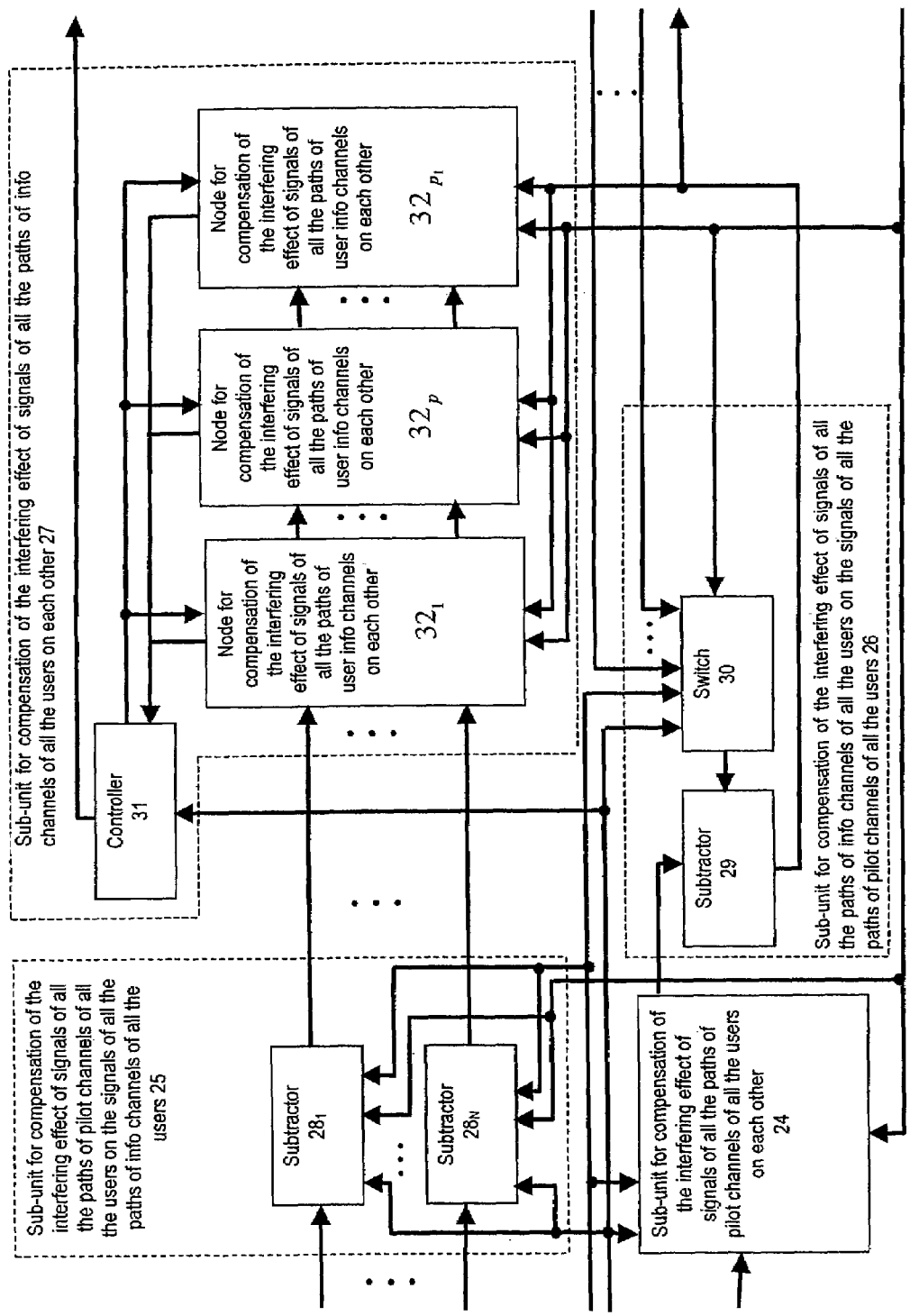
FIG. 6—l-th signal processing unit 3l, l taking the values of 1 to L.

Each subsequent signal processing unit $3_l$ according to FIG. 6 in the present embodiment comprising sub-unit 24 for compensation of the interfering effect of signals of all the user pilot channel paths on each other, sub-unit 25 for compensation of the interfering effect of signals of all the user pilot channel paths on the signals of all the user info channel paths, sub-unit 26 for compensation of the interfering effect of signals of all the user info channel paths on the signals of all the user pilot channel paths, and sub-unit 27 for compensation of the interfering effect of signals of all the user info channel paths on each other, carries out formation of the soft-decisions about the info parameters of signals of all the user info channels through $P_l$ stages, where/is the number of signal processing unit taking the values of 1 to L. The first inputs of unit $3_l$ are formed by the first inputs of sub-unit 25 for compensation of the interfering effect of signals of all the user pilot channel paths on the signals of all the user info channel paths. The second inputs of unit $3_l$ are formed by the first inputs of sub-unit 24 for compensation of the interfering effect of signals of all the user pilot channel paths on each other. The third inputs of unit $3_l$ are formed by the second inputs of sub-unit 25 for compensation of the interfering effect of signals of all the user pilot channel paths on the signals of all the user info channel paths, the second inputs of sub-unit 24 for compensation of the interfering effect of signals of all the user pilot channel paths on each other, the first inputs of sub-unit 26 for compensation of the interfering effect of signals of all the user info channels, and the first inputs of sub-unit 27 for compensation of the interfering effect of signals of all the user info channel paths on each other. The fourth inputs of unit $3_l$ are formed by the third inputs of sub-unit 25 for compensation of the interfering effect of signals of all the user pilot channel paths on the signals of all the user info channel paths, the third inputs of sub-unit 24 for compensation of the interfering effect of signals of all the user pilot channel paths on each other, the second inputs of sub-unit 26 for compensation of the interfering effect of signals of all the user info channel paths on the signals of all the user pilot channel paths, and the second inputs of sub-unit 27 for compensation of the interfering effect of signals of all the user info channel paths on each other. The fifth inputs of unit $3_l$ are formed by the third inputs of sub-unit 26 for compensation of the interfering effect of signals of all the user info channel paths on the signals of all the user pilot channel paths. The sixth inputs of unit $3_l$ are formed by the fourth inputs of sub-unit 25 for compensation of the interfering effect of signals of all the user pilot channel paths on the signals of all the user info channel paths, the fourth inputs of sub-unit 24 for compensation of the interfering effect of signals of all the user pilot channel paths on each other, and the fourth inputs of sub-unit 26 for compensation of the interfering effect of signals of all the user info channel paths on the signals of all the user pilot channel paths. The outputs of sub-unit 24 for compensation of the interfering effect of signals of all the user pilot channel paths on each other, forming at these outputs more accurate complex correlation responses of signals of all the user pilot channel paths, are joined to the fifth inputs of sub-unit 26 for compensation of the interfering effect of signals of all the user info channel paths on the signals of all the user pilot channel paths. The outputs of sub-unit 25 for compensation of the interfering effect of signals of all the user pilot channel paths on the signals of all the user info channel paths, forming at these outputs more accurate complex correlation responses of all the user info channel paths, are coupled to the third inputs of sub-unit 27 for compensation of the interfering effect of signals of all the user info channel paths on each other. The outputs of sub-unit 26 for compensation of the interfering effect of signals of all the user info channel paths on the signals of all the user pilot channel paths, forming at these outputs the estimates of complex envelopes of signals of all the user paths, are connected to the fourth inputs of sub-unit 27 for compensation of the interfering effect of signals of all the user info channel paths on each other and to each signal processing unit except the last L-th one are the second outputs of unit $3_l$. The outputs of sub-unit 27 for compensation of the interfering effect of signals of all the user info channel paths on each other, forming at these outputs soft decisions about the info parameters of signals of all the user info channels, are the first outputs of signal processing unit $3_l$. The outputs of the last L-th signal processing unit $3_L$ are the outputs of the device.

Figure 7:
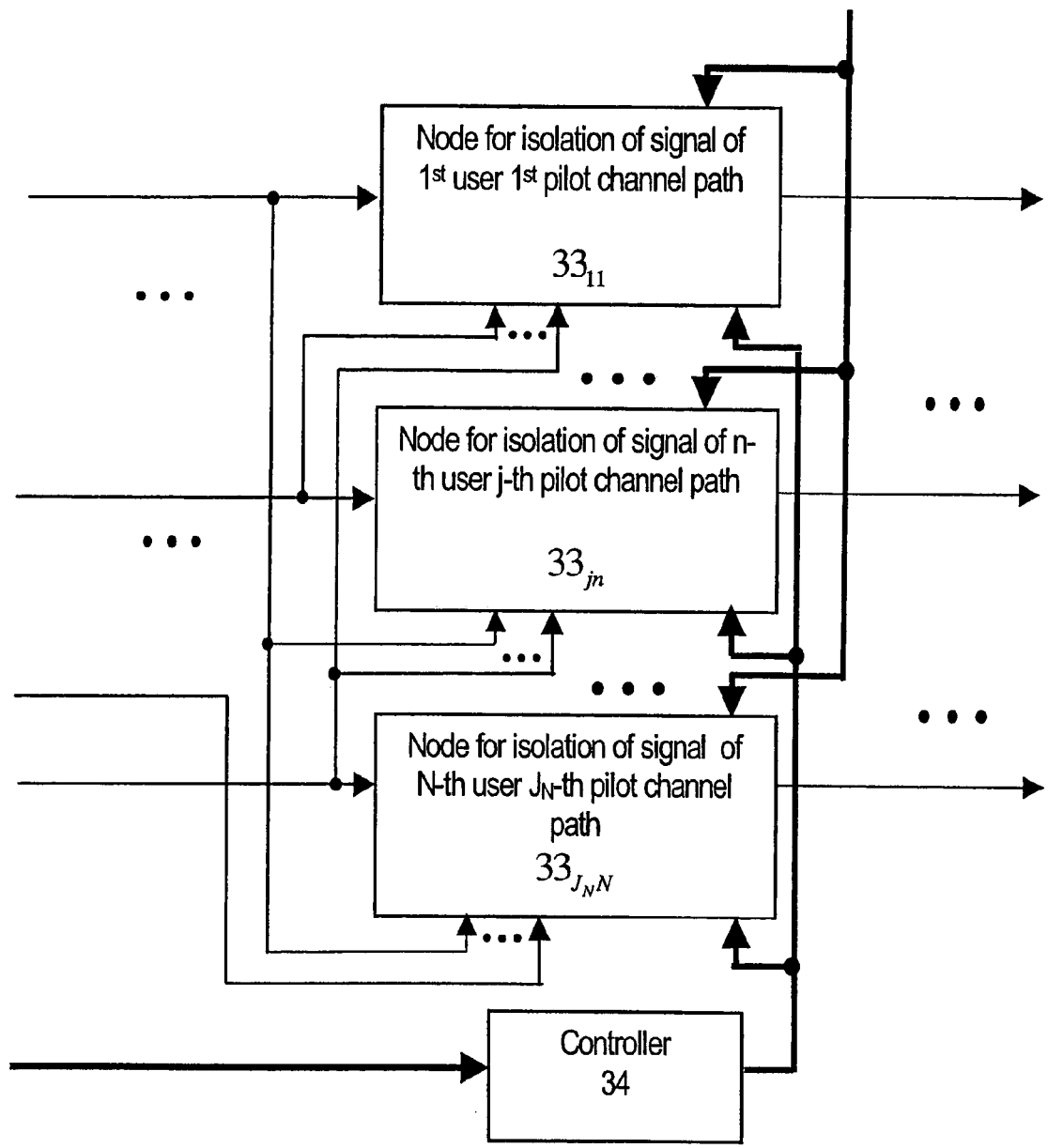
FIG. 7 is sub-unit 14 for compensation of the interfering effect of signals of all the user pilot channel paths on each other.

Sub-unit 14 for compensation of the interfering effect of signals of all the paths of pilot channels of all the users on each other of signal processing unit $3_1$ according to FIG. 7 in the present embodiment comprises $$\sum_{n=1}^{N} J_n$$

parallel nodes $33_{11}$–$33_{J_NN}$ for isolation of signal of each pilot channel path of each user and controller 34.

Figure 8:
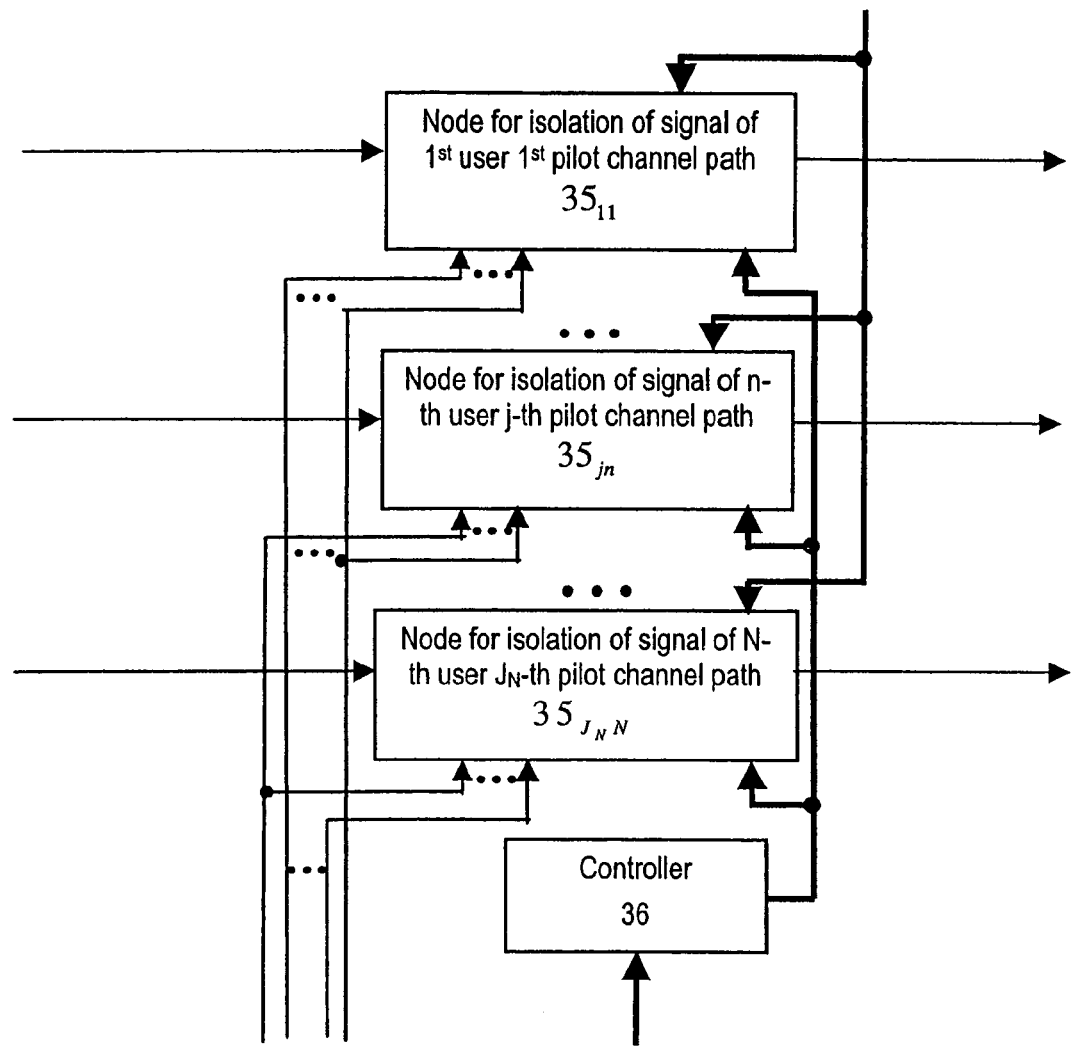
FIG. 8 is sub-unit 24 for compensation of the interfering effect of signals of all the pilot channel paths of all the users on each other.

Sub-unit 24 for compensation of the interfering effect of signals of all the paths of pilot channels of all the users on each other of signal processing unit $3_l$ according to FIG. 8 in the current embodiment comprises $$\sum_{n=1}^{N} J_n$$

parallel nodes $35_{11}$–$35_{J_NN}$ for isolation of signal of each pilot channel path of each user and controller 36.

Figure 9:
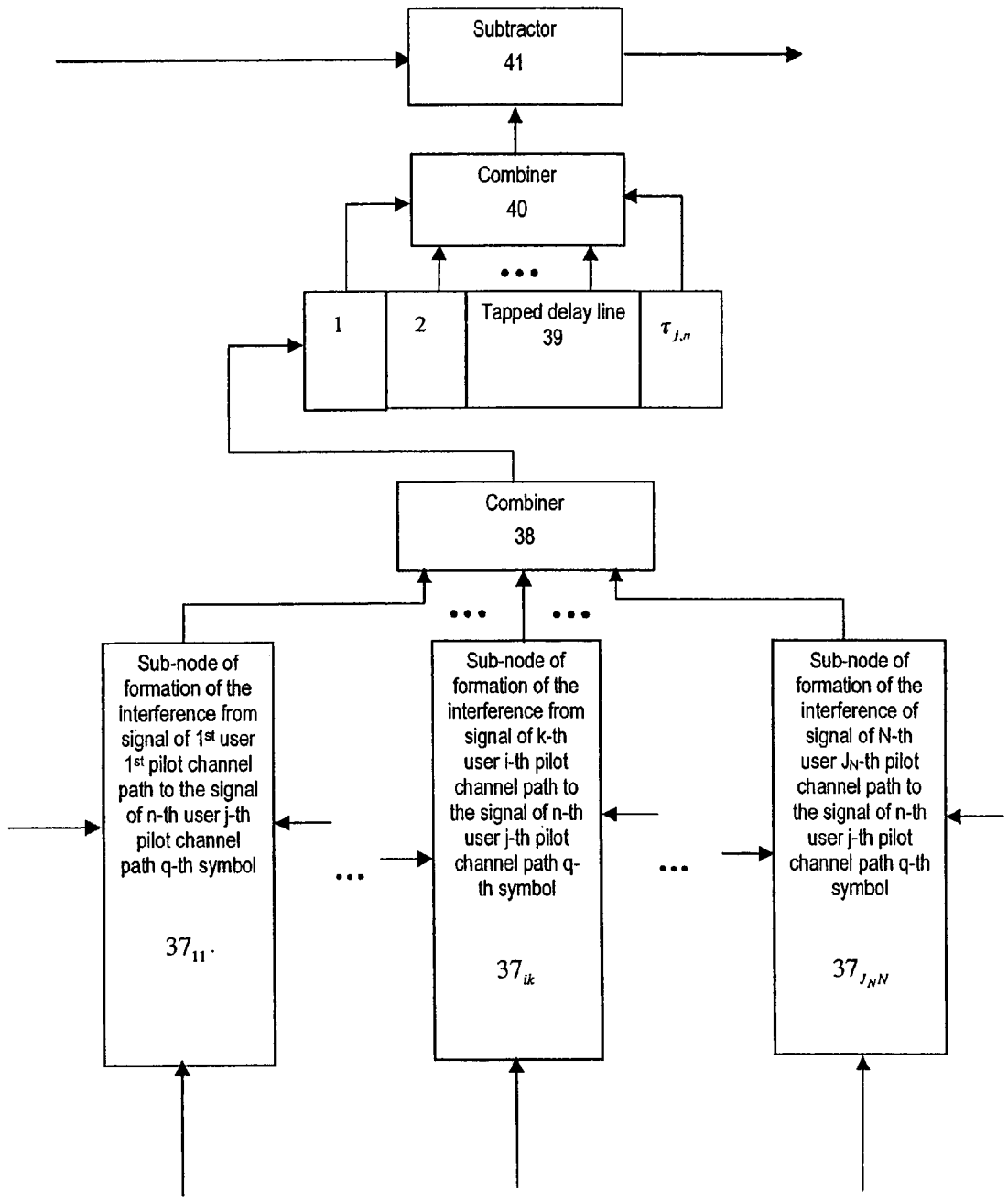
FIG. 9—is node $33_{jn}$ for isolation of signal from the j-th pilot channel path of the n-th user of first signal processing unit $3_1$ (or node $35_{jn}$ for isolation of signal from the j-th pilot channel path of the n-th user of the l-th signal processing unit 3l, which is similar to node $33_{jn}$)

Nodes $33_{11}$–$33_{J_NN}$ and $35_{11}$–$35_{J_NN}$ are accomplished in a similar way. In the described embodiment FIG. 9 present the block diagram of node $33_{jn}$ (or $35_{jn}$) for isolation of signal n-th user j-th pilot channel path. According to the present embodiment node $33_{jn}$ in is composed of $$\sum_{n=1}^{N} J_n - 1$$

sub-units $37_{ik}$ of formation of the interference from signal of k-th user i-th pilot channel path to the signal of n-th user j-th pilot channel path q-th symbol, k taking the values of 1 to N, i taking the values of 1 to $J_k$, except simultaneous meeting of the equalities i=j, k=n; combiner 38; tapped delay line 39; combiner 40; subtractor 41.

Figure 10:
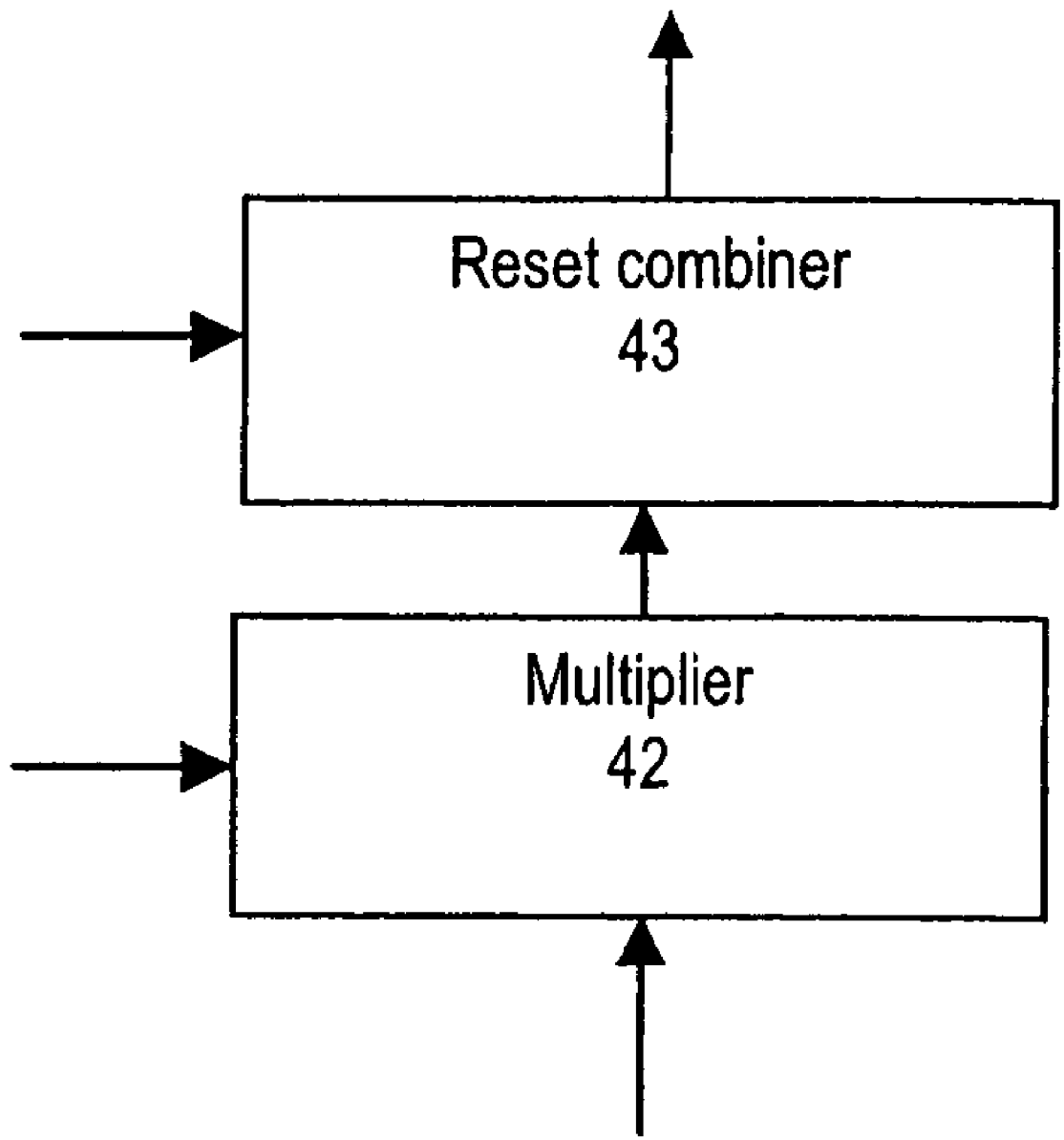
FIG. 10 is sub-unit $37_{ik}$ of formation of interference the signal of the i-th pilot channel path of the k-th user to the signal of the q-th symbol of the j-th pilot channel path of the n-th user of node $33_{jn}$ (or node $35_{jn}$, which is similar to node $35_{jn}$)

Sub-unit $37_{ik}$ of formation of the interference from signal of k-th user i-th pilot channel path to the signal of n-th user j-th pilot channel path q-th symbol according to FIG. 10 in the present embodiment comprises multiplier 42 and reset combiner 43.

Sub-unit 15 for compensation of the interfering effect of signals of all the user pilot channel paths on the signals of all the user info channel paths of unit $3_1$ according to FIG. 5 in the present embodiment comprises N parallel subtractors $18_1$–$18_N$.

Sub-unit 25 for compensation of the interfering effect of signals of all the user pilot channel paths on the signals of all the user info channel paths of unit $3_l$, l taking the integer values of 2 to L, according to FIG. 6 in the present embodiment N parallel subtractors $28_1$–$28_N$.

Figure 11:
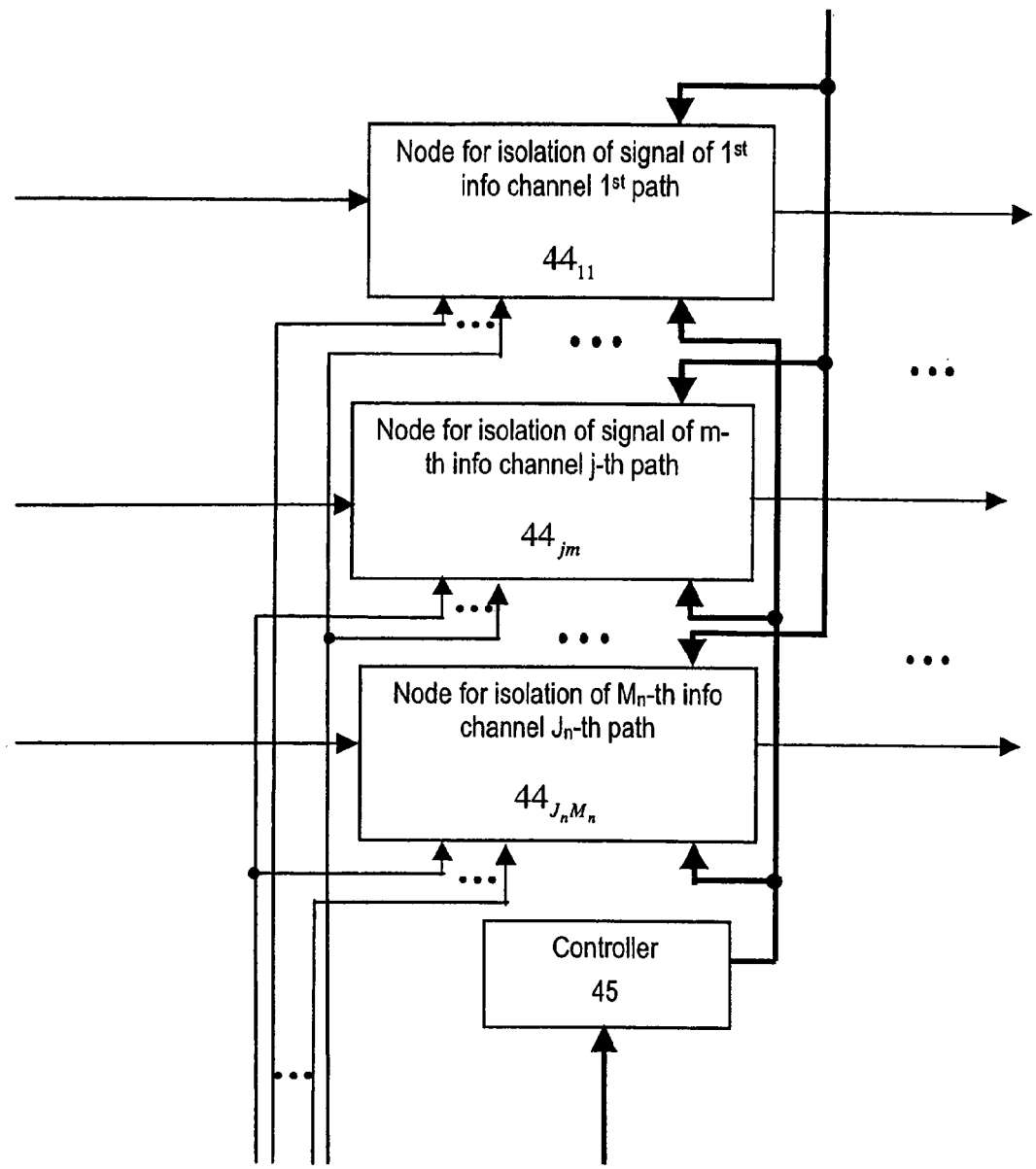
FIG. 11 is subtractor $18_n$ of sub-unit 15 of unit $3_1$ (or subtractor $28_n$ of sub-unit 25 of unit 3l.), this block diagram is given as an exemplary embodiment of subtractors $18_1$–$18_N$ and $28_1$–$28_N$, accomplished similarly.

Subtractors $18_1$–$18_N$ and $28_1$–$28_N$ are accomplished similarly. As an exemplary embodiment FIG. 11 shows the block diagram of subtractor $18_n$ (or $28_n$). Subtractor $18_n$ in the present embodiment comprises $J_nM_n$ nodes $44_{jm}$ for isolation of m-th info channel j-th path, and controller 45.

Figure 12:
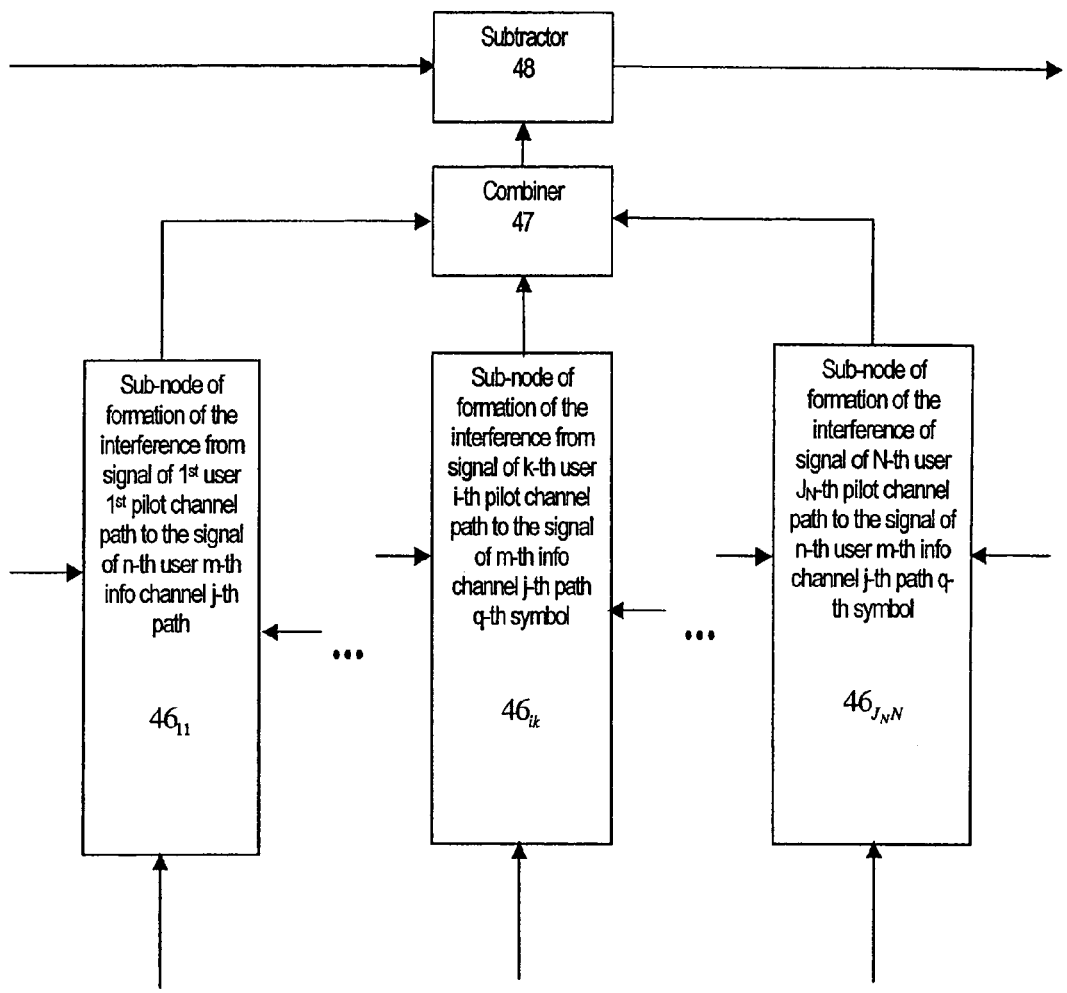
FIG. 12 is node $44_{jm}$ for isolation of signal from the j-th path of the m-th info channel of subtractor $18_n$ of sub-unit 15 and subtractor $28_n$ of sub-unit 25.

Node $44_{jm}$ for isolation of signal of m-th info channel j-th path according to FIG. 12 in the current embodiment comprises $$\sum_{n=1}^{N} J_n - 1$$

sub-units $46_{ik}$ of formation of the interference from signal of k-th user i-th path to the signal of n-th user m-th info channel j-th path q-th symbol, k taking the integer values of 1 to N, i taking the integer values of 1 to $J_k$, except simultaneous meeting the equalities of i=j, k=n; combiner 47, and subtractor 48.

Figure 13:
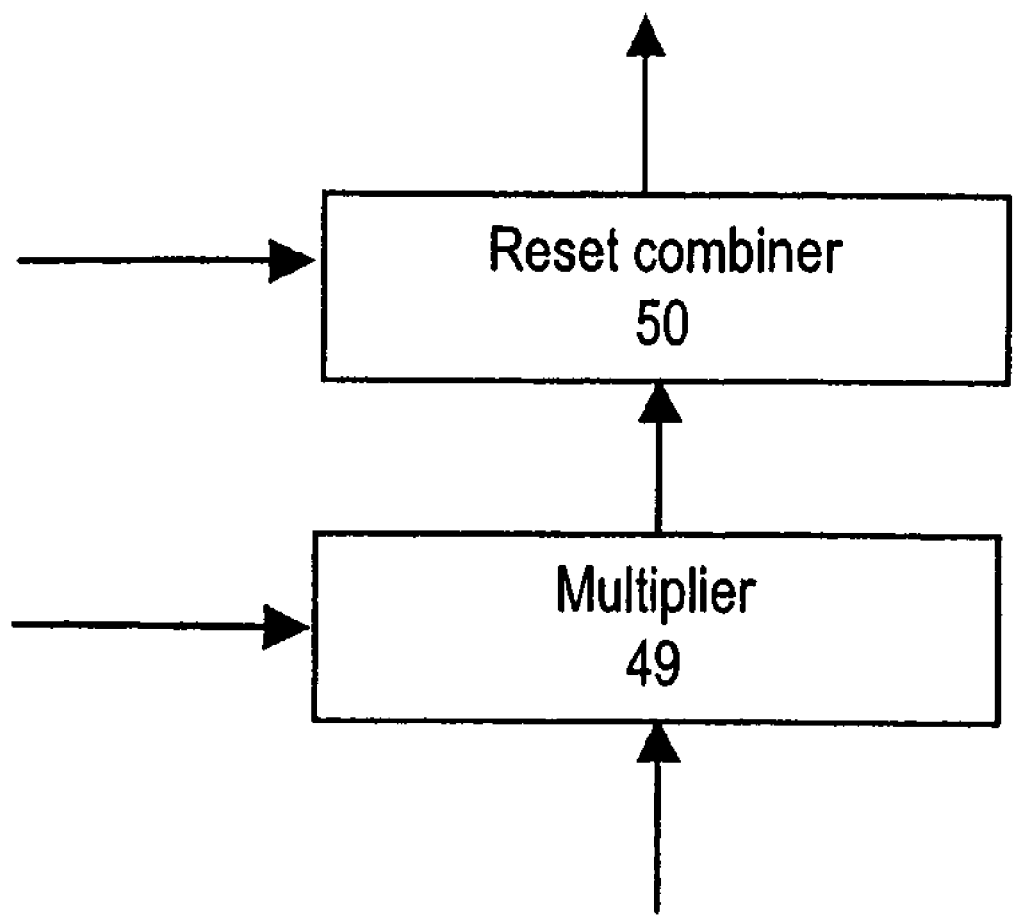
FIG. 13 is sub-unit $46_{ik}$ of formation of the interference of the signal of the s-th bit of the i-th pilot channel path of the k-th user to the info signal of the q-th symbol of the j-th path of the m-th info channel of the n-th user of node $44_{jm}$.

Sub-unit $46_{ik}$ of formation of the interference from signal of k-th user i-th path to the signal of n-th user m-th info channel j-th path q-th symbol according to FIG. 13 in the present embodiment comprises multiplier 49 and reset combiner 50.

Sub-unit 16 for compensation of the interfering effect of signals of all the user info channel paths on the signals of all the user pilot channel paths of unit $3_1$ (FIG. 5) comprise N parallel multipath user signal receivers $19_1$–$19_N$, subtractor 20, and switch 21.

Sub-unit 26 for compensation of the interfering effect of signals of all the user info channel paths on the signals of all the user pilot channel paths of unit $3_l$, where l taking the integer values of 2 to L, according to FIG. 6 in the present embodiment comprises subtractor 29 and switch 30.

Figure 14:
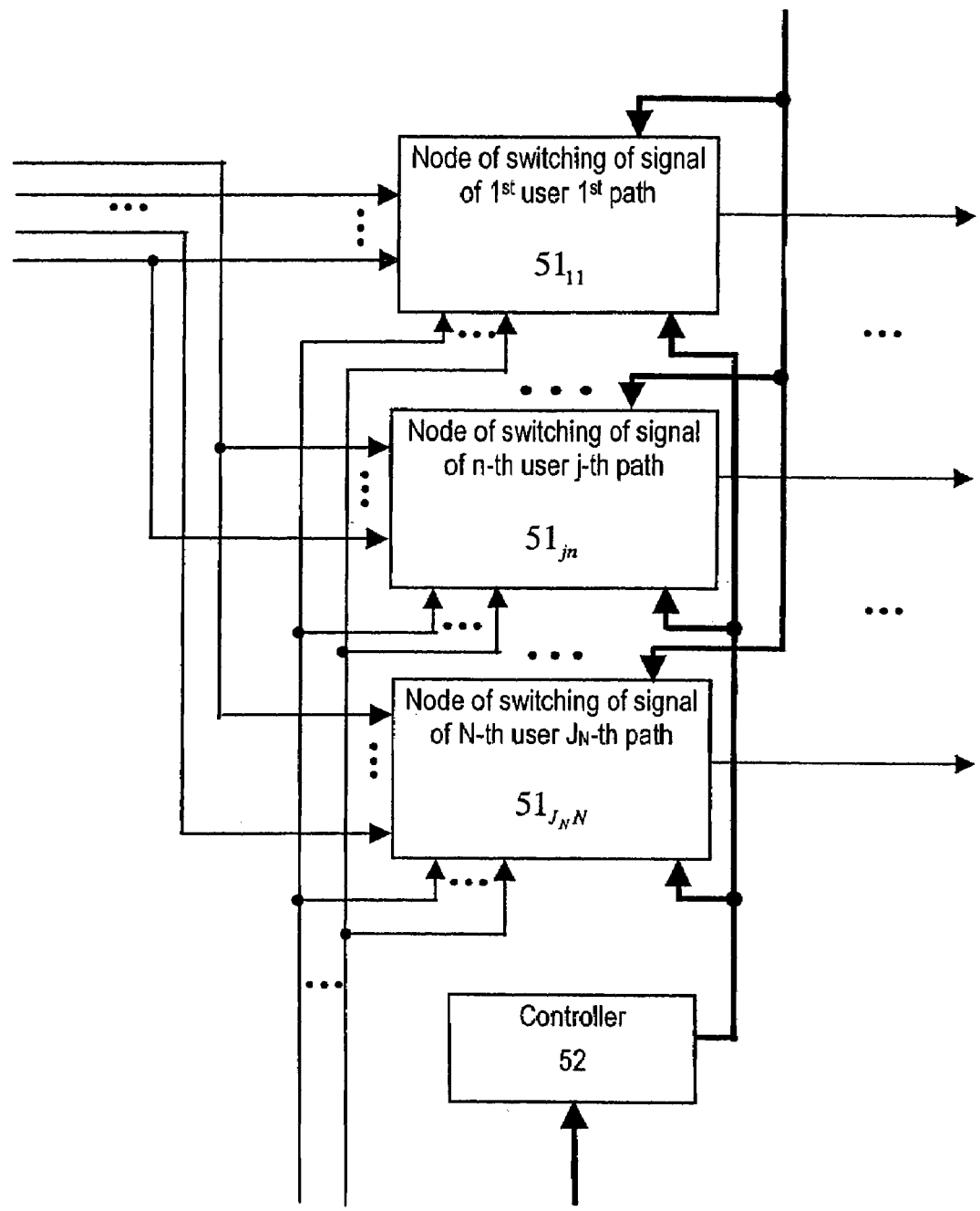
FIG. 14 is switch 21 of sub-unit 16 (or switch 30 of sub-unit 26 accomplished similarly to switch 21)

Note that switch 21 of sub-unit 16 and switch 30 of sub-unit 26 are accomplished similarly. As an exemplary embodiment FIG. 14 shows the block diagram of switch 21 (or 30). Switch 21 according to FIG. 14 in the present embodiment comprises $$\sum_{n=1}^{N} J_n$$

nodes $51_{jn}$ of n-th user j-th signal switching, n taking the integer values of 1 to N, j taking the integer values of 1 to $J_n$, and controller 52.

Node $51_{jn}$ of n-th user j-th path signal switch according to FIG. 5 in the present embodiment comprises $$\sum_{nl=1}^{N} (J_{nl}M_{nl}) - M_n$$

sub-nodes $53_{imk}$ of formation of the interference from signal of k-th user m-th info channel i-th path to the signal of n-th user j-th pilot channel path q-th symbol, where k taking the integer values of 1 to N, i taking the integer values of 1 to $J_k$, m taking the integer values of 1 to $M_k$, except simultaneous meeting the equalities of i=j, k=n, and combiner 54.

Figure 16:
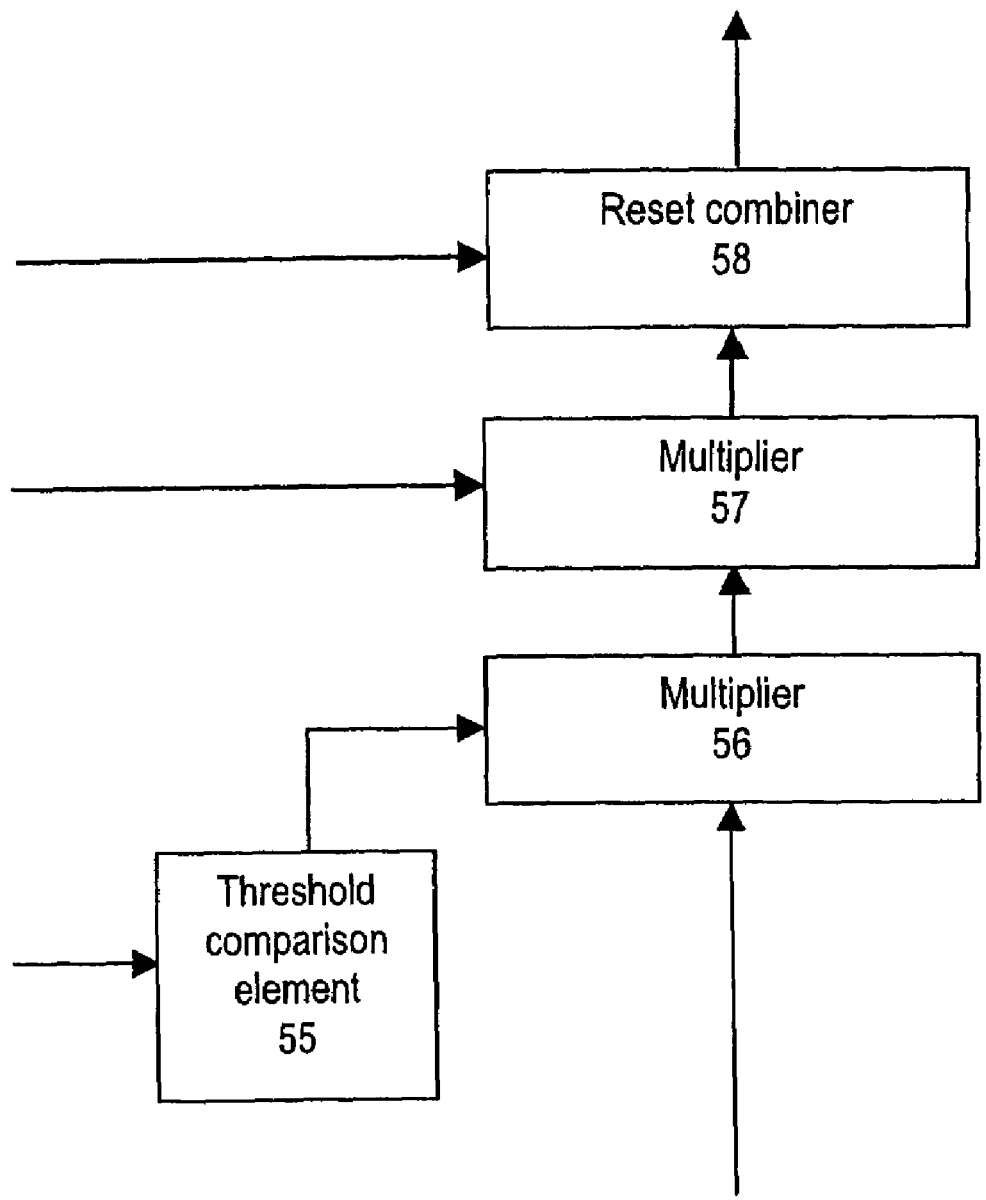
FIG. 16 is sub-node $53_{imk}$ of former of k-th user m-th info channel i-th path signal interference to the signal of n-th user pilot channel j-th path q-th symbol of switching node $51_{jn}$ of switch 21 of sub-unit 16 and switch 30 of sub-unit 26.

An exemplary embodiment of sub-node $53_{imk}$ shown on FIG. 16 in comprises threshold comparison element 55, multipliers 56, 57, and reset combiner 58.

Figure 17:
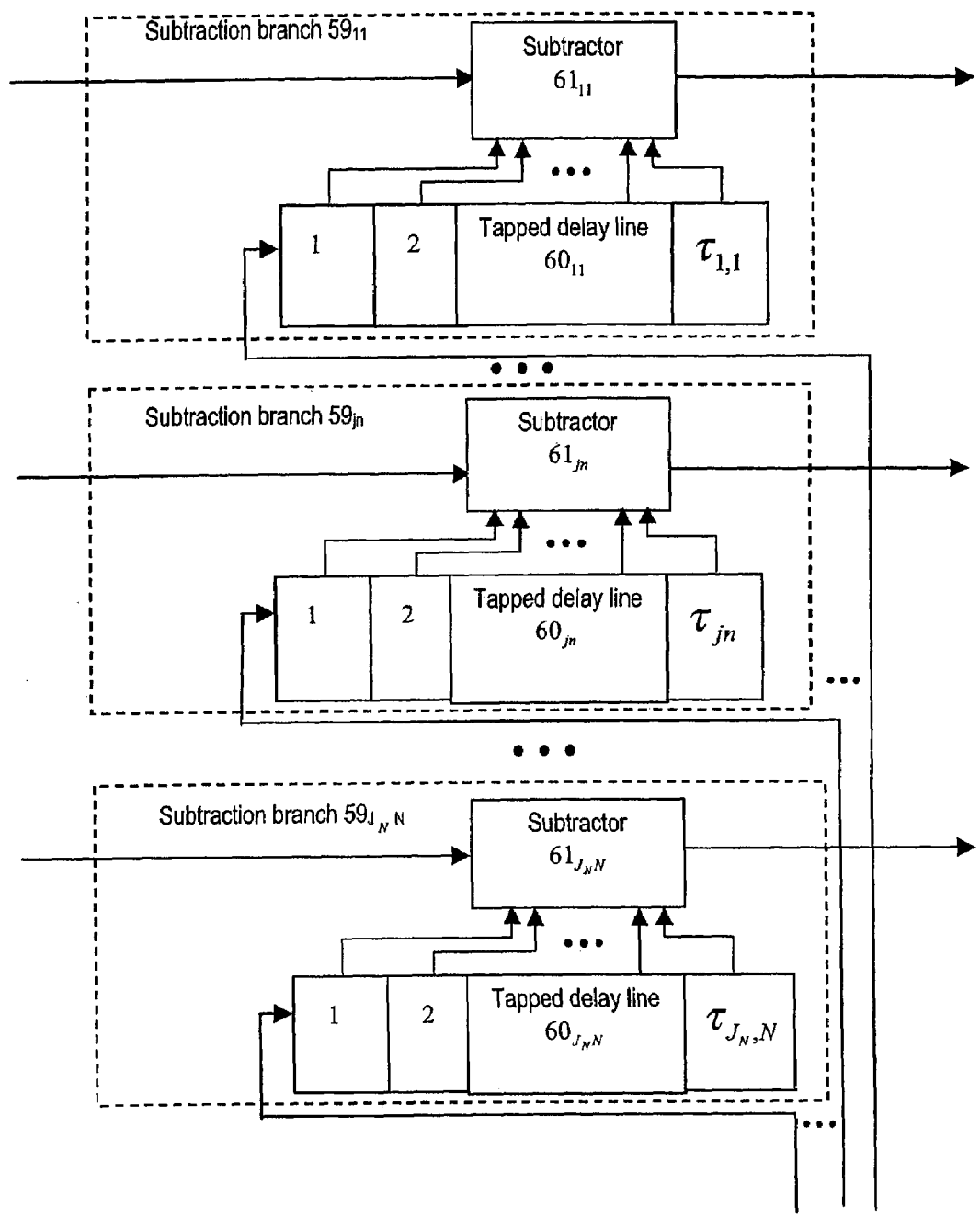
FIG. 17 is subtractor 20 of sub-unit 16 (or subtractor 29 of sub-unit 26, which is accomplished similarly to subtractor 20 of sub-unit 16)

Subtractor 20 of sub-unit 16 and subtractor 29 of sub-unit 26 are accomplished similarly. As an exemplary embodiment FIG. 17 shows the block diagram of subtractor 20 (or 29). Subtractor 20 according to FIG. 17 in the present embodiment comprises $$\sum_{n=1}^{N} J_n$$

subtraction branches $59_{11}$–$59_{J_NN}$. Each subtraction branch $59_{jn}$ comprises tapped delay line $60_{jn}$ and subtractor $61_{jn}$.

Sub-unit 17 for compensation of the interfering effect of signals of all the user info channel paths-on each other of unit $3_1$ according to FIG. 5 and sub-unit 27 for compensation of the interfering effect of signals of all the user info channel paths on each other of unit $3_l$ according to FIG. 6 are accomplished in the same way.

Sub-unit 17 according to FIG. 5 in the present embodiment comprises controller 22 and $P_1$ successively connected nodes for compensation of the interfering effect of signals of all the user info channel paths on each other $23_1$–$23_{P_1}$.

Sub-unit 27 of FIG. 6 comprises controller 31 and $P_l$ successively connected nodes for compensation of the interfering effect of signals of all the user info channel paths on each other $32_1$–$32_{P_l}$.

Figure 18:
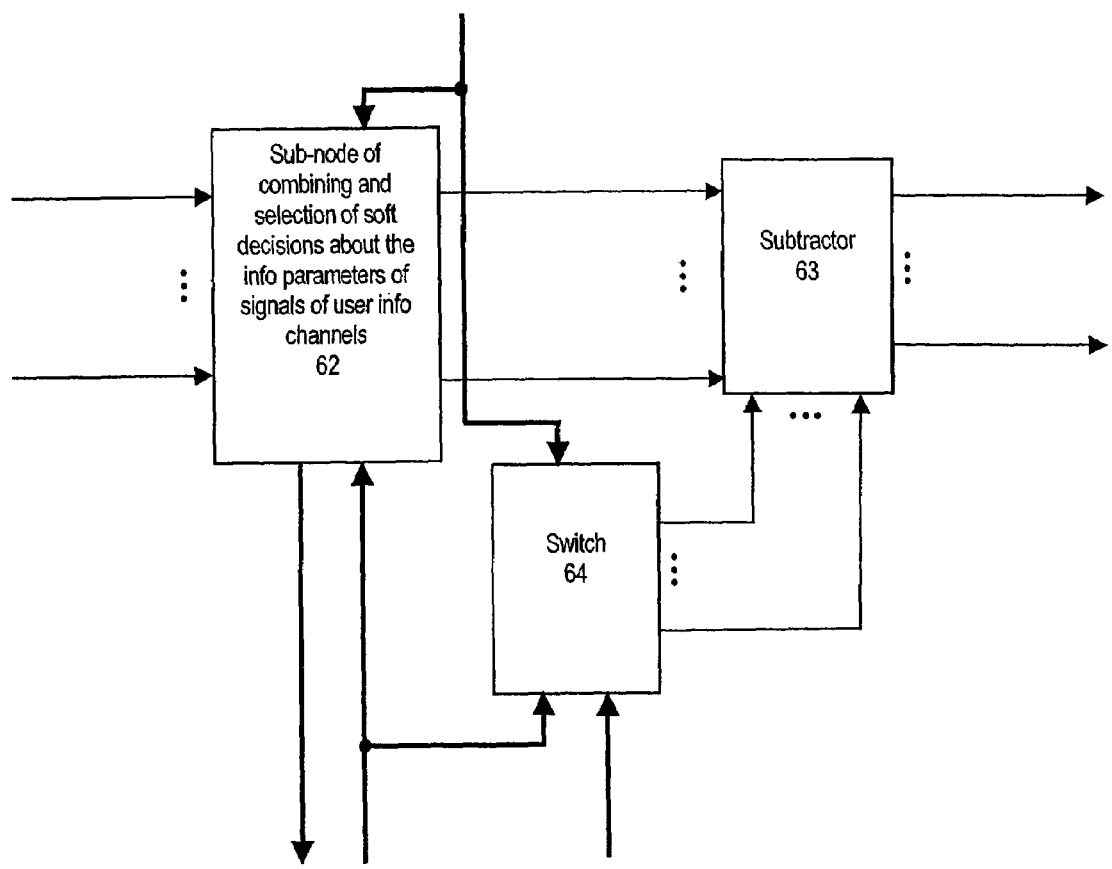
FIG. 18 is node $23_p$ for compensation of the interfering effect of signals of all the user info channel paths on each other of sub-unit 15 of unit $3_1$ or node $32_p$ for compensation of the interfering effect of signals of all the user info channel paths on each other of sub-unit 25 of unit 3l, the block diagram is given as an exemplary embodiment of nodes $23_1$–$23_{P_1}$ and $32_1$–$32_{P_1}$, accomplished similarly.

Nodes $23_i$–$23_{P_1}$ and $32_1$–$32_{P_l}$ are accomplished in the same way. As an exemplary embodiment FIG. 18 shows the block diagram of node $23_p$ (or $32_p$). Node $23_p$ of FIG. 18 in the present embodiment comprises sub-node 62 of combining and selection of the soft decisions about the info parameters of user info channel signals, subtractor 63, and switch 64.

Figure 19:
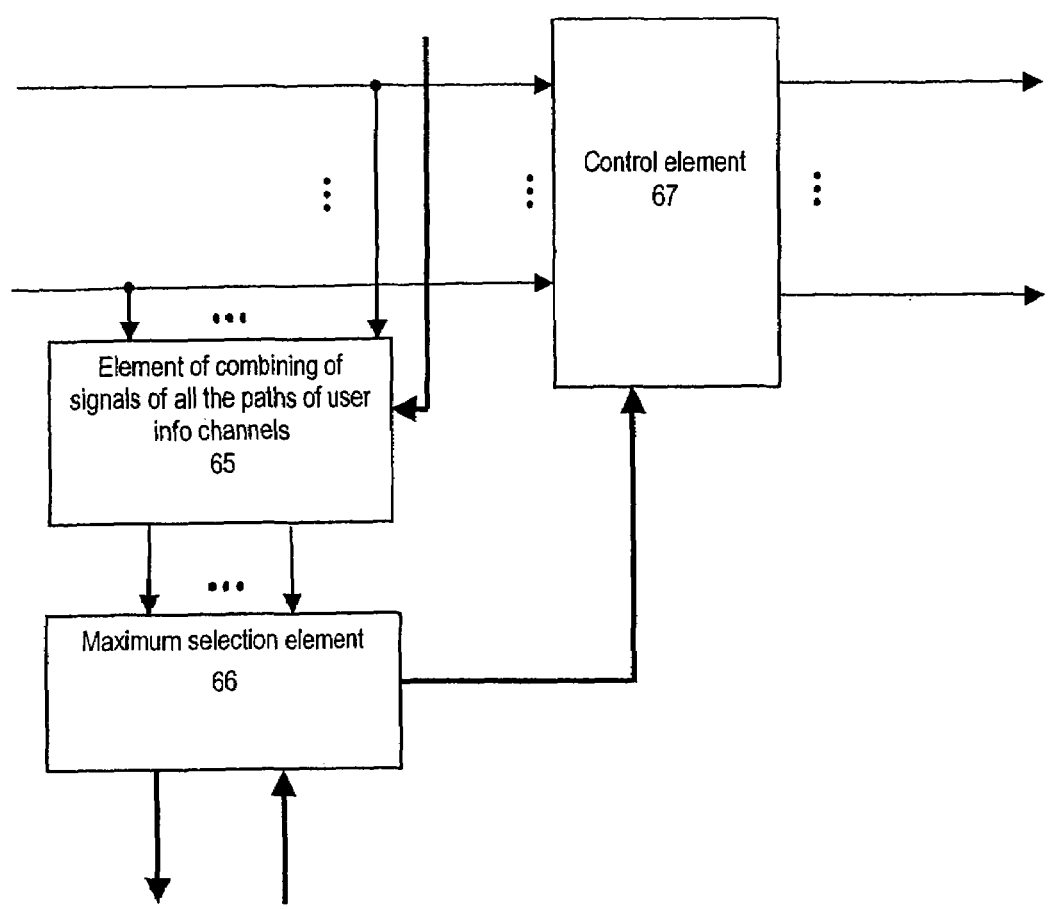
FIG. 19 is sub-node $62_p$ for combining and selection of soft decisions about the info parameters of signals from user info channels of node $23_p$ or node $32_p$ accomplished similarly.

Sub-node 62 of combining and selection of the soft decisions about the info parameters of user info channel signals of FIG. 19 in the present embodiment comprises user info channel path combining element 65, maximum selection element 66, and control element 67.

Figure 20:
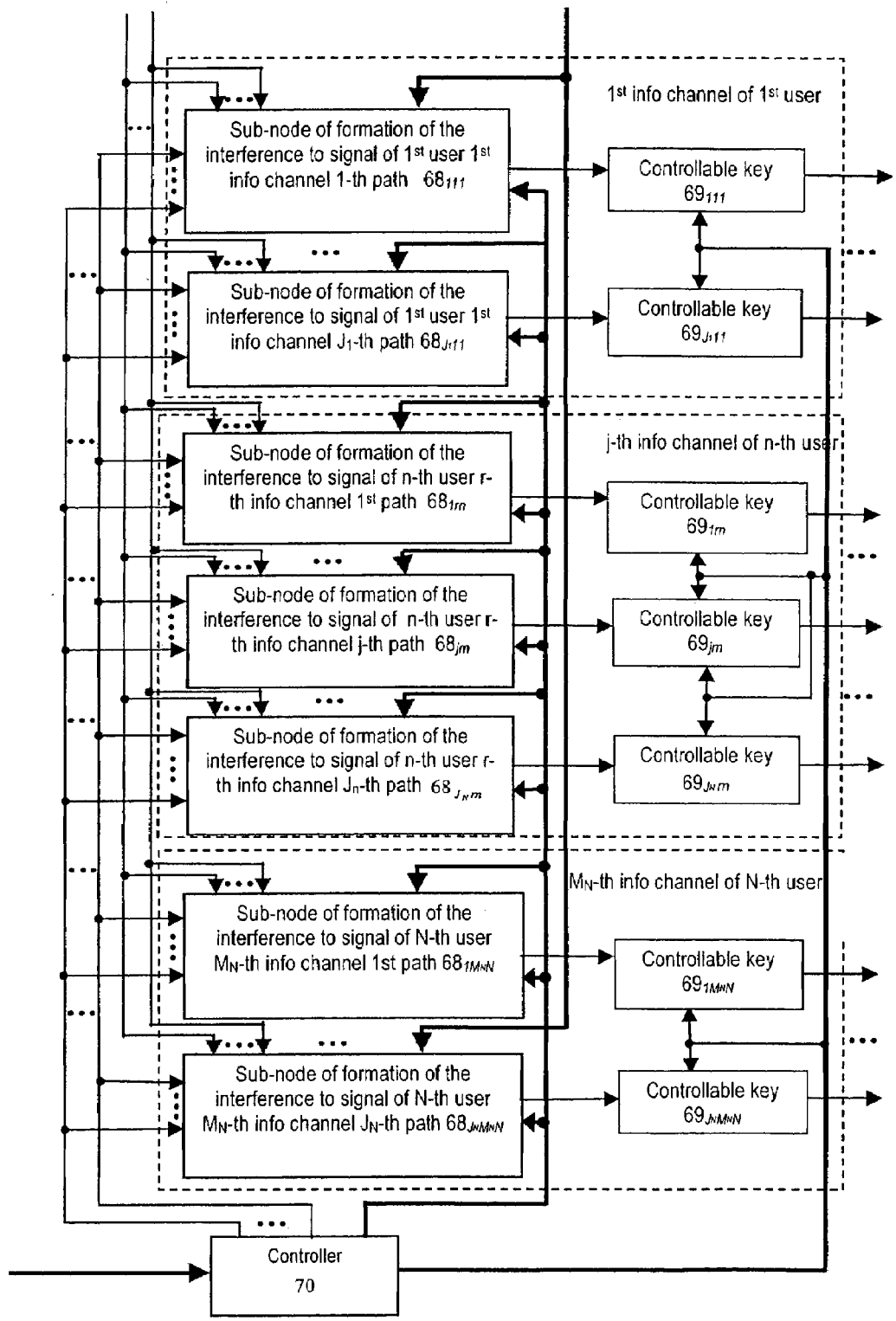
FIG. 20 is switch $64_p$ of nodes $23_p$ and $32_p$.

Switch 64 of FIG. 20 according to the present embodiment comprises $$\sum_{n=1}^{N} J_n M_n$$

sub-nodes $68_{jrn}$ of formation of the interference from signal of n-th user r-th info channel j-th path and the same number of controllable keys $65_{jrn}$ corresponding to them, where n takes the integer values of 1 to N, j takes the integer values of 1 to $J_n$, r takes the integer values of 1 to $M_n$, and controller 70.

Figure 21:
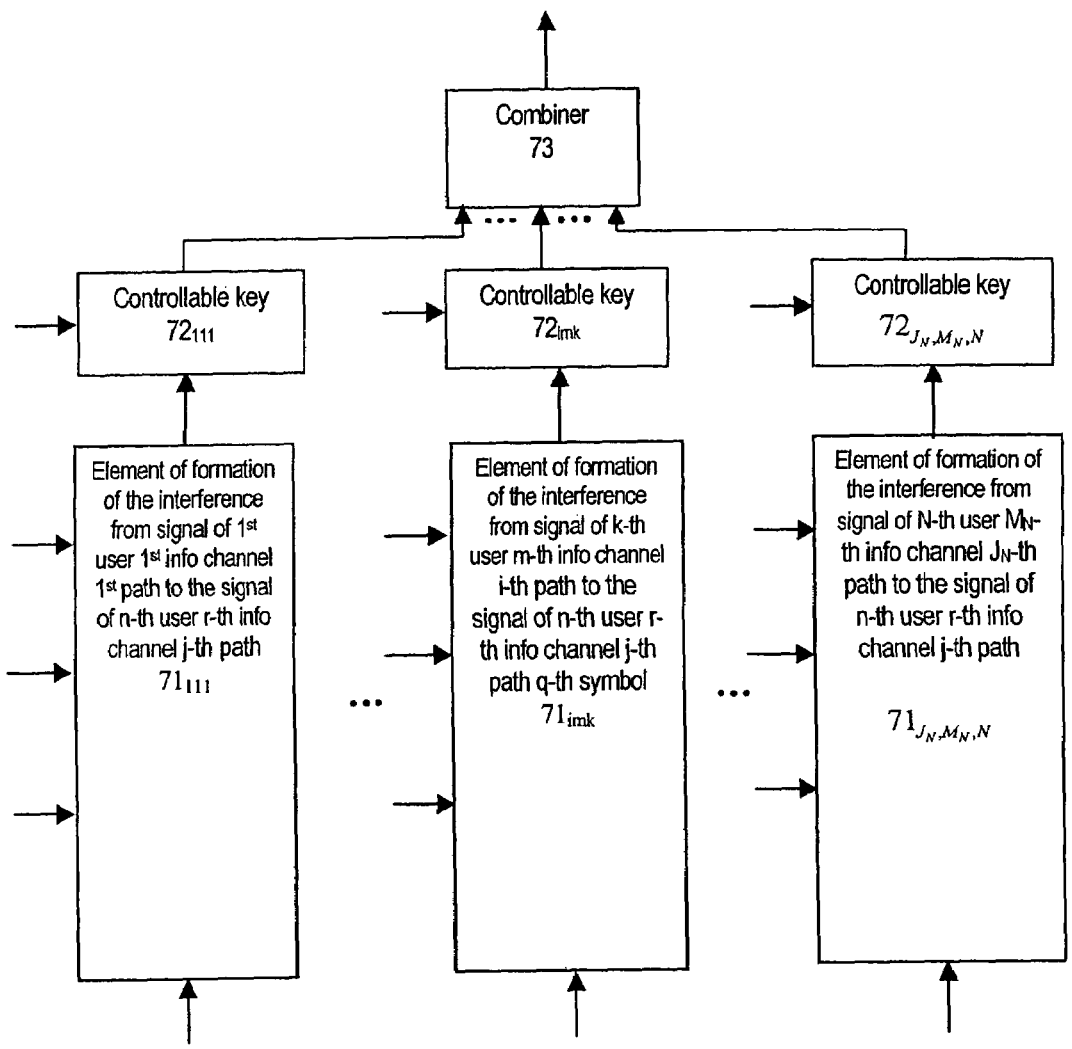
FIG. 21 is sub-node $68_{jrn}$ of formation of signal from j-th path of r-th info channel of n-th user of switch $64_p$.

Sub-node $68_{jrn}$ of formation of the interference from signal of n-th user r-th info channel of j-th path of FIG. 21 according to the present embodiment comprises $$\sum_{n=1}^{N} J_n M_n$$

elements $71_{imk}$ of formation of the interference from signal of k-th user m-th info channel i-th path to the signal of n-th user r-th info channel j-th path q-th bit, k taking the integer values of 1 to N, i taking the integer values of 1 to $J_k$, m taking the integer values of 1 to $M_k$, $$\sum_{n=1}^{N} J_n M_n$$

controllable keys $72_{imk}$, and combiner 73.

Figure 22:
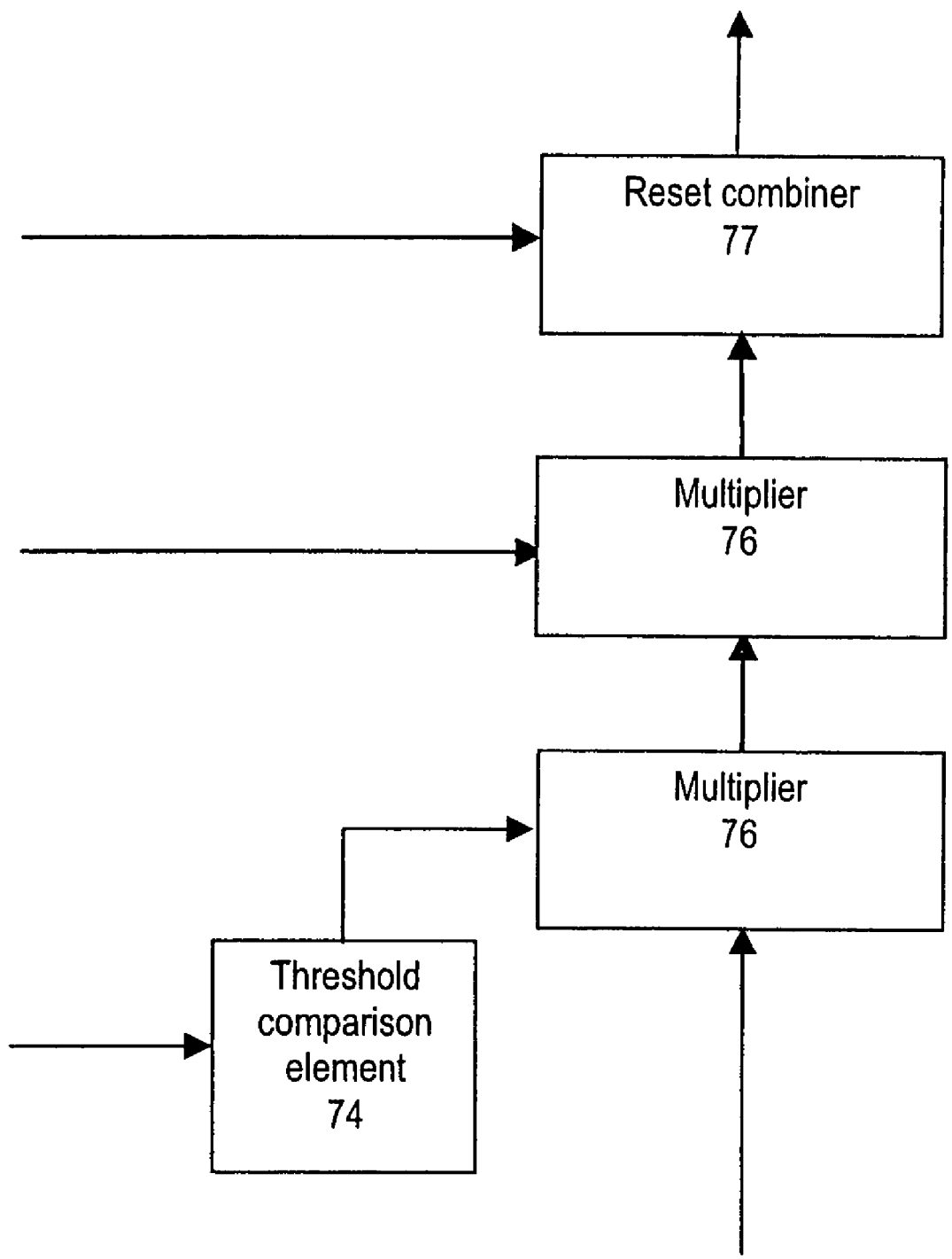
FIG. 22 is element $71_{ikm}$ of formation of k-th user m-th info channel i-th path signal interference to the signal of n-th user r-th info channel j-th path q-th symbol of sub-node $68_{jrn}$.

Element $71_{jmk}$ of formation of the interference from signal of k-th user m-th info channel i-th path to the signal of n-th user r-th info channel j-th path of FIG. 22 according to the present embodiment comprises threshold comparison element 74, multiplier 75 and 76, reset combiner 77.

Let us consider implementation of this method of multi-path signal receiving in a CDMA communications system. In order to make operation of the filed method more understandable, references will be made to the block diagrams of the filed device shown on FIGS. 1–22.

For example, there are N users in a CDMA communications system. Signal of each user composed of a collection of independently fading path signals comprises the pilot component and $M_n$ info components received via pilot and info channels respectively. The value n denotes user number and takes the integer values of 1 to N, there may be various data transmission rates in user info channels.

An additive mixture of user signals and noise is supplied to the input of demodulation unit 1 (FIG. 1). In demodulation unit 1 (FIG. 2) the additive mixture of user signals and noise is supplied to the first inputs of correlators $7_{11}$–$7_{J_NN}$ and to the first input of searcher 6.

Searcher 6 searches for the input signal detecting path signals of each user and transmits the information about intensity and time positions of path signals to the second inputs of controller 9.

Controller 9 controls operations of demodulation unit 1 and signal processing units $3_1$–$3_L$.

From the detected paths of each user controller 9 isolates $J_n$ ones whose signals are of maximum power; n being the integer of 1 to N denoting user number.

Controller 9 from the second outputs sends the data on individual PN sequences of registered communications system users to the second inputs of searcher 6. The individual PN sequences are understood to be a collection of the PN sequences of all the info and pilot channels of a given user.

Controller 9 from the first outputs sends the information about time positions of isolated user paths and individual PN sequences of these users to the second inputs of correlators $7_{11}$–$7_{J_NN}$.

Controller 9 from the fifth outputs sends control information about time positions of signals of isolated user paths and individual PN sequences of these users to the inputs of cross-correlation matrix element former 10 in order to form the elements of cross-correlation matrix of the PN sequences of the pilot components of signals of all the paths of all the users to each other, cross correlation matrix of the PN sequences of the pilot components of signals of all the paths of all the users to the PN sequences of the info components of signals of all the paths of all the users, cross-correlation matrix of the PN sequences of the info components of signals of all the paths of all the users to the PN sequences of the pilot components of signals of all the paths of all the users, and cross-correlation matrix of the info components of signals of all the paths of all the users to each other.

Controller 9 from the third outputs sends the data on time positions of signals of isolated user paths to the second inputs of sub-unit 8 of delay and grouping of the correlation responses of signals of all the user info and pilot channel paths.

Controller 9 from the fourth outputs sends control signals and information about user signals to the third inputs of all signal processing units $3_1$–$3_L$.

In every correlator $7_{jn}$, n being the integer of 1 to N, j–1 to $J_n$, the signal of j-th path of all the info and pilot channels of the n-th user is demodulated, i.e. $M_n$+1 complex correlation responses of signals of the j-th path corresponding to $M_n$ info channels and one pilot channel of the n-th user are formed. From the second outputs of each correlator the generated complex correlation responses are supplied to the first inputs of sub-unit 8.

From the first outputs of correlators $7_{11}$–$7_{J_N N}$ the information about signals of user paths is sent to the first inputs of controller 9.

Sub-unit 8 delays the correlation responses of signals of all the user info channel paths, the delay, for example, being a half of the accumulation interval of correlation responses of signals the corresponding user pilot channel paths, and also delays all the generated complex correlation responses of all the user pilot and info channel paths so that while compensating their interfering effect on each other the interfering effect estimates be generated. This principle is illustrated in FIG. 3.

Figure 3:
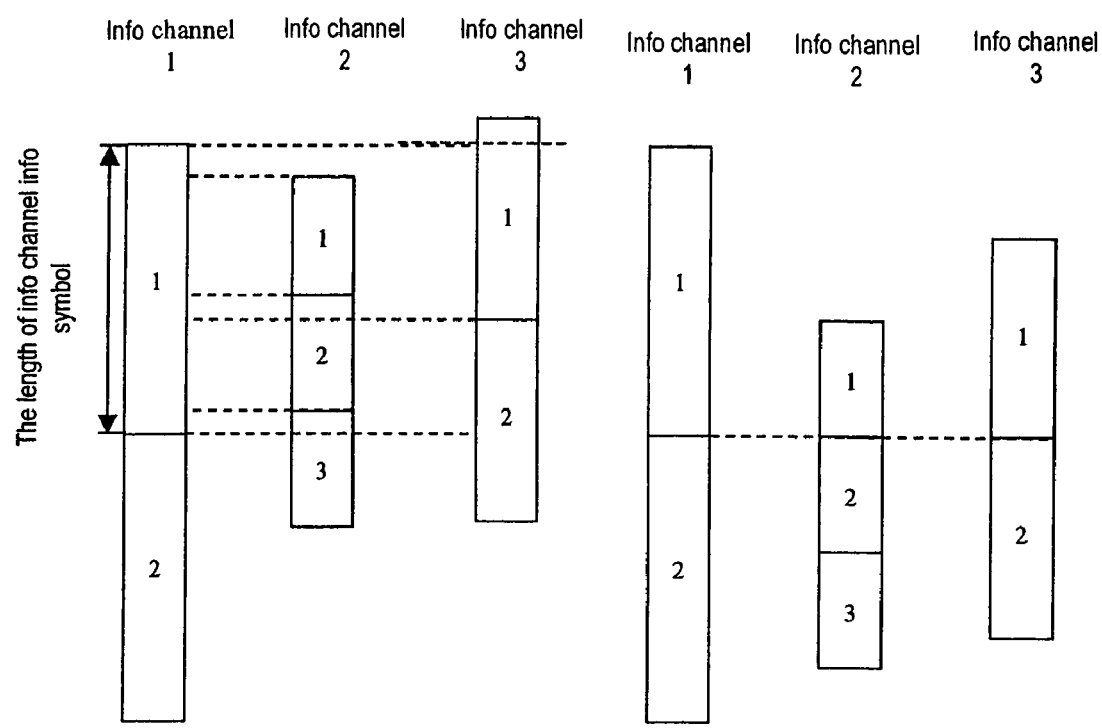
FIGS. 3a and 3b are time positions of signals of user info channels with various info symbol length before and after delay.

Let us consider FIG. 3, where two time position diagrams of correlation responses before and after being delayed in sub-unit 8 are presented. The signals of three user info channels having different length of one info symbol and different time positions are shown. To the first symbol of second channel the first symbols of first and third channels are interfering. Therefore, in order to compensate their interfering effect the signal from second channel should be delayed by the time necessary for generation of complex correlation response of the longest symbol out of the interfering ones, in this very case it is the first symbol of first channel. Similarly delay for other channels is selected.

Coming back to FIG. 2. Sub-unit 8 at the first outputs generates $$\sum_{n=1}^{N} J_n M_n$$

complex correlation responses of signals of all the user info channel paths. These responses are supplied to the first inputs of signal processing units $3_1$–$3_L$, wherein to first signal processing unit $3_1$ directly and to subsequent signal processing units $3_2$–$3_L$ via first delay units and all subsequent delay units respectively.

Sub-unit 8 at the second outputs generates $$\sum_{n=1}^{N} J_n$$

complex correlation responses of signals of all the user pilot channel paths. These signals are supplied to the corresponding inputs of accumulator 2.

Cross-correlation matrix element former 10 forms the elements of four types of cross-correlation matrices.

According to the current embodiment implementation of the device is based on compensation of the interfering effect of signals of all the user info and pilot channel paths on each other and requires knowledge of the elements of cross-correlation matrices of all the components of received signals to each other. The elements of these matrices are correlation of the PN sequences of different users via all the channels and paths. Therefore, the matrices of four types need to be formed:

the cross-correlation matrix of the PN sequences of the pilot components of signals of all the paths of all the users to each other; this matrix will be referred to as the KPP cross-correlation matrix;

the cross-correlation matrix of the PN sequences of the pilot components of signals of all the paths of all the users to the PN sequences of the info components of signals of all the paths of all the users; this matrix will be referred to as the KP cross-correlation matrix;

the cross-correlation matrix of the PN sequences of the info components of signals of all the paths of all the users to the PN sequences of the info components of signals of all the paths of all the users to the PN sequences of the pilot components of signals of all the paths of all the users; this matrix will be referred to as the KSP cross-correlation matrix;

the cross-correlation matrix of the PN sequences of the info components of signals of all the paths of all the users to each other; this matrix will be referred to as the KSS cross-correlation matrix.

The above listed cross-correlation matrices are calculated by some known method.

The elements of cross-correaaton matrices from the outputs of former 10 are supplied to the fourth inputs of signal processing unts $3_1$–$3_L$, wherein to first signal processing unit $3_1$ directly and to subsequent signal processing units $3_2$–$3_L$ via second delay units and all previous second delay units corresponding to them, Let us consider FIG. 4. Accumulator 2 generates $$\sum_{n=1}^{N} J_n$$

averaged complex correlation responses of signals of all the user pilot channel paths, for this purpose each accumulation branch $11_{j,n}$ where n taking the integer values of 1 to N, j taking the integer values of 1 to $J_n$, using tapped delay line $12_{j,n}$ and combiner $13_{j,n}$, accumulates complex correlation responses of signal from the j-th path of pilot channel of the n-th user within the accumulation intervals of $\tau_{j,n}$ determined by the time of user path signal invariance.

$$\sum_{n=1}^{N} J_n$$

averaged complex correlation responses of signals of all the user pilot channel paths are delivered to the second inputs of signal processing units $3_1$–$3_L$, wherein to first signal processing unit $3_1$ directly and to subsequent signal processing units $3_2$–$3_L$ via first delay units and all previous first delay units corresponding to them.

The soft decisions about the info parameters $$\sum_{n=1}^{N} M_n$$

of info channels of N users are formed successively through L iterations, L≧1, for which L signal processing units $3_1$–$3_L$ and L−1 first $4_2$–$4_L$ and L−1 second delay units are used, wherein first signal processing unit provides the first method iteration and subsequent signal processing units with first and second delay units corresponding to them provide subsequent method iterations.

Each signal processing unit $3_1$–$3_L$ L compensates the interfering effect of signals of all the user pilot channel paths on each other, the interfering effect of signals of all the user pilot channel paths on the signals of all the user info channel paths, the interfering effect of signals of all the user info channel paths on the signals of all the user pilot channel path, and the interfering effect of signals of all the user info channel paths on each other. Every signal processing unit $3_1$–$3_L$ at the firs outputs generates the soft decisions about the info parameters of signals from all the user info channels. Every signal processing unit $3_1$–$3_{L-1}$ except the last one generates at the second outputs the estimates of complex envelopes of signals from all the paths of all the users.

First delay units $4_2$–$4_L$ delay the complex correlation responses of signals from all the user info and pilot channel paths by the time of signal processing in previous signal processing unit.

Second delay units $5_2$–$5_L$ delay the soft decisions about the info parameters of signals from all the user info channels of previous signal processing unit, the estimates of complex envelopes of signals from all the paths of all the users of previous signal processing units, and the elements of all the crosscorrelation matrices by the time of signal processing in previous signal processing unit.

The output of the device is soft decisions about the info parameters of signals from all the user info channels of last signal processing unit $3_L$.

Let us consider FIG. 5 that illustrates operation of first signal processing unit $3_1$ in more detail.

From accumulator 2

$$\sum_{n=1}^{N} J_n$$

averaged complex correlation responses of signals of all the user pilot channel paths are supplied to the first inputs of sub-unit 14 for compensation of the interfering effect of signals of all the user pilot channel paths on each other. To the second inputs of sub-unit 14 control signals from demodulation unit 1 are delivered. To the third inputs of sub-unit 14 the elements of the KPP cross-correlation matrix are supplied.

Sub-unit 14 compensates the interfering effect of signals of all the user pilot channel paths on each other and generates $$\sum_{n=1}^{N} J_n$$

more accurate complex correlation responses of signals from all the user pilot channel paths. Let us consider how this is accomplished using FIG. 7.

To the first input of each node $33_{jn}$ for isolation of the n-th user jth pilot channel path of sub-unit 14, where n being the integer of 1 to N, j–1 to $J_n$, the averaged complex correlation responses of the signal from the n-th user j-th pilot channel path are applied; to the second input the rest of the averaged complex correlation responses of signals of user pilot channel paths are delivered; to the third inputs control signals of controller 34 are sent; to the fourth inputs the KPP matrix elements are supplied. Control signals from controller 9 of demodulation unit 1 are delivered to controller 34. Each node $33_{jn}$ isolates the signal of the n-th user j-th pilot channel path thus forming more accurate complex correlation responses of the signal from the n-th user j-th pilot channel signal at the output.

Let us consider the method for isolation of the signal from each j-th pilot channel path of each n-th user in greater detail using, for example, an exemplary embodiment of node $33_{jn}$ of sub-unit 14 described according to FIG. 9. To the first inputs of each sub-node $37_{ik}$ of formation of the interference from signal of the k-th user i-th pilot channel path to the signal of the n-th user j-th pilot channel path q-th symbol of node $33_{jn}$, k taking the integer number of 1 to N, i–1 to $J_k$, if k=n,1≠j, the averaged complex correlation responses of signal from the s-th symbol of k-th user i-th pilot channel path is supplied; to the second inputs of each sub-node $37_{ik}$—control signals; to the third inputs—the element of $KPP_{q,j,n,s,i,k}$ cross-correlaton matrix. Each sub-node $37_{ik}$ generates the interference from signal of k-th user i-th pilot channel path to the signal of n-th user j-th pilot channel path q-th symbol. Combiner 38 by summing the outputs signals of sub-nodes $37_{ik}$, k taking the integer values of 1 to N, i–1 to $J_k$, if k=n, i≠j, generating the combined the interference from signal to the signal of n-th user j-th pilot channel path q-th symbol from the signals of all the neighboring paths of pilot channels of all the users. The generated combined signal passes through tapped delay line 39 on to combiner 40, where it is accumulated within the accumulation interval of $\tau_{j,n}$. As a result, an estimate of the interfering effect of all the neighboring signals of all the user pilot channel paths per averaged complex corre:Lation response of n-th user j-th pilot channel path p-tb symbol is formed.

The collection of these interfering effect estimate, n being the integer of 1 to N, j–1 to $J_n$, generated in nodes $33_{11}$–$33_{J_N,N}$, forms $$\sum_{n=1}^{N} J_n$$

estimates of the interfering effect of signals of all the user pilot channel paths on each other.

In subtractor 41 of node $33_{jn}$ the generated estimate of the interfering effect of signals from all the neighboring user pilot channel paths per averaged complex correlation responses of signal of ntb user j-th pilot channel path q-th symbol is subtracted from averaged complex correlation response of n-th user j-th pilot channel q-th symbol thus forming more accurate complex correlation responses of n-th user j-th pilot channel q-th symbol signal. Hence, nodes $33_{11}$–$33_{J_N}$ generate more accurate complex correlation responses of signals of all the user pilot channel paths at the outputs.

Let us consider generation of interference of k-th user i-th pilot channel path signal to the signal of n-th user j-th pilot channel path q-th symbol in sub-node referring to the block diagram of Figure. In multiplier 42 the element of $KPP_{q,j,n,s,i,k}$ cross-correlation matrix is multiplied by the averaged complex correlation response of signal from k-th user i-th pilot channel path s-th symbol. In reset combiner 43 by the control signal from controller 34 $S_{q,j,n,i,k}$ multiplication results corresponding to different s-th symbols of k-th user i-th pilot channel paths (s=1,$\overline{S_{q,j,n,i,k}}$), where $S_{q,j,n,i,k}$—the number of the KPP cross-correlation matrix elements within the interval of n-th user j-th pilot channel path q-th user (equal to the number of symbols of k-th user i-th pilot channel paths) are summed. Therefore at the output of reset combiner 43 the interference from signal of k-th user i-th pilot channel path to the signal of n-th user j-th pilot channel path q-th symbol is formed.

At the output of sub-unit 14

$$\sum_{n=1}^{N} J_n$$

more accurate complex correlation responses of all the user pilot channel paths ("clear" from the interfering effect of the pilot components but not yet "clear" from the interfering effect of the info components) are supplied to the fourth inputs of sub-unit 15 for compensation of the interfering effect of signals of all the user pilot channel paths on the signals of all the user info channel paths.

From demodulation unit 1

$$\sum_{n=1}^{N} M_n J_n$$

complex correlation responses of signals of all the user info channel paths are supplied to the first inputs of sub-unit 15 for compensation of the interfering effect of signals of all the user pilot channel paths on the signals of all the user info channel paths. To the second inputs of sub-unit 15 control signals are sent from demodulation unit 1. To the third inputs of sub-unit 15 the elements of the KPS cross-correlation matrix are applied.

Sub-unit 15 compensates the interfering effect of signals of all the user pilot channel paths on the signals of all the user info channel paths and forms $$\sum_{n=1}^{N} M_n J_n$$

more accurate complex correlation responses of signals of all the user info channel paths, Let us consider how this is done from example of FIG. 5.

To the first inputs of each subtractor $18_n$, n being the integer of 1 to N, of sub-unit 15 the complex correlation responses of signals of all the info channel paths of n-th user are supplied. To the second inputs of subtractor 18 control signals are sent from demodulation unit 1. To the third inputs of subtractor $18_n$ the KPS cross-correlation matrix elements are applied. To the fourth inputs of subtractor $18_n$ more accurate complex correlation responses of signals of all the user pilot channel paths are supplied.

Each subtractor $18_n$, n being the integer of 1 to N, compensates the interfering effect of all the neighboring user pilot channel paths on the signals of all the n-th user info channel paths and generates more accurate complex correlation responses of signals of all the n-th user info channel paths at the output.

Hence, all subtractors $18_1$–$18_N$ form more accurate complex correlation responses of signals of all the user info channel paths at the outputs.

Let us consider generation of more accurate complex correlation responses of signals of all the n-th user info channel paths in subtracter $18_n$ in more detail referring to FIG. 11.

To the first input of each node $44_{jm}$ for isolation of m-th info channel j-th path signal, j being the integer of 1 to $J_n$, m–1 to $M_n$, complex correlation responses of n-th user m-th info channel j-th path signal are supplied. To the second inputs of node $44_{jm}$ more accurate complex correlation responses of signals of all the paths except j-th one of all the user pilot channels are sent. To the third inputs of node $44_{jm}$ control signals from controller 45 are applied, to the fourth inputs the KPS cross-correlation matrix elements are delivered. Control signals from controller 9 of demodulation unit 1 are supplied to controller 45. Each node $44_{jm}$ isolates the signal of n-th user m-th info channel j-th path forming more accurate complex correlation responses of n-th user m-th info channel j-th path signal at the output.

Therefore, all nodes $44_{11}$–$44_{J_nM_n}$ form more accurate complex correlation responses of signals of all the n-th user info channel paths at the outputs.

Let us consider generation of more accurate complex correlation responses of n-th user m-th info channel i-th path signal in node $44_{jm}$ of subtractor $18_n$ of sub-unit 15 in more detail referring to the exemplary embodiment of FIG. 12.

To the first inputs of each sub-node $46_{ik}$ of formation of the interference from signal of k-th user i-th pilot channel path to the signal of q-th symbol of n-th user m-th info channel j-th path of node $44_{jm}$, k the integer of 1 to N, i being the integer of 1 to $J_k$, if k=n, i≠j, the averaged complex correlation response of k-th user i-th pilot channel path s-th symbol signal is supplied, to the second inputs of each sub-node $46_{ik}$—control signals, to the third inputs—the $KPS_{q,j,m,n,s,i,k}$ cross-correlation matrix elements. Each sub-node $46_{ik}$ generates the interference from signal of k-th user i-th pilot channel path to the signal of n-th user m-th info channel j-th path p-th symbol. Combiner 47 combining the outputs signals of sub-nodes $46_{ik}$, k being the integer values of 1 to N, i being the integer values of 1 to $J_k$, if k=n, i≠j, the estimate of interfering effect of signals of all the neighboring user pilot channel paths on the averaged complex correlation response of n-th user m-th info channel j-th path q-th symbol is formed.

The collection of these estimates of interfering effect, j being the integer of 1 to $J_n$, m being the integer of 1 to $M_n$ generated in nodes $44_{11}$–$44_{J_nM_n}$ forms the estimate of interfering effect of signals of all the neighboring user pilot channel paths on the signals of n-th user into channel paths.

The collection of interfering effect estimates, n being the integer of 1 to N, generated in subtractors $18_1$–$18_N$, forms $$\sum_{n=1}^{N} J_n M_n$$

estimates of the interfering effect of signals of all the user pilot channel paths on the signals of all the user info channel paths.

In subtractor 48 of node $44_{jm}$ the generated estimate of interfering effect of signals of all the neighboring user pilot channel paths on the averaged complex correlation response of signal of n-th user m-th info channel j-th path q-th symbol is subtracted from the complex correlation response of signal of n-th user m-th info channel j-th path q-th symbol thus forming more accurate complex correlation response of n-th user m-th info channel j-th path q-th symbol.

This way node $44_{jm}$ generates more accurate complex correlation responses of n-th user m-th info channel j-th path signal at the output.

Referring to FIG. 12 let us consider generation of the interference from signal of k-th user i-th pilot channel path to the signal of n-th user m-th info channel j-th path q-th symbol in sub-node $46_{ik}$ in greater detail. In multiplier 49 the $KPS_{q,j,m,n,s,i,k}$ cross-correlation matrix element is multiplied by the averaged complex correlation response of k-th user i-th pilot channel path s-th symbol signal. In reset combiner 50 by control signal from controller 45 $S_{q,j,m,n,i,k}$ multiplication results, corresponding to different s-th symbols of i-th pilot channel path of k-th user (s=1,$\overline{S_{q,j,m,n,i,k}}$), where $S_{q,j,m,n,i,k}$—the number of the KPS cross-correlation matrix elements within the interval of n-th user inth info channel j-th path q-th symbol, equal to the number of symbols of k-th user i-th pilot channel path, is are summed. At the output of rest combiner 50 the interference is formed from the signal of k-th user i-th pilot channel path signal to the signal of n-th user m-th info channel j-th path q-th symbol.

Therefore, sub-unit 15 compensates the interfering effect of signals of all the user info pilot channel paths on the signals of all the user info channel paths.

More accurate complex correlation responses of signals of all the user info channel paths generated in sub-unit 15 are supplied to the fourth inputs of sub-unit 16 for compensation of the interfering effect of signals of all the user info channel paths on the signals of all the user pilot channel paths. To the first inputs of sub-unit 16 control signals from demodulation unit 1 are applied. To the second inputs of sub-unit 16 the KSP matrix elements are supplied. To the third inputs of sub-unit 16 more accurate complex correlation responses of signals of all the user pilot channel paths are supplied.

Sub-unit 16 compensates the interfering effect of signals of all the user info channel paths on the signals of all the user pilot channel paths and generates the estimates of complex envelopes of signals of all the paths of all the users of the first iteration at its outputs.

To the first inputs of each multipath user signal receiver $19_n$ of sub-unit 16, n being the integer of 1 to N, more accurate complex correlation responses of signals of all the n-th user info channel paths are supplied. To the second inputs of multipath receiver $19_n$ more accurate complex correlation responses of signals of all the n-user paths are supplied.

Each multipath receiver $19_n$ combines more accurate complex correlation responses of signals of all the paths of each n-th user into channel using more accurate complex correlation responses of signals of all the paths of n-th user pilot channel thus forming $M_n$ interim soft decisions about the info parameters of signals of all the n-th user info channels.

Signals of all, the paths of each user info channel, are combined by a standard method.

The generated interim sort decisions about the info parameters of signals of all the into channels of all the users from the outputs of all multipath receiver $19_1$–$19_N$ are supplied to the first inputs of switch 21. To the second inputs of switch 21 the KSP matrix elements are supplied. To the third inputs of switch 21 more accurate complex correlation responses of all the user pilot channel paths are supplied. To the fourth inputs of switch 21 control signals are supplied from demodulation unit 1.

Switch 21 forms $$\sum_{n=1}^{N} J_n$$

estimates of the interfering effect of signals of all the user info channel paths on the signals of all the user pilot channel paths.

Let us consider generation of the estimates of interfering effect of signals of all the user info channel paths on the signals of all the user pilot channel paths in switch 21 of sub-unit 16 (see FIG. 14).

To the first inputs of each node $51_{jn}$ for switching of n-th user j-th path signal of switch 21, n being the integer of 1 to N, j being the integer of 1 to $J_n$, more accurate complex correlation responses of signals of all but j-th user pilot channel paths are supplied. To the second inputs of switching node $51_{jn}$ the interim soft decisions about the info parameters of signals of all the user info channels are supplied. To the third inputs of switching node $51_{jn}$ control signals are supplied from controller 52, to the input of which control signals of controller 9 of demodulation unit 1 are supplied. To the fourth inputs of switching node $51_{jn}$ the elements of KSP cross-correlation matrix are supplied.

Switching node $51_{jn}$ generates the estimate of interfering effect of signals of all the neighboring user info channel paths on the signals of n-th user j-th pilot channel path.

All switching nodes $51_{11}$–$51_{J_N N}$ generate $$\sum_{n=1}^{N} J_n$$

estimates of the interfering effect of signals of all the user info channel paths on the signals of all the user pilot channel paths.

Figure 15:
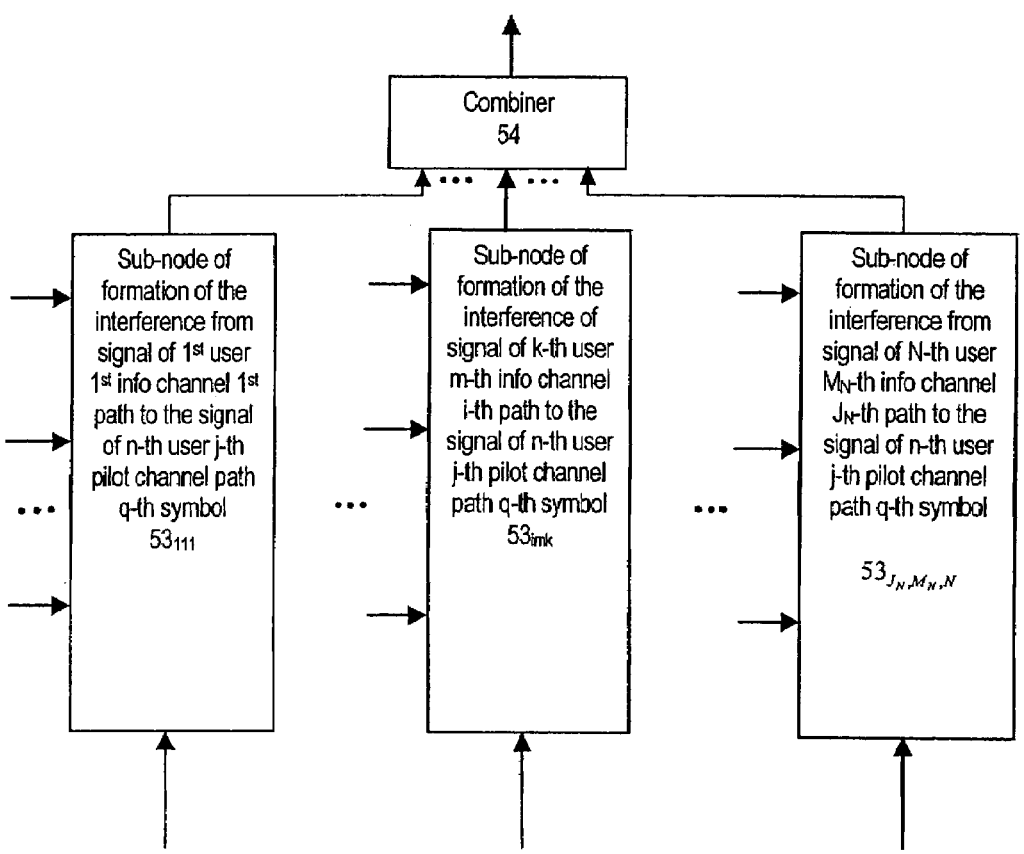
FIG. 15 is switching node $51_{jn}$ of the signal from the j-th path of the n-th user of switch 21 of sub-unit 16 and switch 30 of sub-unit 26.

Referring to FIG. 15 let us consider generation of the estimate of interfering effect of signals of all the neighboring user info channel paths on the signal of n-th user i-th pilot channel path in node $51_{jn}$ of switch 21 of sub-unit 16 in greater detail.

To the first inputs of each sub-node $53_{imk}$ of generation of the interference from signal of k-th user m-th info channel i-th path to the signal of n-th user j-th pilot channel path q-th synibol of node $51_{jn}$, k being the integer of 1 to N, i being the integer of 1 to $J_k$, m being the integer of 1 to $M_k$, if k=n, i≠j, the total number of such nodes being $$\left(\sum_{nl=1}^{N} J_{nl} M_{nl}\right) - M'_n$$

the averaged complex correlation response of k-th user i-th pilot channel path s-th symbol signal is supplied, to the second inputs of each sub-node $53_{imk}$—control signals, to the third inputs—$KSP_{q,j,n,s,i,m,k}$ cross-correlation matrix element, to the fourth—the interim soft decision about k-th user m-th info channel s-th symbol.

Each sub-node $53_{imk}$ generates the interference from signal of k-th user m-th info channel i-th path to the signal of n-th user j-th pilot channel path q-th symbol. In combiner 54 by summing the output signals of sub-units $53_{imk}$, k being the integer of 1 to N, i being the integer of 1 to $J_k$, m being the integer of 1 to $M_k$, if k=n, i≠j, the estimate of interfering effect of signals of all the user info channel paths on the complex correlation responses of n-th user j-th pilot channel path q-th symbol signal.

Hence, node $51_{jn}$ forms the estimates of interfering effect of signals of all the neighboring user info channel paths on the signal of n-th user j-th pilot channel path at the output.

The collection of these interfering estimates, n being the integer of 1 to N, j being the integer of 1 to $J_n$, formed in nodes $51_{11}$–$51_{J_N N}$, creates $$\sum_{n=1}^{N} J_n$$

estimates of the interfering effect of signals of all the user info channel paths on the signals of all the user pilot channel paths.

Referring to FIG. 16 let us consider generation of the interference from signal of k-th user m-th info channel i-th path to the signal of n-th user j-th pilot channel path q-th symbol in node $53_{imk}$ in greater detail. In threshold comparison element 55 the interim soft decision about the k-th user m-th info channel s-th symbol is compared to preset thresholds thus forming the estimate of k-th user m-th info channel s-th symbol.

The collection of these estimates, k being the integer of 1 to N, m being the integer of a to $M_k$, generates the estimates of signals of all the info channels of all the users.

In multiplier 56 the estimate of k-th user m-th info channel s-th symbol is multiplied by the averaged complex correlation response of k-th user i-th pilot channel path s-th symbol signal.

In multiplier 57 the multiplication result is multiplied by the $KSP_{q,j,n,s,i,m,k}$ cross-correlation matrix element.

In reset combiner 58 by the control signal from controller 52 $S_{q,j,n,i,m,k}$ multiplication results, corresponding to different s-th symbols of k-th user m-th info channel i-th path (s=1,$\overline{S_{q,j,n,i,m,k}}$), where $S_{q,j,n,i,m,k}$—the number of KSF cross-correlation matrix element within the interval of n-th user j-th pilot channel path q-th symbol, equal to the number of symbols of k-th user m-th info channel i-th path, are summed. At the output of reset combiner 58 the interference from signal of k-th user m-th info channel i-th path to the signal of n-th user j-th pilot channel path q-th symbol is formed.

The estimates of the interfering effect of signals of all the user info channel paths on the signals of all the user pilot channel paths calculated in switch 21 are supplied to the first inputs of subtractor 20 of sub-unit 16. To the second inputs of subtractor 20 more accurate complex correlation responses of signals of all the user pilot channel paths are supplied from sub-unit 14.

Subtractor 20 of sub-unit 16 generates the estimates of complex envelopes of signals of all the paths of all the users as shown on FIG. 17.

To the input of every tapped delay line $60_{jn}$ of each subtraction branch $59_{jn}$ of subtractor 20, n being the integer of 1 to N, j being the integer of 1 to $J_n$, the estimate of interfering effect of signals of all the user info channel paths on the signal of n-th user i-th pilot channel path is supplied. To the first input of each subtractor $61_{jn}$ of subtraction branch $59_{jn}$ of subtractor 20 more accurate complex correlation responses of n-th user i-th pilot channel path signal are supplied. Delay line $60_{jn}$ tapes to the second inputs of each subtractor $61_{jn}$ supply the estimates of interfering effect of signals of all the neighboring paths of info channels of all the user on the signal of n-th user i-th pilot channel path, which are subtracted from each more accurate complex correlation response of n-th user i-th pilot channel path signal thus forming the estimates of complex envelope of n-th user i-th path signal.

Subtractors $61_{11}$–$61_{J_N N}$ form the estimates of complex envelopes of signals of all the user paths, which are supplied to the fourth inputs of sub-unit 17 for compensation of the interfering effect of signals of all the user info channel paths on each other and to the second outputs of signal processing unit $3_1$ at the outputs.

To the first inputs of sub-unit 17 (FIG. 5) the control signals from demodulation unit 1 are supplied. To the second inputs of sub-unit 17 the KSS cross-correlation matrix elements are supplied. To the third inputs of sub-unit 17 more accurate complex correlation responses of signals of all the user info channel paths are supplied from sub-unit 15.

Sub-unit 17 compensates the interfering effect of signals of all the user info channel paths on each other and forms at the output $$\sum_{n=1}^{N} M_n$$

soft decisions about the info parameters of signals of all the user info channel paths of the first iteration.

To the first inputs of controller 22 the control signals from demodulation unit 1 are supplied. To the second inputs of controller 22 the info signals comprising the data about the info channels of users and corresponding soft decisions about info parameters are supplied from the second outputs of nodes $23_1$–$23_{P_1}$ for compensation of the interfering effect of signals of all the user info channel paths on each other.

From the first outputs of controller 22 control signals are supplied to the fourth inputs of nodes $23_1$–$23_{P_1}$. To the second outputs of controller 22

$$\sum_{n=1}^{N} M_n$$

soft decisions about the info parameters of signals of all the first iteration user info channels.

To the second inputs of nodes $23_1$–$23_{P_1}$ the KSS cross-correlation matrix elements are supplied.

To the third inputs of nodes $23_1$–$23_{P_1}$ the estimates of complex envelopes of signals of all the paths of all the users are supplied from sub-unit 16.

To the first inputs of first node $23_1$ more accurate complex correlation responses of signals of all the user info channel paths are supplied.

Each node $23_1$–$23_{P_1}$ implements one stage of compensation of the interfering effect of signals of all the user info channel paths on each other.

At the first outputs of each node $23_p$ except the last one complex correlation responses of signals of all the p-th stage user info channel paths are formed. They are supplied to the first inputs of each subsequent node $23_{p+1}$, p being the integer of 1 to $P_1-1$.

The complex correlation responses of signals of all the p-th user info channel paths are complex correlation responses of signals of all the user info channel paths by which the final decision by this stage has not yet been made and in which the interfering effect of signals of all the user info channel paths by which the final decision by this stage has not yet been made is compensated.

Let us consider operation of nodes $23_1$–$23_{P_1}$ from example of node $23_p$, p being the integer of 1 to $P_1$ (FIG. 18) in more detail.

In node $23_p$ more accurate complex correlation responses of signals of all the paths of each info channel of each user are combined with p=1 or complex correlation responses of signals of all the paths of info channel of the (p−1)-th stage users with p>1 using the estimates of complex envelopes of signals of all the paths of all the user thus forming the soft decisions about the into parameters of signals from the info channels of p-th stags users. From the generated soft decisions $K_p$ maximum by modulo are selected. They are considered to be final soft decisions about the info parameters of signals of first iteration user info channels. The estimates of info parameters of user info channel signals corresponding to the selected soft decisions are obtained by comparing final soft decisions about the info parameters of signals of first iteration user info channel with preset thresholds. The estimates of interfering effect of signals of all the user info channel paths, corresponding to the selected soft decisions, on the remaining info components of signals of all the user paths, by which the final decision by this stage has not yet been made, are made by weight combining of the products of the estimates of complex envelopes of signals of all the first iteration user paths and the estimates of the info parameters of user info channel signals with the weights set by the KSS matrix elements. The obtained estimates of the interfering effect are subtracted from more accurate complex correlation responses of signals of all the paths of each info channel of each user with p=1 or from the remaining complex correlation responses of signals of all the paths of user (p−1)-th info channels with p more than 1 producing the complex correlation responses of signals of all the p-th stage user info channel paths.

At the $P_1$-th stage of node $23_{P_1}$ the complex correlation responses of signals of all the paths of info channels of $P_1$-th stage users, on which the final decision has not yet been made, are combined using the estimates of complex envelopes of signals of all the user paths thus forming the soft decisions about the info parameters of $P_1$-th stage info channel signals. These soft decisions coupled with the final decisions about the info parameters of previous stage user info channel signals are the final soft decisions about the first iteration info parameters.

To the first inputs of sub-node 62 of combining and selection of soft decisions about the info parameters of user info channel signals of node $23_p$ more accurate complex correlation responses of signals of all the user info channel paths with p=1 or complex correlation responses of signals of all the (p−1) stage user info channel paths, p>1, are supplied. To the second inputs of sub-unit 62 the estimates of complex envelopes of signals of all the user paths are supplied. To the third inputs of sub-unit 62 control signals from controller 22 are supplied.

In sub-node 62 the signals of user info channel paths are combined producing the soft decisions about the info parameters of p-th stage user info channel signals. From the produced soft decisions $K_p$ maximum by modulo are selected. They are final soft decisions about the info parameters of first iteration user info channel signals. Sub-node 62 also blanks signals of all the user info channel paths on which the final decision has been made at the current stage.

The remaining signals of all the user info channel paths from the first outputs of sub-node 62 are supplied to the first inputs of subtractor 63.

The info signals that contain the data about the info channels of user, on which the final decision is made at this stage, and corresponding soft decisions about the info parameters from the second outputs of sub-node 62 are supplied to controller 22.

To the first inputs of switch 64 of node $23_p$ control signals from controller 22 are supplied.

To the second inputs of switch 64 the estimates of complex envelopes of signals of all the paths of all the users are supplied.

To the third inputs of switch 64 the KSS cross correlation matrix elements are supplied.

Switch 64 makes the estimates of the info parameters of signals of user info channels corresponding to the selected soft decisions by comparing the final soft decisions about the info parameters of signals of user info channels with preset threshold and estimating the interfering effect of signals of all the user info channel paths corresponding to the selected soft on the remaining info components of signals of all the user paths on which the final decision has not yet been made by this stage. The generates estimates of the interfering effect from the outputs of switch 64 are supplied to the second inputs of subtractor 63.

In subtractor 63 the obtained estimates of the interfering effect are subtracted from the remaining (blanked) more accurate complex correlation responses of signals of all the paths of each info channel of each user with p=1 or from the remaining (blanked) complex correlation responses of signals of all the paths of info channels of (p−1)th stage users with p greater than 1 thus forming the complex correlation responses of signals of all the paths of info channels of p-th stage users that are the output signals of subtractors 63.

Let us consider operation of sub-node 62 of combining and selection of the soft decisions about the info parameters of user info channel signals of node $23_p$ (FIG. 19) in more detail.

To the first inputs of element 65 of combining of signals from all the user info channel paths more accurate complex correlation responses of signals of all the paths of info channels of all the users with p=1 or complex correlation responses of signals from all the paths of info channels of (p−1)-th stage users with p>1 are supplied.

To the second input of element 65 the estimates of complex envelopes of signals of all the paths of all the users are supplied.

Element 65 combines the signals of all the paths of each info channel of each user using the estimates of complex envelopes of signals of all the paths of all the users thus making the soft decisions about the info parameters of user info channel signals on whioh the final decision has not yet been made by this stage. The generated soft decisions from the outputs of element 65 are supplied to the first inputs of element 66 of maximum selection. To the second inputs of element 66 the control signals from controller 22 are supplied. Element 66 selects $K_p$ maximum by modulo soft decisions that are final soft decisions about the info parameters of user info channel signals. The info signals that contain the data about the info parameters of users on which the final decisions has not yet been made and the corresponding soft decisions about the info parameters from the first outputs of element 66 are supplied to controller 22. From the second outputs of element 66 control signals are supplied to the second inputs of control element 67. According to these signals control element 67 blanks complex correlation responses supplied to its first inputs.

From the outputs of control element 67 blanked complex correlation responses are supplied to the first inputs of subtractor 63.

Let us consider operation of switch $64_p$ of node $23_p$ from the example of FIG. 20 in more detail.

To the inputs of controller 70 the control signals from controller 22 are supplied.

Controller 70 controls operation of sub-nodes $68_{111}$–$68_{J_NM_NN}$ and controllable keys $69_{111}$–$69_{J_NM_NN}$. From the first outputs of controller 70 $K_p$ soft decisions about the info parameters of signals of user info channels on which the final decision has been made at this stage are supplied to the first inputs of each sub-node $68_{jrn}$ of formation of the interference to signal of n-th user r-th info channel j-th path, n being the integer of 1 to N, j being the integer of 1 to $J_n$, r being the integer of 1 to $M_n$.

From the second outputs of controller 70 control signals are supplied to the second inputs of every sub-node $68_{jrn}$.

From the third outputs of controller 70 control signals are supplied to the first inputs of control keys $69_{111}$–$69_{J_NM_NN}$.

To the third inputs of every sub-node $68_{jrn}$ the estimates of complex envelopes of signals of all the paths of all the users are supplied.

To the fourth inputs of every sub-node $68_{jrn}$ the KSS cross-correlation matrix elements are supplied.

Every sub-node $68_{jrn}$ generates the interference to the signal of n-th user r-th info channel j-th path from the signals of all the user info channel paths on which the final decision has been made at this stage. The generated interference from the output of sub-node $68_{jrn}$ is supplied to the second input of corresponding controllable key $69_{jrn}$.

Controllable keys $69_{111}$–$69_{J_NM_NN}$ blank complex correlation responses of signals of all the paths of those user info channels on which the final decision has been made at the current stage.

Let us consider operation of sub-nodes $68_{111}$–$68_{J_NM_NN}$ from example of sub-node $68_{jrn}$ (FIG. 21) in more detail.

To the first input of every element of formation of the interference from k-th user m-th info channel i-th path to the signal of n-th user r-th info channel j-th path q-th symbol, k being the integer of 1 to N, i being the integer of 1 to N, n being the integer of 1 to $M_k$, if k=n, i≠j, the estimate of complex envelope of k-th user i-th path s-th symbol signal is supplied.

To the second input of every element $71_{imk}$ the control signal from controller 70 is supplied.

To the third input of every element $71_{imk}$ the $KSS_{q,j,r,n,s,i,m,k}$ cross-correlation matrix element is supplied.

To the fourth input of every element $71_{imk}$ the soft decision about the s-th symbol of k-th user m-th info channel is supplied.

Every element $71_{imk}$ generates the interference from signal of k-th user m-th info channel i-th path to the signal of n-th user r-th info channel j-th path, which from the output of element $71_{imk}$ is supplied to the first input of corresponding controllable key $72_{imk}$. To the second input of every controllable key $72_{imk}$ the control signal from controller 70 is supplied. Controllable keys $72_{111}$–$72_{J_NM_NN}$ admit the interference signals of those user info channels on which the final decision has been made at this stage.

In combiner 73 as a result of combining the output signals of controllable keys $72_{111}$–$72_{J_NM_NN}$ the interference to the signal of n-th user r-th info channel j-th path is created from the signals of those user info channel paths on which the final decision has been made at this stage.

Let us consider operation of elements $71_{111}$–$71_{J_NM_NN}$ from example of $71_{imk}$ (FIG. 22) in more detail.

In threshold comparison element 74 the soft decision about k-th user m-th info channel s-th symbol is compared to a preset threshold forming the estimate of k-th user m-th info channel s-th symbol.

In multiplier 75 the estimate of k-th user m-th info channel s-th symbol is multiplied by the estimate of k-th user m-th info channel i-th symbol complex envelope.

In multiplier 76 the multiplication result is multiplied by the $KSS_{q,j,r,n,s,i,m,k}$ cross-correlation matrix element.

In reset combiner 77 by the control signal from controller 70 $S_{q,j,r,n,i,m,k}$ multiplication results, corresponding to different s-th symbols of k-th user m-th info channel i-th path (s=1,$\overline{S_{q,j,r,n,i,m,k}}$), where $S_{q,j,r,n,i,m,k}$—the number of KSS cross-correlation matrix elements within the interval of n-th user r-th info channel j-th path, equal to the number of symbols of k-th user m-th info channel i-th path, are summed. At the output of reset combiner 77 the interference from signal of k-th user m-th info channel i-th path is formed to the signal of n-th user r-th info channel j-th path q-th symbol.

Referring to FIGS. 1 and FIG. 6 let us consider operation of second and subsequent signal processing units $3_2$–$3_L$ of the filed device from example of signal processing unit $3_l$ operation, l being the integer of 2 to L.

From first signal processing unit $4_l$ $$\sum_{n=1}^{N} J_n$$

averaged complex correlation responses of signals of all the user pilot channel paths are supplied to the first inputs of sub-unit 24 for compensation of the interfering effect of signals of all the user pilot channel paths on each other. To the second inputs of sub-unit 24 the control signals from demodulation unit 1 are supplied. To the third inputs of sub-unit 24 the KPP matrix elements delayed in units $5_2$–$5_l$ by the time of previous iterations are supplied. To the fourth inputs of sub-unit 24 from previous signal processing unit $3_{l-1}$ via second delay unit $5_l$ the estimates of complex envelopes of signals of all the paths of all the users are supplied.

Sub-unit 24 compensates the interfering effect of signals from all the user pilot channel paths on each other and generates $$\sum_{n=1}^{N} J_n$$

more accurate complex correlation responses of signals of all the user pilot channel paths. Let us consider how this is done in more detail (FIG. 8).

To the first input of every node for isolation of n-th user j-th pilot channel path of sub-unit 24, n being the integer of 1 to N, j being the integer of 1 to $J_n$, the averaged complex correlation responses of signal of n-th user j-th pilot channel path are supplied; to the second inputs of node 35$_{jn}$ the estimates of complex envelopes of signals of all the neighboring paths of all the users are supplied; to the third inputs of node 35$_{jn}$ the control signals are controller 36 are supplied; to the fourth inputs the elements of KPP cross-correlation matrix are supplied. To controller 36 the control signals are supplied from controller 9 of demodulation unit 1. Each node 35$_{jn}$ isolates the signal of n-th user j-th pilot channel path forming at the output more accurate complex correlation responses of n-th user j-th pilot channel path.

Node 35$_{jn}$ for isolation of the signal from l-th iteration n-th user j-th pilot channel l being the integer values of 2 to L, is accomplished in the same way as node 33$_{jn}$ for isolation of first iteration n-th user j-th pilot channel path (FIG. 9).

Sub-node 37$_{ik}$ of formation of the interference from signal of k-th user i-th pilot channel path to the signal of n-th user j-th pilot channel path q-th symbol, k being the integer of 1 to N, i being the integer of 1 to $J_k$ if k=n, i≠j, of node 35$_j$ (FIG. 10) was described above.

From the output of sub-unit 24

$$\sum_{n=1}^{N} J_n$$

more accurate complex correlation responses of signals of all the user pilot channels ("clear" from the interfering effect of the pilot components but not yet "clear" from the interfering effect of the info components) are supplied to the fifth inputs of sub-unit 26 for compensation of the interfering effect of signals of all the user info channel paths on the signals of all the user pilot channel paths.

Let us consider operation of sub-unit 25 for compensation of the interfering effect of signals of all the user pilot channel paths on the signals of all the user info channel paths in more detail.

From first delay unit 4$_l$ $$\sum_{n=1}^{N} M_n J_n$$

complex correlation responses of signals of all the user info channel paths are supplied to the first inputs of sub-unit 25 for compensation of the interfering effect of signals of all the user pilot channel paths on the signals of all the user info channel paths of signal processing unit 3$_j$. To the second inputs of sub-unit 25 the control signals from demodulation unit 1 are supplied. To the third inputs of sub-unit 25 the KPS matrix elements are supplied. To the fourth input of sub-unit 25 the estimates of complex envelopes of signals of all the paths of all the users are supplied from previous signal processing unit via second delay unit 5$_l$.

Sub-unit 25 compensates the interfering effect of signals fo all the user pilot channel paths on the signals of all the user info channel paths and generates $$\sum_{n=1}^{N} M_n J_n$$

more accurate complex correlation responses of signals of all the user info channel paths. Referring to the block diagram of FIG. 6 let us consider how this is achieved.

To the first inputs of every subtractor 28$_n$, n being the integer of 1 to N, of sub-unit 25 the complex correlation responses of signals of all, the n-th user info channel paths are supplied. To the second inputs of subtractor 28$_n$ the control signals from demodulation unit 1 are supplied. To the third inputs of subtractor 28$_n$ the KPS cross-correlation matrix elements are supplied. To the fourth inputs of subtractor 28$_n$ the estimates of complex envelopes of signals all the paths of all the users.

Every subtractor 28$_n$, n being the integer of 1 to N, compensates the interfering effect of signals of all the neighboring user pilot channel paths on the signals of all the n-th user info channel, paths and generates more accurate complex correlation responses of signals of all the paths of n-th user info channels at the output.

Subtractor 28$_n$, n of sub-unit 25 of the l-th iteration, l being the integer of 2 to L, is analogous to subtractor 18$_n$ of sub-unit 15 of the first iteration (FIG. 11). Node 44$_{jm}$ for isolation of signal of m-th info channel j-th path used in subtracters 28$_1$–28$_N$ (FIG. 12) has been described earlier. Sub-node 46$_{ik}$ of formation of the interference from signal of k-th user i-pilot channel path to the signal of n-th user m-th info channel j-th path q-th symbol (FIG. 13), k being the integer of 1 to N, i being the integer of 1 to $J_k$, if k=n, i≠j that is a part of node 44$_{jm}$ has been described earlier.

Hence, all subtractors 28$_1$–28$_N$ generates more accurate complex correlation responses of signals of all the paths of info channels of all the users.

From the outputs of sub-unit 25

$$\sum_{n=1}^{N} M_n J_n$$

more accurate complex correlation responses of signals of all the user info channel paths ("clear" from the interfering effect of the pilot components but not yet "clear" from the interfering effect of the info components) are supplied to the third inputs of sub-unit 27 for compensation of the interfering effect of signals of all the user info channel paths on each other.

Let us consider operation of sub-unit 26 for compensation of the interfering effect of signals of all the user info channel paths on the signals of all the user pilot channel paths in more detail.

To the first inputs of sub-unit 26 the control signals from demodulation unit 1 are supplied. To the second inputs of sub-unit 26 the KSP cross-correlation matrix elements are supplied. To the third inputs of sub-unit 26 the soft decisions about the info parameters of signals of all the user info channels are supplied from previous signal processing unit $3_{l-1}$ via second delay unit $5_l$. To the fourth inputs of sub-unit 26 the estimates of complex envelopes of signals of all the paths of all the users are supplied from previous signal processing unit $3_{l-1}$ via second delay unit $5_l$. To the fifth inputs of sub-unit 26 from the output of sub-unit 24 more accurate complex correlation responses of signals of all the user pilot channel paths are supplied.

Sub-unit 26 compensates the interfering effect of signals of all the user info channel paths on the signals of all the user pilot channel paths and generates the estimates of complex envelopes of signals of all the paths of all the users of the l-the iteration at the outputs.

To the first inputs of switch 30 of sub-unit 26 of signal processing unit $3_l$ the soft decisions about the into parameters of signals of all the user info channels are supplied from previous signal processing unit $3_{l-1}$ via second delay unit $5_l$. To the second inputs of switch 30 of sub-unit 26 the KSP cross-correlation matrix elements are supplied. To the third inputs of switch 30 the estimates of complex envelopes of signals of all the paths of all the users are supplied from previous signal processing unit $3_{l-1}$ via second delay unit $5_l$. To the fourth inputs of switch 30 the control signals from demodulation unit 1 are supplied.

Switch 30 generates $$\sum_{n=1}^{N} J_n$$

estimates of the interfering effect of signals of all the user info channel paths on the signals of all the user pilot channel paths.

Switch 30 of sub-unit 26 of the l-th iteration, l being the integer of 2 to L, is analogous to switch 21 of sub-unit 16 of the first iteration (FIG. 14). Node $51_{jn}$ for switching the signal of n-th user j-th path that is a part of switch 30 (FIG. 15) has been described earlier. Sub-node $53_{imk}$ of formation of the interference from signal of k-th user rath info channel i-th path to the signal of n-th user j-th pilot channel path q-th symbol (FIG. 16), k being the integer of 1 to N, i being the integer of 1 to $J_k$, m being the integer of 1 to $M_k$ if k=n, i≠j that is a part of node $51_{jn}$ of switch 30 has been described earlier.

The estimates of interfering effect of signals of all the user info channel paths on the signals of all the user pilot channel paths generated in switch 30 are supplied to the first inputs of subtractor 29. To the second inputs of subtractor 29 more accurate complex correlation responses of signals of all the user pilot channel paths are supplied from sub-unit 24.

Subtractor 29 of sub-unit 26 generates the estimates of complex envelopes of signals of all the paths of all the users.

Subtractor 29 of sub-unit 26 of the l-th iteration, l being the integer of 2 to L, is analogous to subtractor 20 of sub-unit 16 of the first iteration (FIG. 17).

From the outputs of sub-unit 26 the estimates of complex envelopes of signals of all the paths of all the users are supplied to the fourth inputs of sub-unit 27 for compensation of the interfering effect of signals of all the user info channel paths on each other and to second outputs of every signal processing unit $3_l$ except the last one, l being the integer of 2 to L−1.

Let us consider operation of sub-unit 27 for compensation of the interfering effect of signals of all the user info channel paths on each other in more detail.

To the first inputs of sub-unit 27 (FIG. 6) the control signals from demodulation unit 1 are supplied. To the second inputs of sub-unit 27 the KSS cross-correlation matrix elements are supplied. To the third inputs of sub-unit 27 more accurate complex correlation responses of signals of all the user info channel paths are supplied from sub-unit 25. To the fourth inputs of sub-unit 27 the estimates of complex envelopes of signals of all the paths of all the users are supplied from sub-unit 26.

Sub-unit 27 compensates the interfering effect of signals of all the user info channel paths on each other and at the output generates $$\sum_{n=1}^{N} M_n$$

soft decisions about the info parameters of signals of all the info channel of all the users of the l-th iteration.

To the first inputs of controller 31 of sub-unit 27 the control signals from demodulation unit 1 are supplied. To the second inputs of controller 31 the info signals containing the data about user info channels and corresponding soft decisions about info parameters are supplied from the second outputs of nodes $32_1$–$32_{P_l}$.

From the first outputs of controller 31 the control signals are supplied to the fourth inputs of nodes $32_1$–$32_{P_l}$. At the second outputs controller 31 generates $$\sum_{n=1}^{N} M_n$$

soft decisions about the into parameters of signals of all the info channels of all the users of the l-th iteration.

To the second inputs of nodes $32_1$–$32_{P_l}$ the KSS cross-correlation matrix elements are supplied.

To the third inputs of nodes $32_1$–$32_{P_l}$ the estimates of complex envelopes of signals of all the paths of all the users are supplied from sub-unit 26.

To the first inputs of first node $32_1$ more accurate complex correlation responses of signals of all the user info channel paths are supplied from sub-unit 25.

Each node $32_p$, p being the integer of 1 to $P_l$, implements one stage of compensation of the interfering effect of signals of all the user info channel paths on each other.

At the first outputs of each node $32_p$ except the last one complex correlation responses of signals of all the paths of p-th user info channels are generated; they are supplied to the first input of every subsequent node $32_{p+1}$, p being the integer of 1 to $P_l$−1.

Nodes $32_1$–$32_{P_l}$ of l-th signal processing unit $3_l$, l being the integer of 2 to L are analogous to nodes $23_1$–$23_{P_l}$ of first signal processing unit $3_1$ (FIG. 18). Sub-node 62 of combining and selection of the soft-decisions about the info parameters of signals of user info channels (FIG. 19) and switch 64 (FIG. 20) that are a part of nodes $32_1$–$32_{P_l}$ have been described earlier. Sub-node $68_{jrn}$ of formation of the interference from signal of n-th user r-th info channel j-th path (FIG. 21) that is a part of switch 64 has been described earlier. Element $71_{imk}$ of formation of the interference from signal of k-th user m-th info channel i-th path to the signal of n-th user r-th info channel j-th path, k being the integer of 1 to N, i being the integer of 1 to $J_k$, being the integer of 1 to $M_k$ if k=n, i≠j, (FIG. 22) that is a part of sub-node $68_{jrn}$ has been described earlier.

Hence, we may conclude that the filed invention improves the quality of reception of user multipath signals because of elimination off the interfering effect of signals from different users on each other. This results in increased capacity and throughput of CDMA mobile communications systems.

The invention claimed is:

1. A method of multipath signal receiving in a CDMA mobile communications system, where the input signal of base station, BS, is an additive mixture of user signals and noise, where a signal of every user being a collection of independently fading path signals comprises the pilot component and info components received via the corresponding pilot and info channels, the amounts of info channels per user and data transmission rates varying in user info channels, comprising making soft decisions about the info parameters of signals of all the info channels of all the users by compensating the interfering effect of signals of all the paths of pilot and info channels of all the users on each other, the method comprising:

a step in which a signal is searched by isolating the paths of maximum power signals from the detected signals of paths, a step in which the complex correlation responses of signals of all the isolated paths of info channels of all the users are formed, a step in which the complex correlated responses of signals of all the isolated paths of pilot channels of all the users are formed, a step in which the complex correlation responses of signals of each path of pilot channel of each user are accumulated within the corresponding accumulation time thus generating averaged complex correlation responses of signals of all the paths of pilot channels of all the users, a step in which the generated complex correlation responses of signals of all the paths of info channels of all the users and all the generated complex correlation responses of signals of all the paths of pilot and info channels of all the users are delayed so that while compensating their interfering effect on each other the estimates of this interfering effect be formed, a step in which the soft decisions about the info parameters of signals of all the info channels of all the users are formed successively in L iterations, where L—the integer, greater than or equal to 1, where at each iteration the estimates of the interfering effect of signals of all the paths of pilot channels of all the users on each other are formed and this interfering effect is compensated in the averaged complex correlation responses of signals of all the paths of pilot channels of all the users thus forming more accurate complex correlation responses of signals of all the paths of pilot channels of all the users, a step in which the estimates of the interfering effect of signals of all the paths of pilot channels of all the users on the signals of all the paths of info channels of all the users are made and this interfering effect is compensated in complex correlation responses of signals of all the paths of info channels of all the users thus forming more accurate complex correlation responses of signals of all the paths of info channels of all the users, a step in which the estimates of the interfering effect of signals of all the paths of info channels of all the users on the signals of all the paths of pilot channels of all the users are made and this interfering effect is compensated in more accurate complex correlation responses of signals of all the paths of pilot channels of all the users thus producing the estimates of complex envelopes of signals of all the paths of all the users, a step in which the soft decisions about the info parameters of signals of all the info channels of all the users are formed successively through $P_l$ stages compensating the interfering effect of signals of all the paths of info channels of all the users on each other, l takes the integer values of 1 to L, l—iteration number, where at the p-th stage, p takes the integer values of 1 to $P_l$, a step in which more accurate complex correlation responses of signals of all the paths of each info channel of each users, p being equal to one, or the complex correlation responses of signals of all the paths of info channels of the (p–1)-th stage users, p being greater than one, are combined using the estimates of complex envelopes of signals of all the user paths thus forming soft decisions about the info parameters of signals of info channels of the p-th stage users, a step in which out of the generated soft decisions $K_p$ maximum by modulo ones are selected and considered to be the final soft decisions about the info parameters of signals of info channels of the current iteration users, a step in which the estimates are made of the interfering effect of signals of all the paths of user info channels, corresponding to the selected soft decisions about the info parameters of signals of user info channels, on the remaining signals of all the paths of user info channels on which the final decision has not yet been made by this stage, a step in which this interfering effect is compensated in the remaining more accurate complex correlation responses of signals of all the paths of info channels of users, p being equal to one, or in the remaining complex correlation responses of signals of all the paths of info channels of the (p–1)-th stage users, p being greater than one, thus forming complex correlation responses of signals of all the paths of info channels of the p-th stage users, a step in which at the last $P_l$-th stage the complex correlation responses of signals of all the paths of info channels of the $P_l$-th stage users, on which the final decision has not yet been made, are combined using the estimates of complex envelopes of signals of all paths of all users thus forming soft decisions about the info parameters of signals of info channels of the $P_l$-th stage users, which along with the final soft decisions about the info parameters of signals of user info channels of the previous stages are the final soft decisions about the info parameters of this iteration, a step in which the obtained soft decisions about the info parameters of signals of all the info channels of all the users and the estimates of complex envelopes of signals of all the paths of all the users of the current iteration, except the last one, that are delayed by the time of iteration, are used to generate the estimates of the interfering effect of signals of all the paths of pilot channels of all the users on each other, the estimates of the interfering effect of signals of all the paths of pilot channels of all the users on the signals of all the paths of info channels of all the users and the estimates of the interfering effect of signals of all the paths of info channels of all the users on the signals of all the paths of pilot channels of all the users of the subsequent iteration, a step in which at the first iteration in order to generate the estimates of the interfering effect of signals of all the paths of pilot channels of all the users on each other the averaged complex correlation responses of signals of all the paths of pilot channels of all the users are used, in order to generate the estimates of the interfering effect of signals of all the paths of pilot channels of all the users on the signals of all the paths of info channels of all the users more accurate complex correlation responses of signals of all the paths of pilot channels of all the users are used, in order to generate the estimates of the interfering effect of signals of all the paths of info channels of all the users on the signals of all the paths of pilot channels of all the users more accurate complex correlation responses of signals of all the paths of pilot and info channels of all the users are used, and a step in which the soft decisions about the info parameters of signals of all the info channels of all the users of the last iterations are the output signals for decision making.

2. The method of claim 1, wherein an accumulation interval of complex correlation responses of signals of each path of pilot channel of each user is selected to be equal to an interval of communication channel invariability but no longer than double time of tolerable signal processing delay.

3. The method of claim 1, wherein while forming the estimates of the interfering effect of signals of all the paths of pilot channels of all the users on each other, the elements of cross-correlation matrix of the pseudo-noise sequences of the pilot components of signals of all the paths of all the users to each other are generated.

4. The method of claim 1, wherein while forming the estimates of the interfering effect of signals of all the paths of pilot channels of all the users on the signals of all the paths of info channels of all the users, the elements of cross-correlation matrix of the pseudo-noise sequences of the pilot components of signals of all the paths of all the users to the pseudo-noise sequences of the info components of signals of all the paths of all the users are generated.

5. The method of claim 1, wherein while forming the estimates of the interfering effect of signals of all the paths of info channels of all the users on the signals of all the paths of pilot channels of all the users, the elements of cross-correlation matrix of the pseudo-noise sequences of the info components of signals of all the paths of all the users to the pseudo-noise sequences of the pilot components of signals of all the paths of all the users are generated.

6. The method of claim 1, wherein while generating the estimates of the interfering effect of signals of all the paths of info channels of all the users on each other, the elements of cross-correlation matrix of the pseudo-noise sequences of the info components of signals of all the paths of all the users to each other are generated.

7. The method of claim 3, wherein the estimates of the interfering effect of signals of all the paths of pilot channels of all the users on each other for the first iteration are formed by weight combining of the averaged complex correlation responses of signals of all the paths of pilot channels of all the users with the weights defined by the elements of cross-correlation matrix of the pseudo-noise sequences of the pilot components of signals of all the paths of all the users to each other, and for subsequent iterations by weight combining of the estimates of complex envelopes of signals of all the paths of all the users of the previous iteration with the weights defined by the elements of cross-correlation matrix of the pseudo-noise sequences of the pilot components of signals of all the paths of all the users to each other.

8. The method of claim 7, wherein the interfering effect of signal of all the paths of pilot channels of all the users on each other is compensated by subtracting the generated estimates of the interfering effect of signals of all the paths of pilot channels of all the users on each other from the averaged complex correlation responses of signals of all the paths of pilot channels of all the users.

9. The method of claim 4, wherein the estimates of the interfering effect of signals of all the paths of pilot channels of all the users on the signals of all the paths of info channels of all the users for the first iteration are made by weight combining of more accurate complex correlation responses of signals of all the paths of pilot channels of all the users with the weights defined by the elements of cross-correlation matrix of the pseudo-noise sequences of the pilot components of signals of all the paths of all the users to the pseudo-noise sequences of the info components of signals of all the paths of all the users, and for subsequent iterations by weight combining of the estimates of complex envelopes of signals of all the paths of all the users of the previous iteration with the weights defined by the elements of cross-correlation matrix of the pseudo-noise sequences of the pilot components of signals of all the paths of all the users to the pseudo-noise sequences of the info components of signals of all the paths of all the users.

10. method of claim 9, wherein the interfering effect of signals of all the paths of pilot channels of all the users on the signals of all the paths of info channels of all the users is compensated by subtracting the generated estimates of the interfering effect of signals of all the paths of pilot channels of all the users on the signals of all the paths of info channels of all the users from the complex correlation responses of signals of all the paths of info channels of all the users.

11. The method of claim 5, further comprising:

a step wherein the estimates of the interfering effect of signals of all the paths of info channels of all the users on the signals of all the paths of pilot channels of all the users for the first iteration are made by combining more accurate complex correlation responses of signals of all the paths of each info channel of each user using more accurate complex correlation responses of signals of all the paths of pilot channel of each user thus making interim soft decisions about the info parameters of signals of each info channel of each user and a step of forming the estimates of info parameters of signals of all the info channels of all the users by comparing the interim soft decisions about info parameters of signals of each info channel of each user with preset threshold and weight combining of the products of more accurate complex correlation responses of signals of all the paths of pilot channels of all the users and the estimates of info parameters of signals of all the info channels of all the users with the weights defined by the elements of cross-correlation matrix of the pseudo-noise sequences of the info components of signals of all the paths of all the users to the pseudo-noise sequences of the pilot components of signals of all the paths of all the users, and for subsequent iterations by generating the estimates of the info parameters of signals of all the info channels of all the users by comparing the soft decisions about the info parameters of signals of all the info channels of all the users of the previous iteration to the preset thresholds and weight combining of the products of the estimates of complex envelopes of signals of all the paths of pilot channels of all the users of the previous iteration and the estimates of info parameters of signals of all the info channels of all the users with the weights defined by the elements of cross-correlation matrix of the pseudo-noise sequences of the info components of signals of all the paths of all the users to the pseudo-noise sequences of the pilot components of signals of all the paths of all the users.

12. The method of claim 11, wherein the interfering effect of signals of all the paths of info channels of all the users on the signals of all the paths of pilot channels of all the users is compensated by subtracting the estimates of the interfering effect of signals of all the paths of info channels of all the users on the signals of all the paths of pilot channels of all the users from more accurate complex correlation responses of signals of all the paths of pilot channels of all the users.

13. The method of claim 5, wherein the estimates are made of the interfering effect of signals of all the paths of user info channels corresponding to the selected soft decisions about the info parameters of signals of user info channels on the remaining info components of signals of all the user paths on which the final decisions have not been made by the current stage, obtaining the estimates of the info parameters of signals of user info channels corresponding to the selected soft decisions, by comparing the final soft decisions about the info parameters of signals of info channels of users of this iteration to the preset thresholds, and weight combining of the products of the estimates of complex envelopes of signals of all the paths of current iteration users and the estimates of info parameters of signals of user info channels with the weights defined by the elements of the matrix of cross-correlation of the info components of signals of all the paths of all the users to each other.

14. The method of claim 13, wherein the interfering effect of signals of all the paths of info channels of the users corresponding to the selected soft decisions about the info parameters of signals of user info channels on the remaining info components of signals of all the user paths, on which the final decisions have not been made by this stage, is compensated by subtracting the obtained estimates of this interfering effect from the remaining more accurate complex correlation responses of signals of all the paths of each info channel of each user, p being equal to one, or from the remaining complex correlation responses of signals of all the paths of info channels of the (p−1)-th stage users, p being greater than one, thus forming complex correlation responses of signals of all the paths of info channels of the p-th stage users.

15. The method of claim 3, wherein while executing current l-th iteration, where l is greater than 1, the generated elements of cross-correlation matrix of the pseudo-noise sequences of the pilot components of signals of all the paths of all the users to each other are delayed by the time of previous iterations.

16. The method of claim 4, wherein while executing current l-th iteration, where l is greater than 1, the generated elements of cross-correlation matrix of the pseudo-noise sequences of the pilot components of signals of all the paths of all the users to the pseudo-noise sequences of the info components of signals of all the paths of all the users are delayed by the time of previous iterations.

17. The method of claim 5, wherein while executing current l-th iteration, where l is greater than 1, the generated elements of cross-correlation matrix of the info components of signals of all the paths of all the users to the pseudo-noise sequences of the pilot components of signals of all the paths of all the users are delayed by the time of previous iterations.

18. The method of claim 6, wherein while executing current l-th iteration, where l is greater than 1, the generated elements of cross-correlation matrix of the pseudo-noise sequences of the info components of signals of all the paths of all users to each other are delayed by the time of previous iterations.

19. A device of multipath signal reception in a CDMA mobile communications system comprising:
  a demodulation unit that generates at the first outputs delayed complex correlation responses of signals of all the paths of info channels of all the users; at the second outputs—delayed complex correlation responses of signals of all the paths of pilot channels of all the users; at the third outputs—control signals; at the fourth outputs—elements of a matrix of cross-correlation of pseudo-range sequences of the pilot components of signals of all the paths of all the users to each other; at the fourth outputs, the elements of cross-correlation matrix of the pseudo-noise sequences of the pilot components of signals of all the paths of all the users to the pseudo-noise sequences of the info components of signals of all the paths of all the users, the elements of cross-correlation matrix of the pseudo-noise sequences of the info components of signals all the paths of all the users to the pseudo-noise sequences of the pilot components of signals of all the paths of all the users, and the elements of cross-correlation matrix of the pseudo-noise sequences of the info components of signals of all the paths of all the users to each other;
  an accumulator of complex correlation responses of signals of each path of pilot channel of each user generating at the outputs averaged complex correlation responses of signals of all the paths of pilot channels of all the users;
  L−1 first delay units, L−1 second delay units, and L signal processing units, each generating soft decisions about the info parameters of signals of all the info channels of all the users at the first outputs, at the second outputs of each of them but last L-th signal processing unit generating the estimates of complex envelopes of signals of all the paths of all the users; wherein first signal processing unit implements first method iteration, subsequent signal processing units along with corresponding first and second delay units implement subsequent method iterations; the input of demodulation unit being a signal input of the device; the first outputs of demodulation unit are linked to the first inputs of L signal processing units, to first signal processing unit directly and to the rest of signal processing units via corresponding first delay units and all the previous first delay units; the second outputs of demodulation unit are connected to the inputs of accumulator whose outputs are joined with the second inputs of L signal processing units, to first signal processing unit directly and to the rest of signal processing units via corresponding first delay units and all the previous first delay units; the first and second outputs of previous first delay unit are linked to the first and second inputs of subsequent delay unit; the third outputs of demodulation unit are connected to the third inputs of L signal processing units; the fourth outputs of demodulation unit are connected to the fourth inputs of L signal processing units, to first signal processing unit directly and to the rest of signal processing units via corresponding second delay units and all the previous second delay units; the first outputs of previous second delay unit are connected to the fourth inputs of corresponding signal processing unit and to the first inputs of subsequent second delay unit; the first and second outputs of previous signal processing unit are connected to the fifth and sixth inputs of subsequent signal processing unit via second delay unit corresponding to this subsequent signal processing unit; the second and third inputs of second delay unit are linked to the first and second outputs of previous signal processing unit and the second and third outputs of second delay unit are linked to the fifth and sixth inputs of corresponding signal processing unit; the outputs of the last L-th signal processing unit, the soft decisions about the info parameters of all signals of all the info channels of all the users, are outputs of the device; each signal processing unit comprises:

a sub-unit for compensation of the interfering effect of signals of all the paths of pilot channels of all the users on each other;

a sub-unit for compensation of the interfering effect of signals of all the paths of pilot channels of all the users on the signals of all the paths of info channels of all the users, a sub-unit for compensation of the interfering effect of signals of all the paths of info channels of all the users on the signals of all the paths of pilot channels of all the users, and a sub-unit for compensation of the interfering effect of signals of all the paths of info channels of all the users on each other producing soft decisions about the info parameters of signals of all the info channels of all the users through $P_l$ stages, where l—signal processing unit number taking the integer values of 1 to L where;

in the first signal processing unit:

the first inputs are formed by the first inputs of sub-unit for compensation of the interfering effect of signals of all the paths of pilot channels of all the users on the signals of all the paths of info channels of all the users, the second inputs are formed by the first inputs of sub-unit for compensation of the interfering effect of signals of all the paths of pilot channels of all the users on each other, the third inputs are formed by the second inputs of sub-unit for compensation of the interfering effect of signals of all the paths of pilot channels of all the users on the signals of all the paths of info channels of all the users, the second inputs of sub-unit for compensation of the interfering effect of signals of all the paths of pilot channels of all the users on each other, the first inputs of sub-unit for compensation of the interfering effect of signals of all the paths of info channels of all the users on the signals of all the paths of pilot channels of all the users, and the first inputs of sub-unit for compensation of the interfering effect of signals of all the paths of info channels of all the users on each other, the fourth inputs are formed by the third inputs of sub-unit for compensation of the interfering effect of signals of all the paths of pilot channels of all the users on the signals of all the paths of info channels of all the users, the third inputs of sub-unit for compensation of the interfering effect of signals of all the paths of pilot channels of all the users on each other, the second inputs of sub-unit for compensation of the interfering effect of signals of all the paths of info channels of all the users on the signals of all the paths of pilot channels of all the users, and the second inputs of sub-unit for compensation of the interfering effect of signals of all the paths of info channels of all the users on each other, where:

the outputs of sub-unit for compensation of the interfering effect of signals of all the paths of pilot channels of all the users on each other, generating at these outputs more accurate complex correlation responses of signals of all the paths of pilot channels of all the users, are linked to the fourth inputs of sub-unit for compensation of the interfering effect of signals of all the paths of pilot channels of all the users on the signals of all the paths of info channels of all the users and the third inputs of sub-unit for compensation of the interfering effect of signals of all the paths of info channels of all the users on the signals of all the paths of pilot channels of all the users, the outputs of sub-unit for compensation of the interfering effect of signals of all the paths of pilot channels of all the users on the signals of all the paths of info channels of all the user, generating at these outputs more accurate complex correlation responses of signals of all the paths of info channels of all the users, are connected to the fourth inputs of sub-unit for compensation of the interfering effect of signals of all the paths of info channels of all the users on the signals of all the paths of pilot channels of all the users and to the third inputs of sub-unit for compensation of the interfering effect of signals of all the paths of info channels of all the users on each other, the outputs of sub-unit for compensation of the interfering effect of signals of all the paths of info channels of all the users on the signals of all the paths of pilot channels of all the users, generating at these outputs the estimates of complex envelopes of signals of all the paths of all the users, are joined with the fourth inputs of sub-unit for compensation of the interfering effect of signals of all the paths of info channels of all the users on each other and are second outputs of first signal processing unit, the outputs of sub-unit for compensation of the interfering effect of signals of all the paths of info channels of all the users on each other, generating at these outputs soft decisions about the info parameters of signals of all the info channels of all the users, are the first outputs of first signal processing unit, where in each subsequent l-th signal processing unit, l taking the integer values of 2 to L;

the first inputs are formed by the first inputs of sub-unit for compensation of the interfering effect of signals of all the paths of pilot channels of all the users on the signals of all the paths of info channels of all the users;

the second inputs are formed by the first inputs of sub-unit for compensation of the interfering effect of signals of all the paths of pilot channels of all the users on each other, the third inputs are formed by the second inputs of sub-unit for compensation of the interfering effect of signals of all the paths of pilot channels of all the users on the signals of all the paths of info channels of all the users, the second inputs of sub-unit for compensation of the interfering effect of signals of all the paths of pilot channels of all the users on each other, the first inputs of sub-unit for compensation of the interfering effect of signals of all the paths of info channels of all the users on the signals of all the paths of pilot channels of all the users, and first inputs of sub-unit for compensation of the interfering effect of signals of all the paths of info channels of all the users on each other;

the fourth inputs are formed by the third inputs of sub-unit for compensation of the interfering effect of signals of all the paths of pilot channels of all the users on the signals of all the paths of info channels of all the users, the third inputs of sub-unit for compensation of the interfering effect of signals of all the paths of pilot channels of all the users on each other, the second inputs of sub-unit for compensation of the interfering effect of signals of all the paths of info channels of all the users on the signals of all the paths of pilot channels of all the users and second inputs of sub-unit for compensation of the interfering effect of signals of all the paths of info channels of all the users on each other;

the fifth inputs are formed by the third inputs of sub-unit for compensation of the interfering effect of signals of all the paths of info channels of all the users on the signals of all the paths of pilot channels of all the users;

the sixth inputs are formed by the fourth inputs of sub-unit for compensation of the interfering effect of signals of all the paths of pilot channels of all the users on the signals of all the paths of info channels of all the users, the fourth inputs of sub-unit for compensation of the interfering effect of signals of all the paths of pilot channels of all the users on each other and fourth inputs of sub-unit for compensation of the interfering effect of signals of all the paths of info channels of all the users on the signals of all the paths of pilot channels of all the users;

the outputs of sub-unit for compensation of the interfering effect of signals of all the paths of pilot channels of all the users on each other, generating at these outputs more accurate complex correlation responses of signals of all the paths of pilot channels of all the users, are linked to the fifth inputs of sub-unit for compensation of the interfering effect of signals of all the paths of info channels of all the users on the signals of all the paths of pilot channels of all the users; the outputs of sub-unit for compensation of the interfering effect of signals of all the paths of pilot channels of all the users on the signals of all the paths of info channels of all the users, generating at these outputs more accurate complex correlation responses of signals of all the paths of info channels of all the users, are linked to the third inputs of sub-unit for compensation of the interfering effect of signals of all the paths of info channels of all the users on each other;

the outputs of sub-unit for compensation of the interfering effect of signals of all the paths of info channels of all the users on the signals of all the paths of pilot channels of all the users, generating at these outputs the estimates of complex envelopes of signals of all the paths of all the users, are connected to the fourth inputs of sub-unit for compensation of the interfering effect of signals of all the paths of info channels of all the users on each other and for each signal processing unit except the last, L-th, one are the second outputs;

the outputs of sub-unit for compensation of the interfering effect of signals of all the paths of info channels of all the users on each other, generating at these outputs soft decisions about the info parameters of signals of all the info channels of all the users, are the first outputs of signal processing unit; and the outputs of the last L-th signal processing unit are the outputs of the device.

20. The device of claim 19, wherein the demodulation unit comprises:

a searcher, correlators for signal of each path of each user, sub-unit for delay and grouping of the correlation responses of signals of all the paths of info and pilot channels of all the users, a controller, and a cross-correlation matrix element former, wherein:

the first inputs of correlators and searcher are combined thus forming signal input of demodulation unit, the second inputs of correlators and searchers are connected to the first and second control outputs of controller, respectively;

the first outputs of each correlator and searcher are connected to the first and second inputs of controller respectively;

the second outputs of correlators are joined with the first inputs of sub-unit for delay and grouping of the correlation responses of signals of all the paths of info and pilot channels of all the users;

the second inputs of sub-unit for delay and grouping of the correlation responses of signals of all the paths of info and pilot channels of all the users are connected to the third control outputs of controller;

the first outputs of sub-unit for delay and grouping of the correlation responses of signals of all the paths of info and pilot channels of all the users, generating at these outputs complex correlation responses of signals of all the paths of info channels of all the users, are the first outputs of demodulation unit;

the second outputs of sub-unit for delay and grouping of correlation responses of signals of all the paths of info and pilot channels of all the users, generating at these outputs complex correlation responses of signals of all the paths of pilot channels of all the users, are the second outputs of demodulation unit;

the fourth outputs of controller are the third outputs of demodulation unit; and the fifth outputs of controller are joined with the inputs of cross-correlation matrix element former;

the outputs of cross-correlation matrix element former that forms at these outputs the elements of cross-correlation matrix of the pseudo-noise sequences of pilot components of signals of all the paths of all the users to each other, the elements of cross-correlation matrix of the pseudo-noise sequences of the pilot components of signals of all the paths of all the users to the pseudo-noise sequences of the info components of signals of all the paths of all the users, the elements of cross-correlation matrix of the pseudo-noise sequences of the info components of signals of all the paths of all the users to the pseudo-noise sequences of the pilot components of signals of all the paths of all the users, and the elements of cross-correlation matrix of the pseudo-noise sequences of the info components of signals of all the paths of all the users to each other, are the fourth outputs of demodulation unit.

21. The device of claim 19 wherein the sub-unit for compensation of the interfering effect of signals of all the paths of info channels of all the users on each other of signal processing unit for the device comprises:
  a controller; and
  $P_l$ successively connected nodes for compensation of the interfering effect of signals of all the paths of info channels of all the users on each other, l taking the integer values of 1 to L, where:
  the first outputs of a previous node for compensation of the interfering effect of signals of all the paths of info channels on each other are connected to the first inputs of subsequent node for compensation of the interfering effect of signals of all the paths of user info channels on each other;
  the first inputs of sub-unit for compensation of the interfering effect of signals of all the paths of info channels of all the users on each other are formed by the first inputs of controller;
  the second inputs of sub-unit for compensation of the interfering effect of signals of all the paths of info channels of all the users on each other are formed by the second inputs of nodes for compensation of the interfering effect of signals of all the paths of info channels on each other;
  the third inputs of sub-unit for compensation of the interfering effect of signals of all the paths of info channels of all the users on each other are formed by the first inputs of first node for compensation of the interfering effect of signals of all the paths of info channels of all the users on each other;
  the fourth inputs of sub-unit for compensation of the interfering effect of signals of all the paths of info channels of all the users on each other are formed by the third inputs of nodes for compensation of the interfering effect of signals of all the paths of user info channels on each other;
  the first outputs of controller are connected to the fourth inputs of nodes for compensation of the interfering effect of signals of all the paths of user info channels on each other;
  the second outputs of controller are the outputs of sub-unit for compensation of the interfering effect of signals of all the paths of info channels of all the users on each other,
  the second outputs of nodes for compensation of the interfering effect of signals of all the paths of user info channels on each other are connected to the second inputs of controller.

* * * * *